United States Patent [19]
Kawaguchi et al.

[11] Patent Number: 5,930,752
[45] Date of Patent: Jul. 27, 1999

[54] AUDIO INTERACTIVE SYSTEM

[75] Inventors: Naohisa Kawaguchi; Kazuki Matsui; Takashi Ohno; Akinori Iwakawa; Hiroaki Harada, all of Kawasaki, Japan

[73] Assignee: Fujitsu LTD., Kawasaki, Japan

[21] Appl. No.: 08/712,317

[22] Filed: Sep. 11, 1996

[30] Foreign Application Priority Data

Sep. 14, 1995 [JP] Japan .................................. 7-237079

[51] Int. Cl.⁶ .............................. G10L 9/00; H04Q 11/04
[52] U.S. Cl. ........................ 704/235; 704/260; 704/278
[58] Field of Search ................................... 704/260, 278, 704/235

[56] References Cited

U.S. PATENT DOCUMENTS

| | | | |
|---|---|---|---|
| 4,569,026 | 2/1986 | Best | 364/521 |
| 4,710,917 | 12/1987 | Thompkins et al. | 370/62 |
| 4,716,585 | 12/1987 | Thompkins et al. | 379/202 |
| 4,847,829 | 7/1989 | Thompkins et al. | 370/62 |
| 5,014,267 | 5/1991 | Thompkins et al. | 370/62 |
| 5,335,276 | 8/1994 | Thompson et al. | 380/21 |
| 5,594,789 | 1/1997 | Seazholtz et al. | 379/207 |

*Primary Examiner*—David R. Hudspeth
*Assistant Examiner*—Susan Wieland
*Attorney, Agent, or Firm*—Staas & Halsey

[57] ABSTRACT

An audio interactive system including a plurality of terminals each having an audio input means for converting voices into aural signals and an audio output means for converting aural signals into voices, the plurality of terminals being connected to a communication line; and a server connected with the plurality of terminals via the communication line to perform collection and distribution of the aural signals, in which a conversation is made through voices between the plurality of terminals. The server comprises a buffer for temporarily storing the aural signals transmitted from the terminals, and a scheduler for controlling the distribution of the aural signals stored in the buffer.

25 Claims, 61 Drawing Sheets

Fig. 2.6

Fig. 50   SAMPLE OF ILLUSTRATION

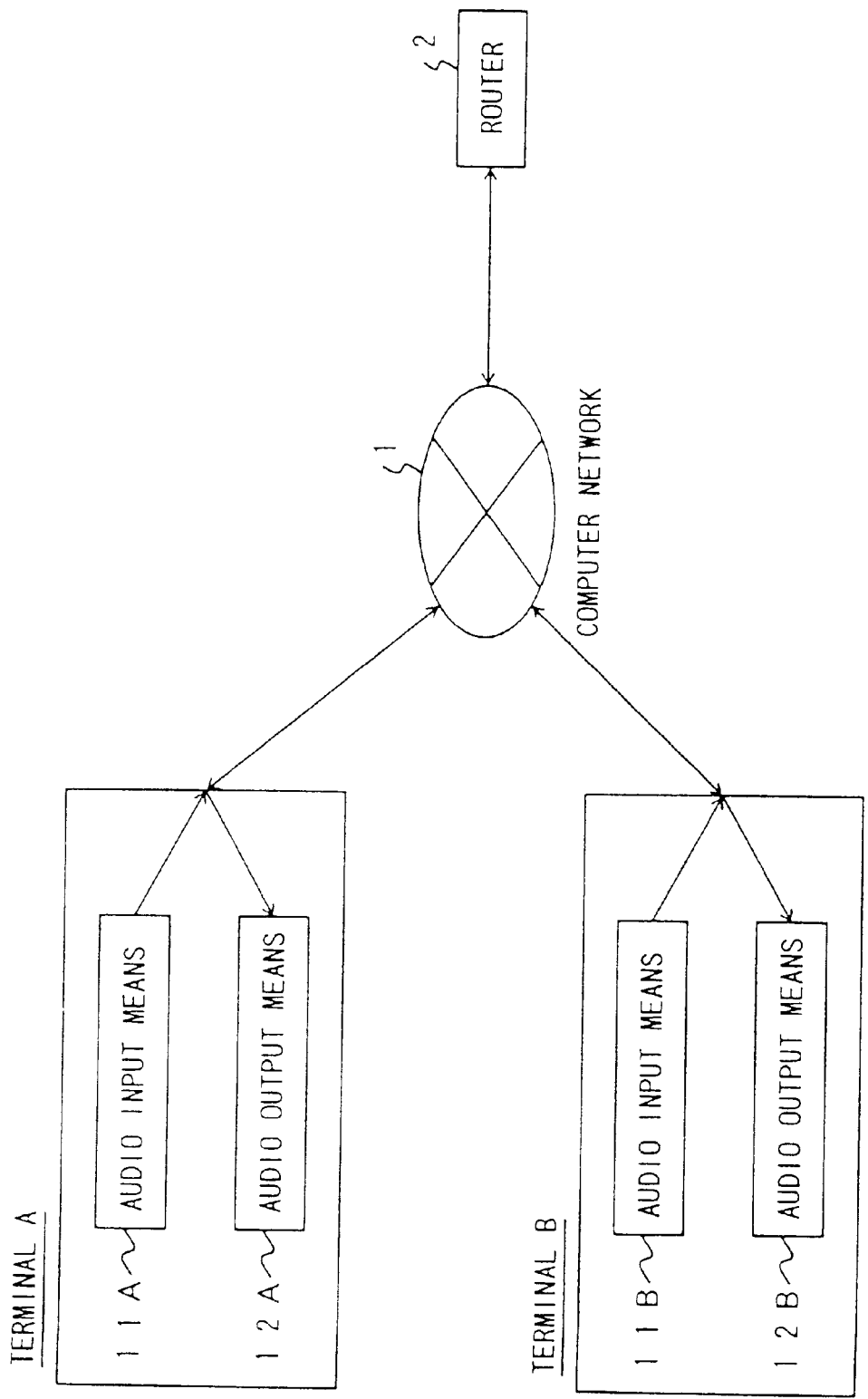

AUDIO INTERACTIVE SYSTEM

BACKGROUND OF THE INVENTION

1. Field of the Invention

The present invention relates to an audio interactive system, in which a plurality of users may interact with one another through a speech, in an on-line chat system utilizing a computer and a computer network.

2. Description of the Related Art

Popularization of the computer network makes it easy to do works, to play games, and to exchange life information through conversations of a plurality of users on a network.

Thus, there has been required more simple input means in place of keyboards so that even ordinary users can attend such a network conversation system (a chat system).

According to the conventional chat system, a sentence is inputted through operation of a keyboard, and a conversation is effected by transmitting the entered sentence.

However, it would be very difficult for ordinary users to operate the keyboard as to Japanese syllabary-to-Chinese character transformation and the like. This causes the input speed of the keyboard operation to slow down, and thus involves such a problem that the operator cannot follow a flow of the conversation. In order to solve this problem, there has been developed a system in which a conversation is effected through a speech.

FIG. 61 is a schematic construction view of the related art of audio interactive system. Here, for the purpose of a simplification, there are shown only two terminals A and B, and it is assumed that a conversation is made between the terminals A and B.

Each of the terminals A and B comprises audio input means 11A and 11B each for converting voice into an aural signal, such as a microphone and the like, and audio output means 12A and 12B each for converting an aural signal into voice, such as a speaker and the like. In such an audio interactive system, the terminals A and B are connected with one another via a communication line 1 under control of a router 2 so that a conversation is made between the terminals A and B by transmitting and receiving the aural signals or the sound signals.

However, the above-mentioned audio interactive systems are short of a bandwidth of a communication channel, and thus there simply exist systems which permit conversation between 2–4 subscribers.

Consequently, in order to allow a plurality of users to have a conversation through a network, it will be a subject that how the aural data, which are increased as the users are increased, are sliced.

SUMMARY OF THE INVENTION

In view of the foregoing, it is therefore an object of the present invention to provide an audio interactive system which is preferable for suitably controlling a communication amount among the users.

To attain the above-mentioned object, according to the present invention, there is provided an audio interactive system comprising: a plurality of terminals each having an audio input means for converting voices into aural signals and an audio output means for converting aural signals into voices, said plurality of terminals being connected to a communication line; and a server connected with said plurality of terminals via said communication line adapted to perform collection and distribution of the aural signals, in which a conversation is made through voices between said plurality of terminals, wherein said server comprises a buffer means for temporarily storing the aural signals transmitted from the terminals, and a scheduler means for controlling the distribution of the aural signals stored in said buffer means.

Here, it is acceptable that said server controls a distribution sequence of the aural signals.

FIG. 1 is a principle view showing this aspect of the present invention.

In FIG. 1 and the following figures except some figures, only two terminals are typically illustrated.

As shown in FIG. 1, speeches transmitted from terminals A and B are stored in buffer memories 21A and 21B of a server 20 under control of a control unit 23, respectively. The speeches are ordered suitably by a scheduler 22, and sequentially distributed to the terminals A and B. For the purpose of better understanding, the buffer memories are illustrated in the same number as those of the terminals A and B.

According to this aspect, it is possible to avoid such a problem that when speeches take place simultaneously from a plurality of terminals A and B, parallel incoming of these speeches to the terminals A and B causes a bandwidth to exceed that of a line or circuit, so that the speeches unnaturally break. Further, it is possible to save trouble of processing for parallel incoming of a plurality of speeches to the terminals A and B and processing such that a plurality of speeches are mixed in the terminals A and B. Incidentally, the terminals A and B have control units 13A and 13B, respectively.

In the audio interactive system according to the present invention, it is preferable that said server has means for managing a number of simultaneous speakers who simultaneously transmit speeches, and inhibits a simultaneous transmission of the aural signals from the terminal, a number of said aural signals exceeding a predetermined number.

FIG. 2 is a principle view showing this aspect.

As shown in FIG. 2, in a case where speeches are made from terminals A and B, each of speech requirement means 14A and 14B informs a server 20 of a speech requirement. In the server 20, a number of persons who can speak simultaneously is set up beforehand to a simultaneous speaker number management means 24 for managing a number of simultaneous speakers, taking account of a bandwidth of line 1. For example, if it is permitted up to three persons, then number 3 is set up to the simultaneous speaker number management means 24. In this condition, when the server 20 receives speech requirements from the terminals, the server 20 confirms the numerical value stored in the simultaneous speaker number management means 24. If the numerical value is 1 or more, the server 20 gives a notice of allowance for the terminals A and B, and the numerical value is reduced by 1. If the numerical value is already 0, the server 20 waits until a notice of speech termination arrives from some terminal.

In the terminal ends, upon receipt of a notice of allowance, it informs the users through speech allowance display means 15A and 15B that they are allowed to make speeches. After the users confirm the display, they start the speeches, and after termination of their speeches, they inform the server 20 of termination of their speeches through speech termination informing means 16A and 16B.

In the server end, upon receipt of a notice of termination of the speeches, the numerical value stored in the simultaneous speaker number management means 24 is increased by 1.

In an audio interactive system according to the present invention, it is preferable that the server or the terminal has a silence detection means for detecting a silence portion of the aural signal, and said scheduler controls a distribution sequence of the aural signals in units of speeches each separated with the silence portion of the aural signal.

FIG. 3 is a principle view showing this aspect.

As shown in FIG. 3, speeches transmitted from terminals A and B are stored in buffer memories 21A and 21B of a server 20 under control of a control unit 23, respectively. PCM data stored in the buffer memories 21A and 21B are searched by a silence detection means 25 to measure a sound volume. If a period of time during which the measured sound volume is smaller than a predetermined value is longer than a predetermined time, the speech is partitioned on that portion. The speeches thus partitioned are ordered suitably by a scheduler 22, and sequentially distributed to the terminals A and B.

According to this aspect, in addition to the fundamental advantages of the present invention, it is possible to detect pauses of a speech and switch the speech to another speech at the detected pause, thereby avoiding useless occupation of the system in the silence portion.

In an audio interactive system according to the present invention, it is preferable that said scheduler controls a distribution sequence of the aural signals in such a manner that the server distributes the aural signals in the order in which the aural signals arrive at said server.

FIG. 4 is a principle view showing this aspect.

As shown in FIG. 4, speeches transmitted from terminals A and B are stored in buffer memories 21A and 21B of a server 20 under control of a control unit 23, respectively. And in addition, receipt starting times of speeches are stored in the buffer memories 21A and 21B. In the scheduler 22, if there is speech now in transmission, the transmission is continued. On the other hand, if the transmission is over, the earlier one of receipt starting times of all the buffer memories 21A and 21B is transmitted to all the terminals up to a pause of the speech.

According to this aspect, in addition to the fundamental advantages of the present invention, there is an advantage such that conversations along the time base are possible.

In an audio interactive system according to the present invention, it is preferable that said server has means for transmitting to the terminal a command indicating transmission of an internal time of the terminal; each of said terminals has means responsive to the command for transmitting one's own internal time to said server, and means for transmitting to said server the aural signal together with one's own internal time at time of transmission; and said scheduler controls a distribution sequence of the aural signals in such a manner that the server distributes the aural signals in the order in which the aural signals are generated from said terminals.

FIG. 5 is a principle view showing this aspect.

As shown in FIG. 5, at the time point when terminals A and B are connected to a server 20, an internal time correction value computing unit 27 within the server 20 is activated. First, the server 20 instructs the terminals A and B that local times of the terminals A and B are read through internal clocks 17A and 17B and the local times thus read are transmitted to the server 20. Now it is assumed that a time of the instruction is expressed by Ts. The server 20 waits so that the terminals A and B responsive to the instruction report the local times of the terminals A and B. When the server 20 received the reports from the terminals A and B, this time is expressed by Te. Assuming that the reported local times of the terminals A and B are expressed by T1, difference between an internal clock 26 within the server 20 and the internal clock 17A or 17B of the terminals A or B is expressed by an internal time correction value Td=Ts+(Te-Ts)/2-T1. This value is evaluated on all of the terminals A and B, and each of the obtained values is stored in the associated one of internal time correction value memories of buffers 21A and 21B.

In each of the terminals A and B, time Tx at which speech is made is counted by the internal clock 17A or 17B, and the speech is transmitted to the server 20 together with the time Tx. This feature makes it possible for the server 20 to correct the time, at which the speech transmitted from each of the terminals A and B was actually made, to a time of the server internal clock by Tx-Td.

When the speeches generated from the terminals A and B are stored in the buffers 21A and 21B, the internal times transmitted from the terminals A and B are corrected to the server internal times, using internal time correction values, and then stored in the associated corrected receipt starting time memories in the server 20, respectively. Thus, the scheduler 22 can transmit sequentially the speeches to all the terminals A and B in accordance with the order in which the speeches were actually made.

According to this aspect, in addition to the fundamental advantages of the present invention, there is an advantage such that speeches are permitted sequentially in accordance with the order in which the speeches actually take place. Thus, it is possible to provide fairly a service which is to be made in earlier order, for example, a quiz.

In an audio interactive system according to the present invention, it is preferable that said server has a mixer for mixing the aural signals.

FIG. 6 is a principle view showing this aspect.

As shown in FIG. 6, speeches transmitted from terminals A and B are stored in buffer memories 21A and 21B of a server 20, respectively. And these speeches are mixed by a mixer 29 into a single speech and temporarily stored in an output buffer area 28, and thereafter it is distributed to all the terminals A and B.

According to this aspect, it is possible to avoid such a problem that when speeches take place simultaneously from a plurality of terminals A and B, parallel incoming of these speeches to the terminals A and B causes a bandwidth to exceed that of a line or circuit, so that the speeches unnaturally break. Further, it is possible to save trouble of processing for parallel incoming of a plurality of speeches to the terminals A and B and processing such that a plurality of speeches are mixed in the terminals A and B.

In an audio interactive system according to the present invention, it is preferable that said scheduler controls a distribution time of the aural signals on the basis of time at which the aural signals arrive at said server.

FIG. 7 is a principle view showing this aspect.

As shown in FIG. 7, speeches transmitted from terminals A and B are stored in buffer memories 21A and 21B of a server 20, respectively. And in addition, receipt starting times of speeches are stored in the buffer memories 21A and 21B. A mixer 29 arranges the respective speeches in time sequence referring to the receipt starting times, and mixes the same time of speeches and temporarily stores the mixed speech in an output buffer area 28. The scheduler 22 the speeches, which have been subjected to mixing process in which the same time of speeches are mixed into a single speech, are distributed in order of time.

According to this aspect, in addition to the fundamental advantages of the present invention, it is possible to mix the speeches upon arranging the same in order of time.

In an audio interactive system according to the present invention, it is preferable that said said server has means for transmitting to the terminal a command indicating transmission of an internal time of the terminal; each of said terminals has means responsive to the command for transmitting one's own internal time to said server, and means for transmitting to said server the aural signal together with one's own internal time at time of transmission; and said scheduler controls a distribution time of the aural signals on the basis of time at which the aural signals are generated from said terminals.

FIG. 8 is a principle view showing this aspect.

As shown in FIG. 8, at the time point when terminals A and B are connected to a server 20, first, the server 20 instructs the terminals A and B that local times of the terminals A and B are read through internal clocks 17A and 17B and the local times thus read are transmitted to the server 20. Now it is assumed that a time of the instruction is expressed by Ts. The server 20 waits that the terminals A and B responsive to the instruction report the local times of the terminals A and B. When the server 20 received the reports from the terminals A and B, this time is expressed by Te. Assuming that the reported local times of the terminals A and B are expressed by T1, difference between an internal clock 26 within the server 20 and the internal clock of the terminals A or B is expressed by an internal time correction value Td=Ts+(Te−Ts)/2−T1. This initial setting processing is first effected on all of the terminals A and B.

In each of the terminals A and B, time Tx at which speech is made is counted by the internal clock 17A or 17B, and the speech is transmitted to the server 20 together with the time Tx. This feature makes it possible for the server 20 to correct the time, at which the speech transmitted from each of the terminals A and B was actually made, to a time of the server internal clock by Tx−Td.

When the speeches generated from the terminals A and B are stored in the buffers 21A and 21B, the internal times transmitted from the terminals A and B are corrected to the server internal times, using internal time correction values, and then stored in the associated corrected receipt starting time memories in the server 20, respectively. Thus, a mixer 29 can mix the speeches in accordance with times at which the speeches were actually made. The scheduler 22 controls a distributing time in accordance with the times at which the speeches were actually made.

According to this aspect, in addition to the advantages discussed on the aspect explained referring to FIG. 6, there is an advantage such that speeches are permitted sequentially in accordance with the order in which the speeches actually take place. Thus, it is possible to provide fairly a service which is to be made in earlier order, for example, a quiz.

In an audio interactive system according to the present invention, it is preferable that each of said terminals has a logical personal image, and said scheduler controls a distribution of the aural signals on the basis of at least one of logical positional relation, distance, surroundings, eyes direction, sight and posture of the logical personal image within space of the logical personal image.

FIG. 9 is a principle view showing this aspect.

As shown in FIG. 9, terminals A and B comprises avatar management information memories 17A and 17B each for storing avatar management information to manage position, eyes direction, sight and the like of a logical personal image (a so-called avatar) representative of a user (speaker) of the terminals A or B, and world management information memories 18A and 18B for storing world management information to manage a logical world held in common by the avatars of the terminals A and B, respectively. The users of the terminals A and B may control the position of the avatar representative of oneself, one's eyes direction and the like.

Each of the terminals A and B transmits the speech and in addition a moving direction of one's own avatar, a moving direction of one's eyes and the like. On the other hand, the server 20 stores the received speeches in the buffer memories 21A and 21B, and successively update the contents of avatar management information memories for storing avatar management information to manage logical position, eyes direction, sight and the like of the avatar. The server 20 comprises a world management information memory 30 which is similar to those in the terminals A and B, and a maximum distance memory 31 for storing a maximum distance indicating a maximum distance between avatar-to-avatar up to which a conversation is permissible. In the scheduler 22, when the speeches are sequentially transmitted to the terminals A and B, there is performed such a scheduling that a speech, which is issued from an avatar who cannot be seen (out of sight) from a certain speaker (avatar), is not transmitted, otherwise it is transmitted with decreasing priority.

According to this aspect, in addition to the fundamental advantages of the present invention, there is an advantage that such an inconvenience that an avatar is addressed from a speaker who cannot been seen is avoided. Further, this feature makes it possible to provide such a control that a speech issued from a speaker who is all too far apart cannot be heard. Furthermore, the limitation of distribution of speeches unnecessary to be heard makes it possible to reduce an unnecessary communication amount.

In an audio interactive system according to the present invention, it is preferable that each of said terminals has a logical personal image (avatar), and has an effector for making an alteration to the aural signal on the basis of at least one of logical positional relation, distance, surroundings, eyes direction, sight and posture of the logical personal image within space of the logical personal image.

FIG. 10 is a principle view showing this aspect.

As shown in FIG. 10, each of the terminals A and B transmits the speech and in addition a moving direction of a speaker (avatar), a moving direction of one's eyes and the like. On the other hand, the server 20 stores the received speeches in the buffer memories 21A and 21B, and successively update the contents of avatar management information memories for storing avatar management information to manage logical position, one's eyes direction, sight and the like of the avatar. With respect to the speeches stored in the buffer memories, when such speeches are distributed to the terminals, there is provided such a control that a speech issued from a speaker who is logically all too far apart is not distributed, and in case of other than that, the speeches stored in the buffer memories are processed by an effector 32 in such a manner that the sound volume is smaller as a logical distance between the speaker and the listener is extended, taking into account of a logical positional relation between the speaker and the listener and their eyes directions. Further, a sound volume ratio of the left and the right, a phase and a tone quality(characteristic of a filter) are varied in accordance with a direction. In a case where there is an obstacle between the speaker and the listener, an echo is applied or a tone quality (characteristic of a filter) is varied, in order to express that sound is propagated indirectly. The sound signal or aural signal thus modified is temporarily stored in output buffer areas L and R in the form of a stereo sound signal.

The thus processed speeches from the respective terminals are subjected to a scheduling process and are sequentially distributed to the respective terminals. Alternatively, the speeches involved in the same time are subjected to a mixing process and are distributed to the respective terminals.

According to this aspect, it is possible to emphasize a realistic image such that the user may hear sound with the sound volume corresponding to the distance of the speaker and hear like that the sound emanates from a direction corresponding to the direction in which the speaker exists.

In an audio interactive system according to the present invention, it is preferable that said server has one or more group management tables registering terminals, which belong to an interaction group in which a conversation is made, of said plurality of terminals, and said scheduler controls a distribution of the aural signals in such a manner that received aural signals are distributed to terminals which belong to the same interaction group as the terminal which generated the received aural signals.

FIG. 11 is a principle view showing this aspect.

As shown in FIG. 11, there is provided a group management table 33 comprising a receiving group table on each receiving group and a transmitting group table on each transmitting group. The receiving group table on each receiving group stores user IDs of all users who belong to the group. The transmitting group table on each transmitting group stores group IDs of all users who belong to the group. Speeches transmitted from the terminals A and B are stored in buffer memories 21A and 21B, respectively, and then ordered by a scheduler 22 and sequentially distributed to all the terminals which belong to the same group. Alternatively, as aforementioned, it is acceptable that the speeches involved in the same time are subjected to a mixing process for each of the terminals which belong to the same group, and are distributed to the respective terminals.

In an audio interactive system according to the present invention, it is preferable that each of said terminals has a transmitting mode selection means for selecting anyone of a plurality of transmitting modes for designating a receiving terminal as an accepting station to receive an aural signal originated.

FIG. 12 is a principle view showing this aspect.

As shown in FIG. 12, an object of speech is selected beforehand by transmitting mode selection means 19A, 19B from among the same group, the multiple address to a plurality of groups, and the specified user (or an user group).

If an object of speech is the same group only, it implies an ordinary conversation mode. In this case, there is performed the processing explained referring to FIG. 11.

If the multiple address to a plurality of groups is instructed to the server 20, the receiving group ID, which is desired to be an object of the multiple address, is added to the associated user's transmitting group table 35 of a group management table 33. With respect to speeches transmitted from the terminals A and B, since it is possible to determine the receiving group ID through referring to the associated user's transmitting group table 35, the speeches are distributed to all the belonging users of each receiving group.

If a speech to the specified user (or an user group) is instructed to the server 20, the designated user ID (an ID of user group) is added to the associated user's transmitting group table 35 of the group management table 33. With respect to speeches transmitted from the terminals A and B, since it is possible to determine the receiving group ID and the user ID through referring to the associated user's transmitting group table 35, the speeches are distributed to all the belonging users of each receiving group, and all the users (or user group).

In an audio interactive system according to the present invention, it is preferable that each of said terminals has a listening mode selection means for selecting anyone of a plurality of listening modes for designating a transmitting terminal as a transmitting source.

FIG. 13 is a principle view showing this aspect.

As shown in FIG. 13, an object of listening is selected beforehand by the listening mode selection means 101B from among the same group, the simultaneous listening of a plurality of groups, and the specified user.

If an object of listening is the same group only, it implies an ordinary conversation mode. In this case, there is performed the processing explained referring to FIG. 11.

If the simultaneous listening of a plurality of groups is instructed to the server 20, one's user ID is added to an entry of the receiving group table 34 of a group, which is desired to be an object of the listening, of a group management table 33. With respect to speeches transmitted from the terminals A and B, the receiving group ID is determined through referring to the associated user's transmitting group table 35. Thus, the speeches are distributed to all the belonging users registered on the receiving group table 34. As a result, the speeches may be distributed also to the user ID added to the receiving group table 34.

If a listening to the specified user (or an user group) is instructed to the server 20, one's user ID is added to the transmitting group table 30 of the designated user (or an user group). With respect to speeches transmitted from the terminals A and B, the receiving group ID and the user ID are determined through referring to the associated user's transmitting group table 35. Thus, the speeches are distributed to all the belonging users registered on the receiving group table 34 and the designated user. As a result, the speeches may be distributed also to the user ID added to the transmitting group table 35.

In an audio interactive system according to the present invention, it is preferable that each of said terminals has an interruption inhibit informing means for informing said server of an interruption inhibit to designate a terminal, on which a reception of aural signals addressed and transmitted to oneself is rejected, of terminals as originating sources of the aural signals; and said server stops, when a transmitting destination of received aural signals is the terminal which informed of interruption inhibit through said interruption inhibit informing means and an originating source of the received aural signals is the terminal designated by interruption inhibit information through said interruption inhibit informing means, a transfer of the aural signals to the terminal as the transmitting destination.

FIG. 14 is a principle view showing this aspect.

As shown in FIG. 14, the respective terminals inform a server 20 of interruption inhibit so as to inhibit the server 20 from originating speeches from other than groups designated by users, and users.

In the server 20, upon receipt of a notice of the interruption inhibit, if it is involved in the interruption inhibit to the receiving group, an interruption inhibit flag of the associated group of the receiving group table 34 is turned on. On the other hand, if it is involved in the interruption inhibit to one's own terminal, an interruption inhibit flag of the associated terminal ID of the transmitting group table 35. When a designation of a speech mode is issued from a certain user, the interruption inhibit flag of the receiving group table 34 and the interruption inhibit flag of the associated terminal ID of the transmitting group table 35 are confirmed, and if their flags are turned on, the registration onto the transmitting group table 35 is rejected.

In an audio interactive system according to the present invention, it is preferable that a password is assigned to said interaction group; each of said terminals has a password input means for inputting the password to transmit the same to said server, and said server inspects the passwords transmitted from the terminals and causes the terminal transmitting a proper password to join an associated interaction group.

FIG. 15 is a principle view showing this aspect.

As shown in FIG. 15, each of the terminals is provided with a password input means 102A, 102B. A server 20 is provided with a security check means 37, a privilege level table 36 for each user, a receiving group table 34 and a transmitting group table 35. Each of entries of the receiving group table 34 and the originating group table 35 is provided with a privilege level memory and a password memory. A privilege level is an indicator indicating as to what level of group the respective users are allowed to attend in conversation. With respect to a password, only the users who know the password are allowed to attend the conversation.

Here, it is assumed that in order to listen the speech of another group to which a user does not belong, when the receiving group table 34 of another user, or the transmitting group table 35 of another user is rewritten in accordance with the request from the user, the security check means 37 checks the privilege level and the password of the user of concern. And only in a case where it is proper request, a rewrite is performed.

In an audio interactive system according to the present invention, it is preferable that each of said terminals has a display means for displaying a speaker and a listener.

FIG. 16 is a principle view showing this aspect.

As shown in FIG. 16, each of the terminals is provided with a display means 105A, 105B, a coordinates input means 104A, 105B for designating a user of interest in speaking from among a plurality of users (avatars) displayed on the display means 105A, 105B, and a drawing means for performing drawing on the display means 105A, 105B. It is identified on the display means 105A, 105B that who speaks to whom.

Thus, if there are added means for indicating a party who is spoken to and means for identifying as to who speaks to whom, it is permitted that a speech is transmitted together with a user ID of a party to the server 20 through speaking while indicating a party of interest in speaking when a speech takes place, and the server 20 distributes to the respective terminals data together with the speaker's user ID.

In this manner, each of the terminals reads the speaker's user ID and the user ID of a party so as to vary the illustration of the speaker (avatar) and the illustration of the party.

In an audio interactive system according to the present invention, it is preferable that said server has an effector for changing tone quality of the aural signals.

FIG. 17 is a principle view showing this aspect.

As shown in FIG. 17, if the user desires it, a speech is transmitted together with a silent flag to the server 20 by a mode setting means 106A, 106B for setting a mode as to whether or not a tone quality is changed. The server 20 transmits, when receives a speech to which a silent flag is appended, the speech to each of the terminals in such a manner that the speech is changed in sound by passing through an effector 38 so that a speaker cannot be identified.

In an audio interactive system according to the present invention, it is preferable that said server has a sound effect buffer for storing a sound effect signal representative of a predetermined sound effect, and said scheduler means controls a distribution of the aural signals transmitted and also controls a distribution of the aural signals stored in said sound effect buffer.

FIG. 18 is a principle view showing this aspect.

As shown in FIG. 18, a server 20 is provided with a sound effect buffer 39 for storing a sound effect, a sound effect management information memory 40 for storing information to manage a sound effect and an iterative interval memory 41 for storing an iterative interval of the sound effect.

Here, a scheduling process or a mixing process is performed in such a manner that when PCM data of the sound effect other than a user's speech, for example, a store broadcasting and a station announce, its logical position and an iterative interval are registered onto the server 20, the server 20 repeatedly distributes these sound effects at regular intervals. Thus, the sound effect is also distributed to the respective terminals, in a similar fashion to that of the speech, in the intervals between the speeches.

In an audio interactive system according to the present invention, it is preferable that said server or said terminal has audio recognition means for converting the aural signals into text data.

FIG. 19 is a principle view showing this aspect.

As shown in FIG. 19, when speeches transmitted from a terminal are distributed to the respective terminals, in a case where the speeches are distributed to a terminal having no audio output means, PCM data of the speech stored in the buffer is converted into a text using a speech recognition means 42 incorporated into the server 20. Thus, in the terminal having no audio output means, it is possible to indicate the speeches with the text. It is acceptable that the terminal is provided with a speech recognition means 107.

FIG. 20 is a principle view showing another aspect.

As shown in FIG. 20, the speech received in form of a text from a terminal having no audio input means is converted into PCM data using a voice synthesizer means 43 incorporated into the server 20, and for a terminal having audio output means the data thus converted is distributed in form of a voice. On the other hand, for a terminal having no audio output means the speech received in form of a text from the terminal is transmitted as it is, while the speech received in form of a voice from the terminal is converted into the text form by the speech recognition means 42 and then distributed.

FIG. 21 is a principle view showing further another aspect.

As shown in FIG. 21, the user's used language is informed beforehand the server 20 and stored in a used language table 45. When the used language of speeches received from a transmitting terminal does not match with that of a terminal as transmitting destination, the speech is converted into a text by the speech recognition means 42, and then translated by a translation means 44, and further the resultant text is converted into a speech by the voice synthesizer means 43. Thus, it is possible to make a conversation thinking nothing of the difference in the used language.

FIG. 22 is a principle view showing still further another aspect.

As shown in FIG. 22, the received speech is converted into a text by the speech recognition means 42. The text thus converted and the designated words and phrases registered beforehand in a words and phrases table 47 are subjected to a retrieval by a retrieval means 46 incorporated into the server 20. As a result of the retrieval, if the designated words and phrases exist, these are deleted. Thus, it is possible to prevent unsuitable expression from being transmitted to a listener.

In an audio interactive system according to the present invention, it is preferable that said server and said terminals are connected to each other via an analog line, and said system further comprises: a tone sound generating means for generating tone sounds to discriminate starting end and terminating end of aural signals at starting end and terminating end of aural signals in the form of analog signals, and a tone sound detecting means for detecting received tone sounds.

According to this aspect, as shown in FIG. 23, the terminal and the server are provided with the respective means as illustrated in the figure. As shown in FIG. 23, the terminal incorporates thereinto a data switch means operative in such a manner that if data transmitted through a line network 1 is analog audio data, it is outputted to a speaker as it is, on the other hand, if it is digital data, that is inhibited from being outputted to the speaker. In the terminal, upon receipt of an analog data start code from the server 20, a data switch is switched to turn on a speaker switch so that a data communication mode is set up to an analog mode. In this condition, if a discriminating tone is inputted subsequently to a silence period over a predetermined time, the data switch is switched to turn off the speaker switch so that the data communication mode is set up to a digital mode.

Thus, since audio information travels on an analog base, it is permitted to utilize even a low rate of line such as a telephone line.

In an audio interactive system according to the present invention, it is preferable that said server has storage means for storing conversations between the terminals. In this case, it is further preferable that when said storage means stores conversations between the terminals, said server adds associated function information to the conversation to be stored in said storage means.

FIG. 24 is a principle view showing this aspect.

As shown in FIG. 24, speeches issued from the terminals are distributed to the associated terminals. A bulk storage 50 stores a speech together with information such as a speech start time, a speaker's name and a party of the speech. The conversation may be reproduced in accordance with a request from the terminal in conversation or after conversation.

In an audio interactive system according to the aspect shown in FIG. 24, it is preferable that said server has a retrieval means for retrieving a desired conversation portion of the conversation stored in said storage means on the basis of the function information.

FIG. 25 is a principle view showing this aspect.

As shown in FIG. 25, incorporation of a retrieval means 51 into the server permits only the speech of interest to be reproduced through performing a retrieval by a bulk storage storing a conversation adopting a speech start time, a speaker's name and a party of the speech as key words.

In an audio interactive system according to the present invention, it preferable that said system further comprises a conversation rate conversion means for converting a conversation rate.

FIG. 26 is a principle view showing this aspect.

As shown in FIG. 26, when the conversation stored in a bulk storage 50 is reproduced, it is acceptable to perform the reproduction in a timing in which a speech is actually made. But, more preferably, it is either acceptable that the blank portion is omitted and the speeches are continuously reproduced in turn, or that the speeches are reduced in time as compared with the actual time and reproduced, using a conversation rate conversion means.

BRIEF DESCRIPTION OF THE DRAWINGS

FIG. 61 is a schematic diagram of the related art of audio interactive system.

DESCRIPTION OF THE PREFERRED EMBODIMENTS

Hereinafter, there will be described embodiments of the present invention.

Figure 1:
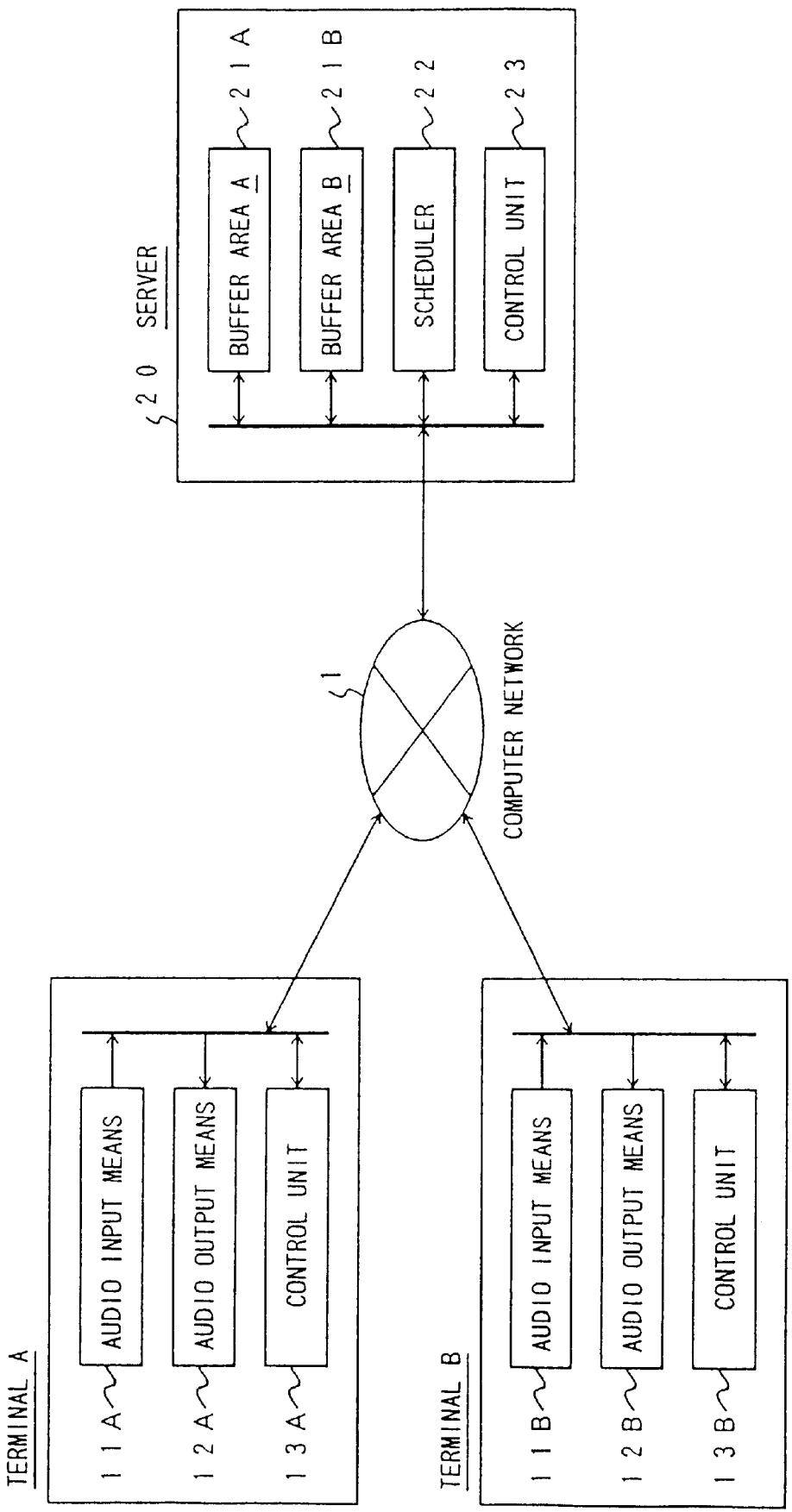
FIG. 1 is a principle view showing one aspect of the present invention.
Figure 2:
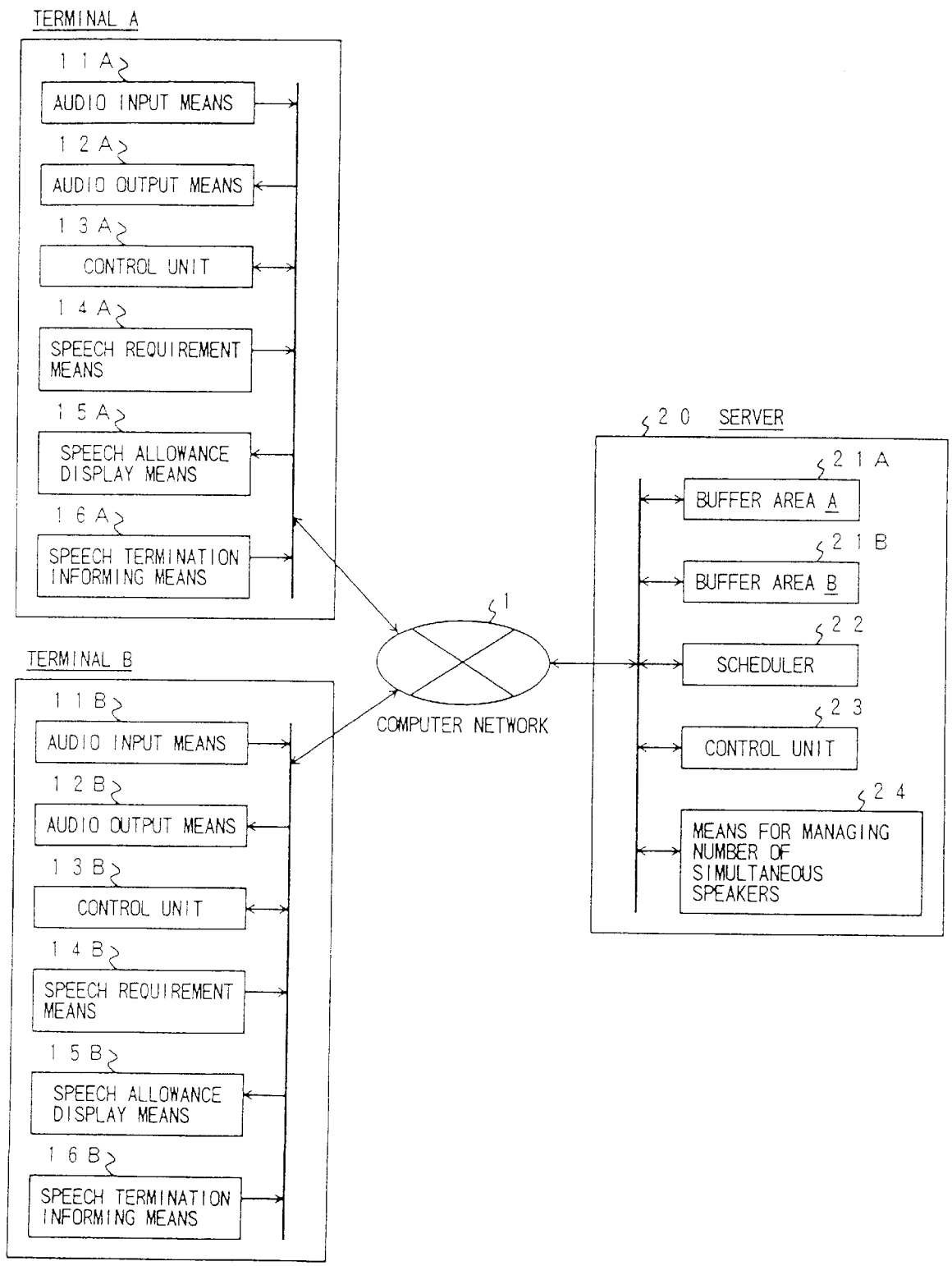
FIG. 2 is a principle view showing another aspect of the present invention.
Figure 3:
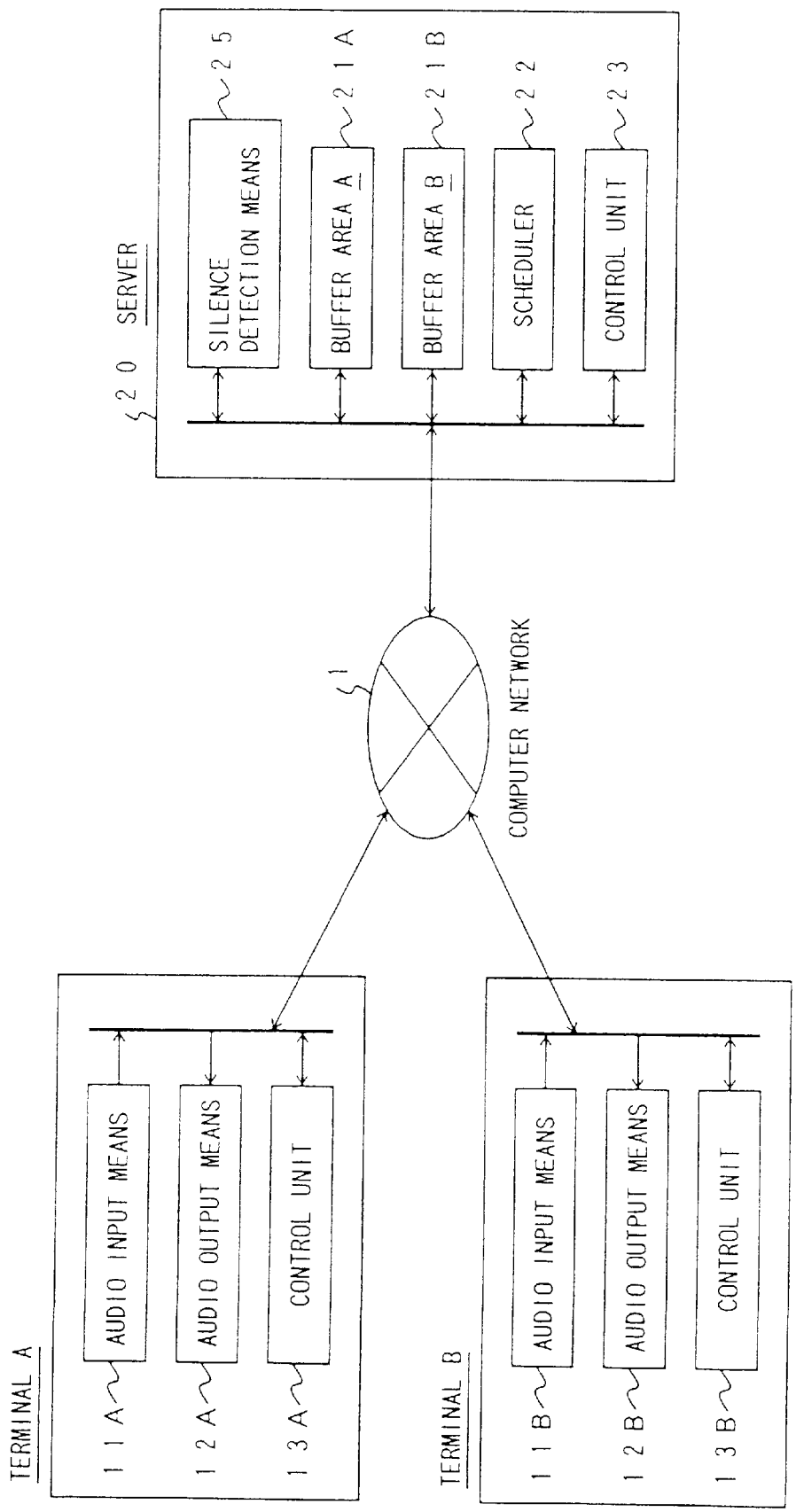
FIG. 3 is a principle view showing further another aspect of the present invention.
Figure 4:
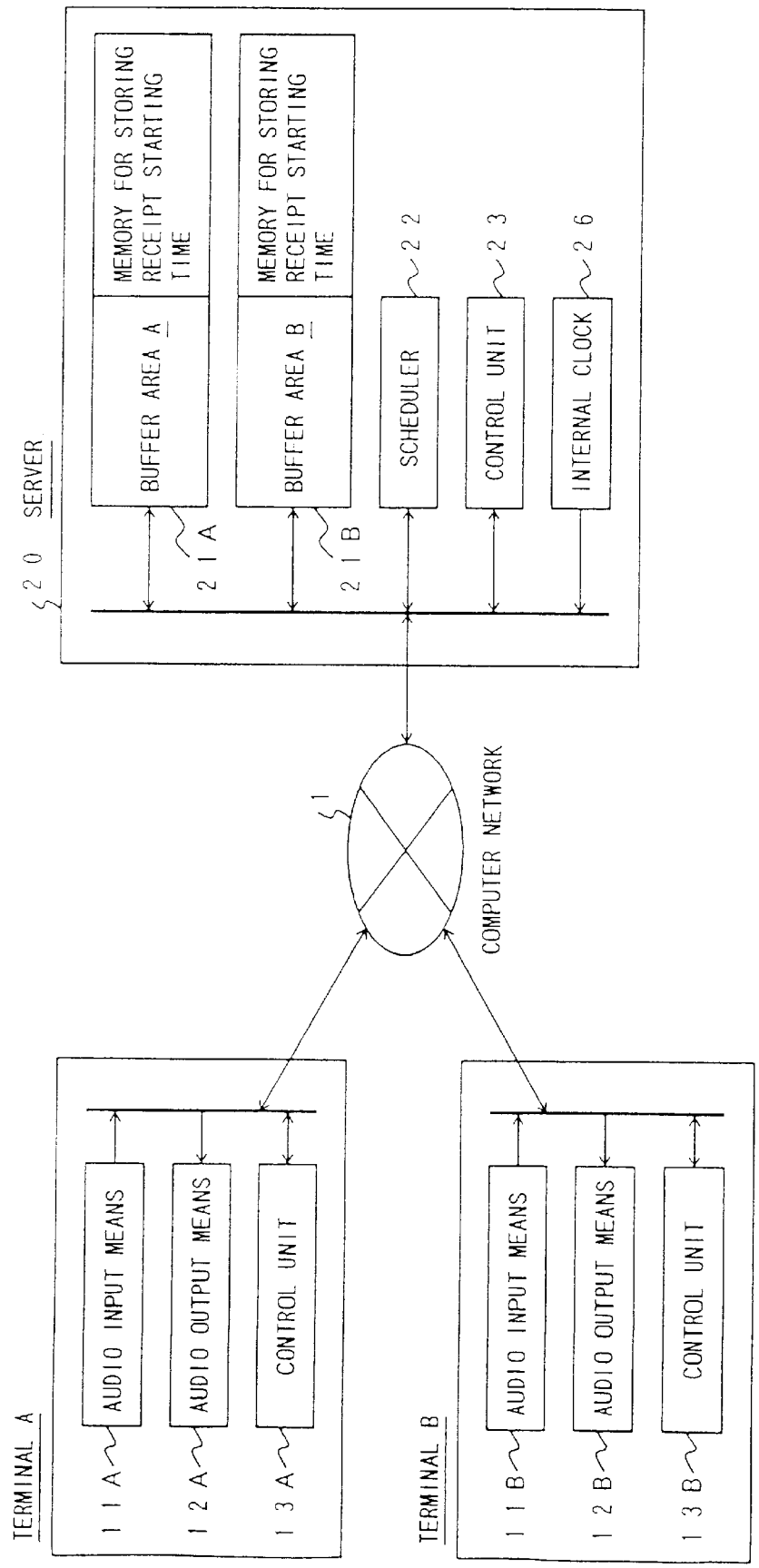
FIG. 4 is a principle view showing still further another aspect of the present invention.
Figure 5:
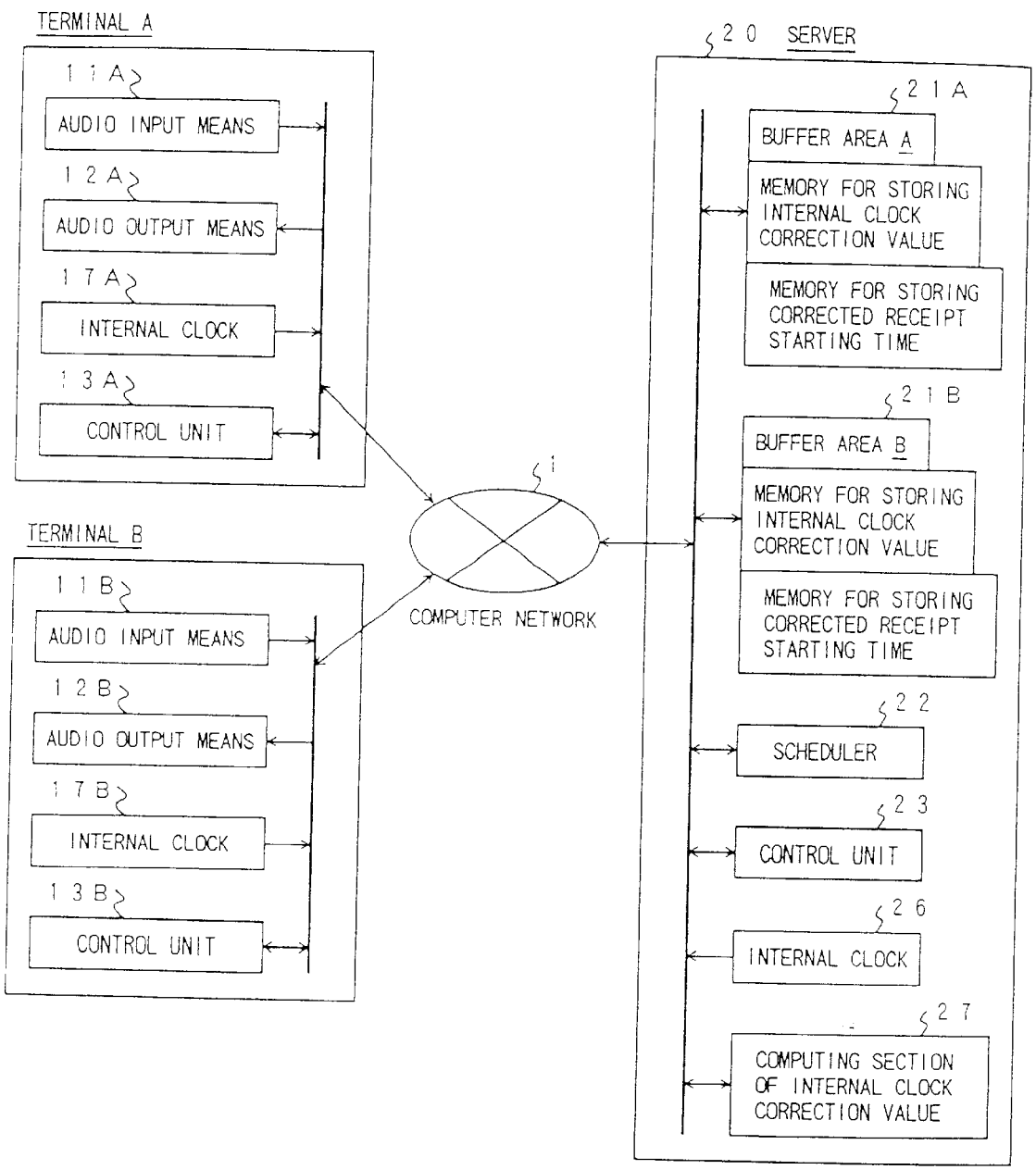
FIG. 5 is a principle view showing still further another aspect of the present invention.
Figure 6:
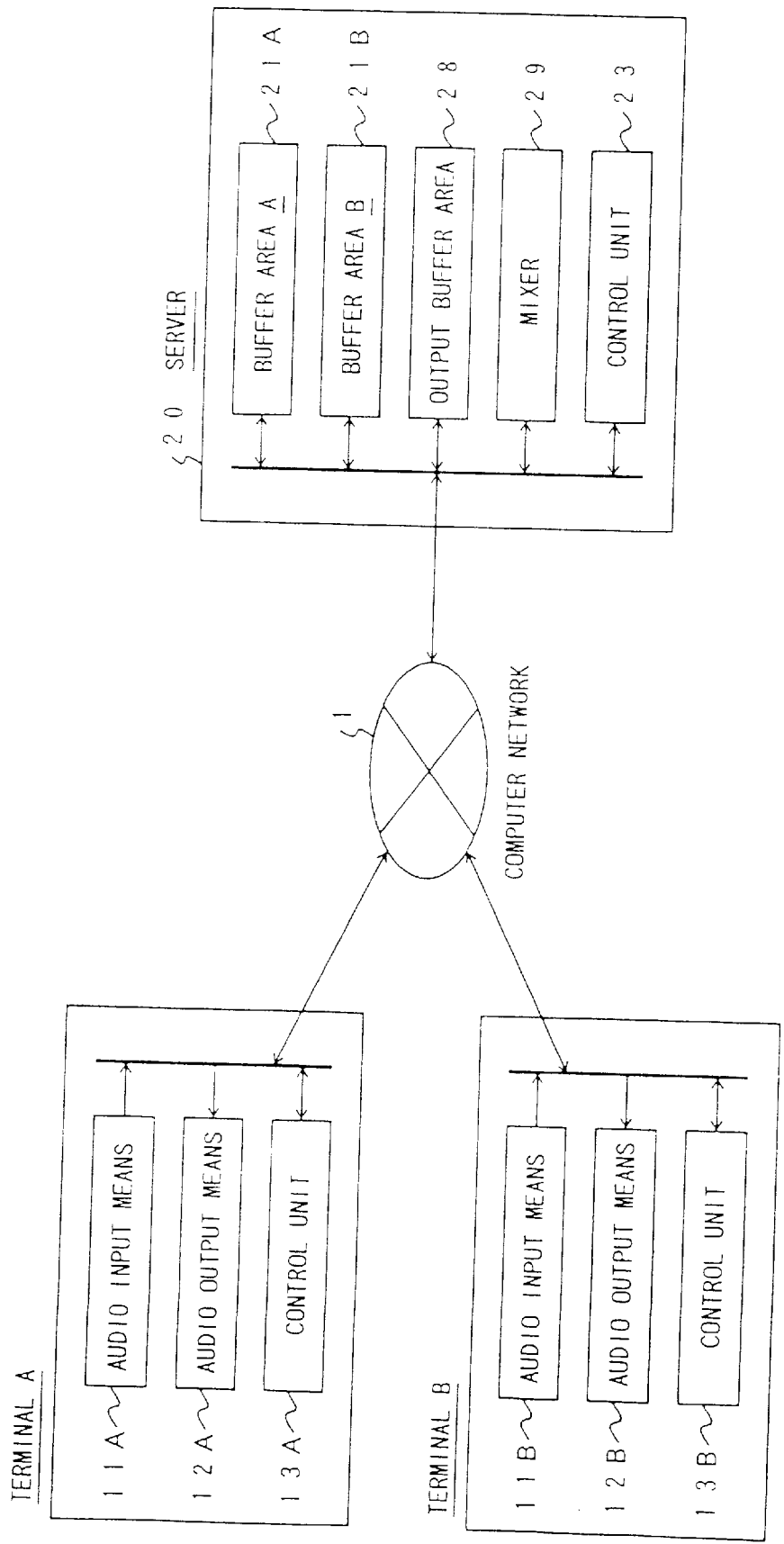
FIG. 6 is a principle view showing still further another aspect of the present invention.
Figure 7:
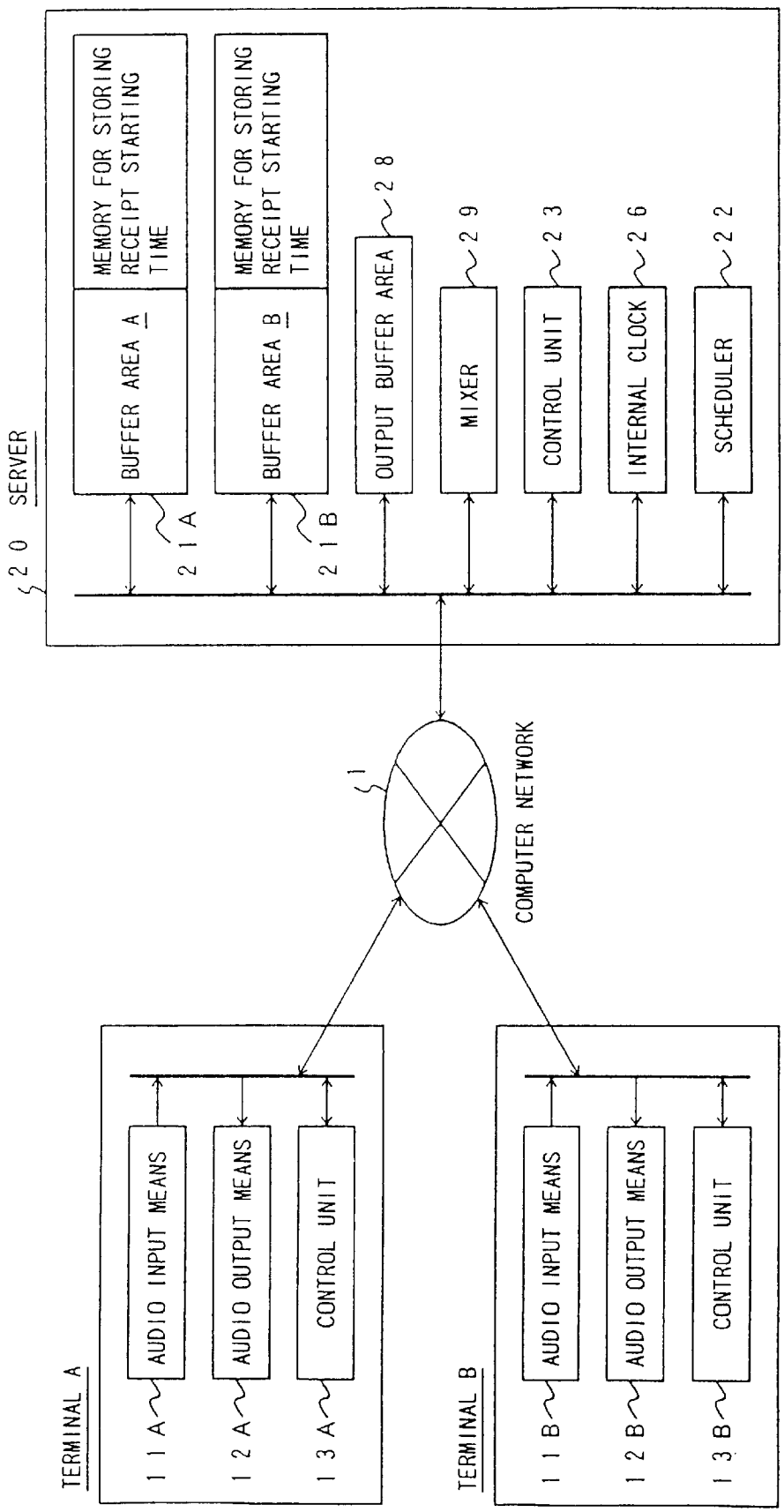
FIG. 7 is a principle view showing still further another aspect of the present invention.
Figure 8:
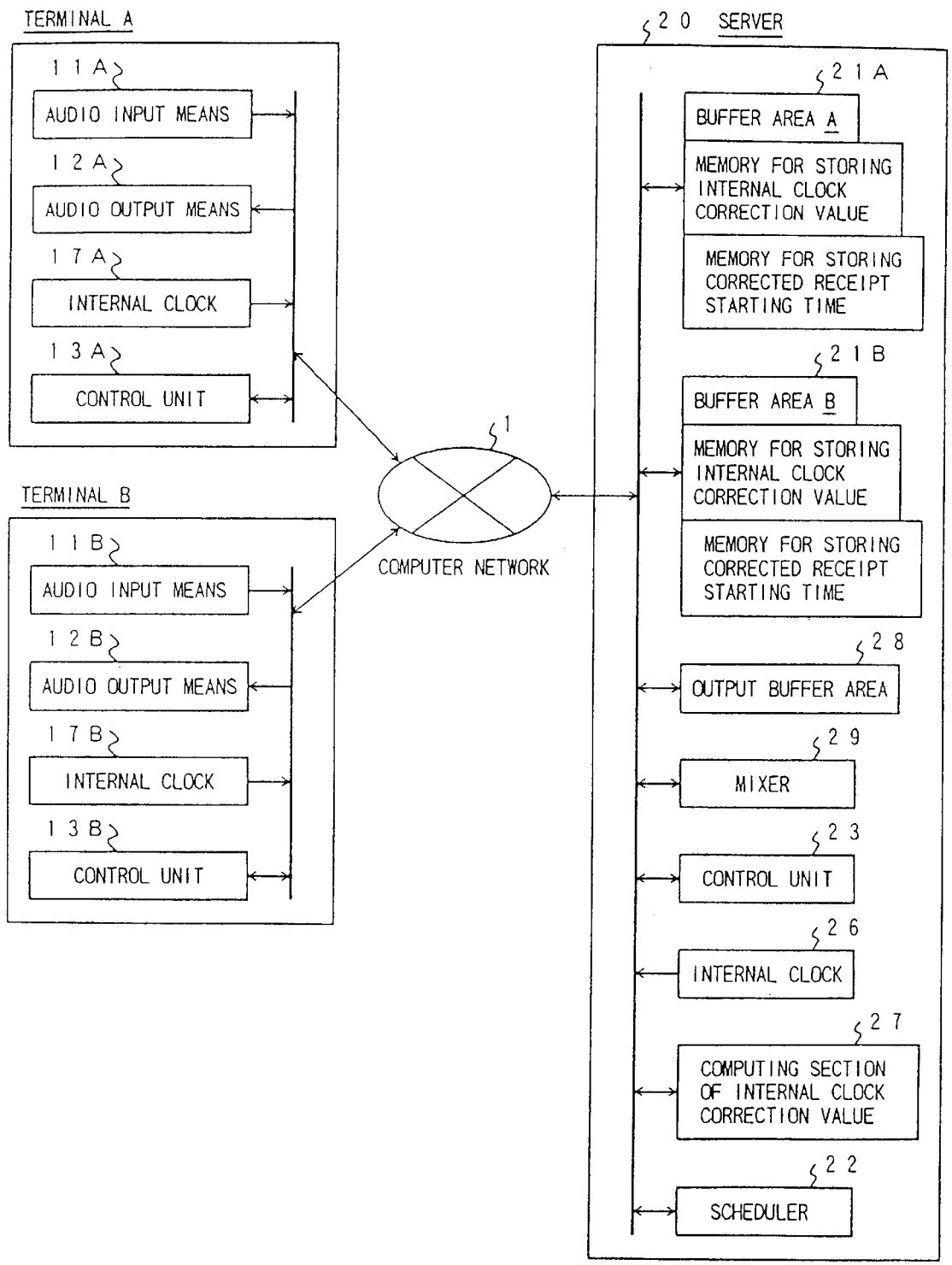
FIG. 8 is a principle view showing still further another aspect of the present invention.
Figure 9:
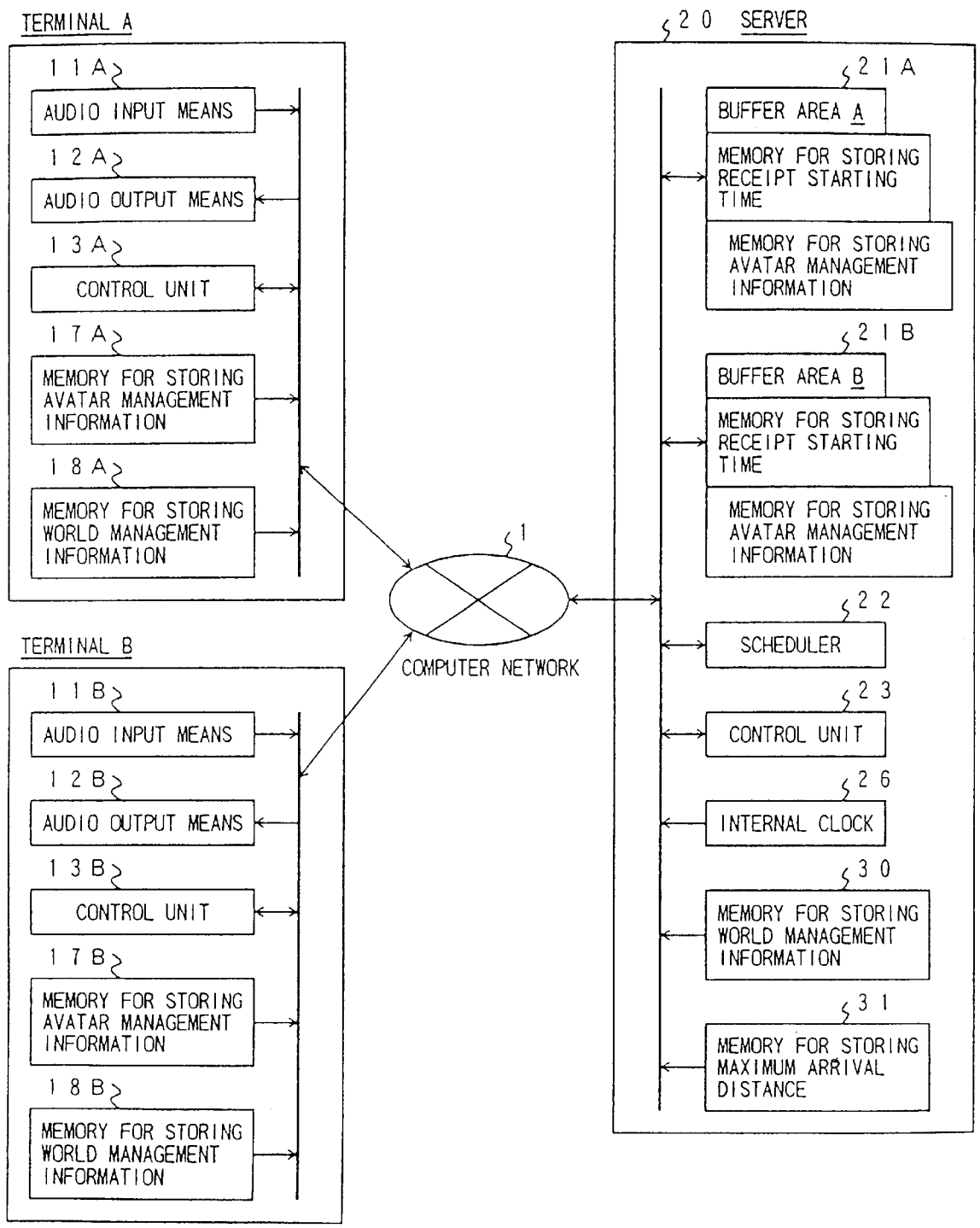
FIG. 9 is a principle view showing still further another aspect of the present invention.
Figure 10:
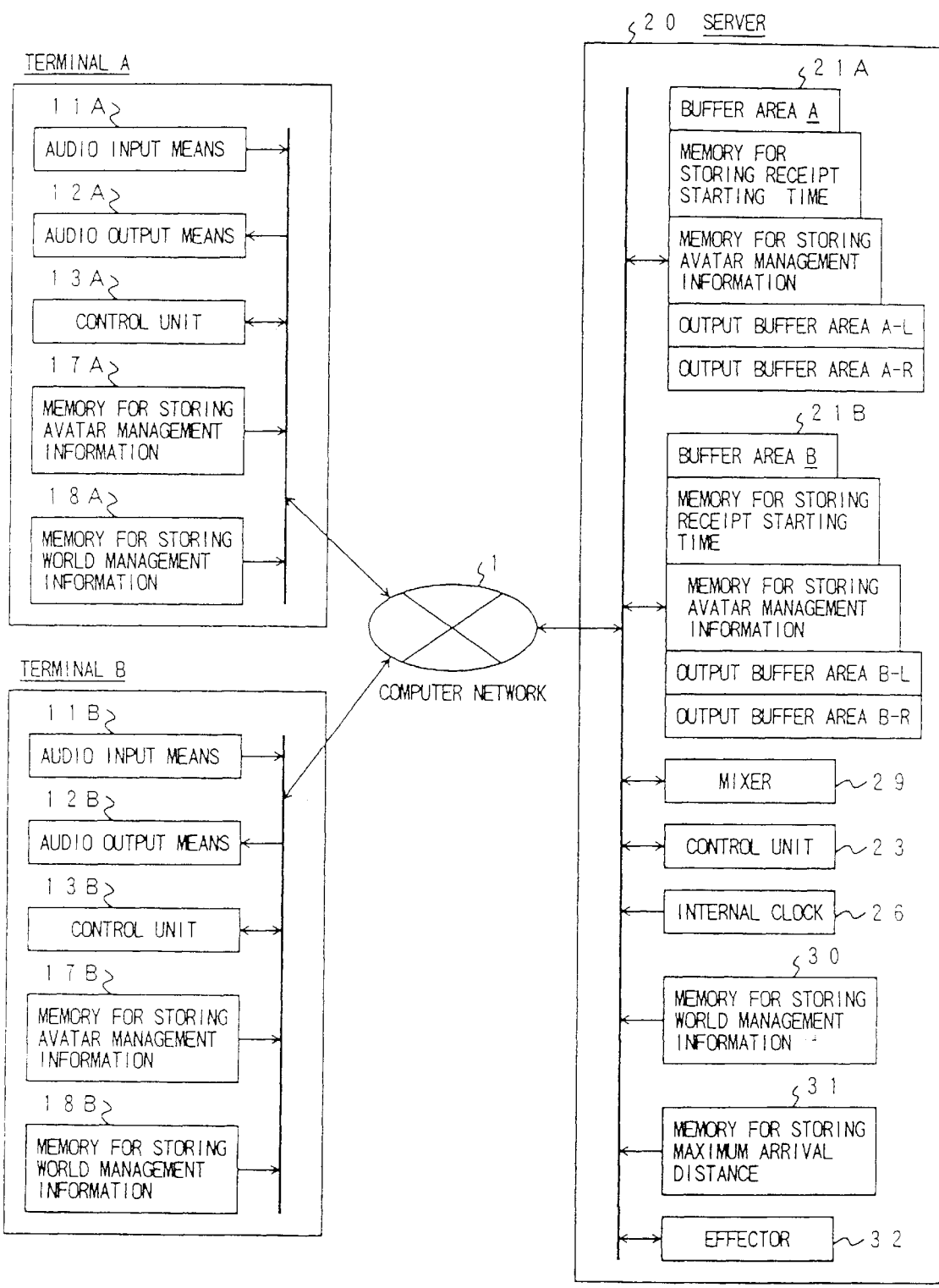
FIG. 10 is a principle view showing still further another aspect of the present invention.
Figure 11:
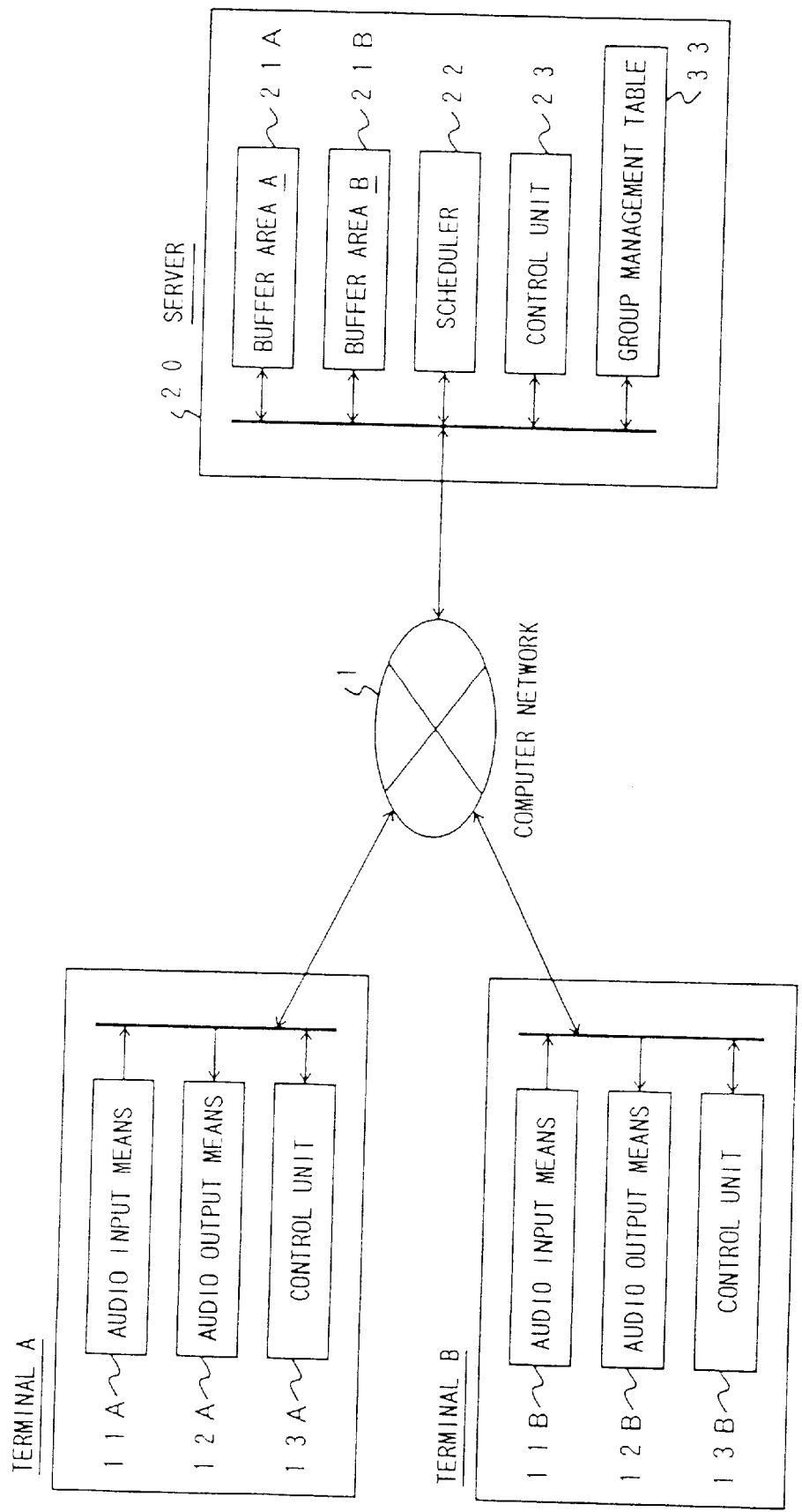
FIG. 11 is a principle view showing still further another aspect of the present invention.
Figure 12:
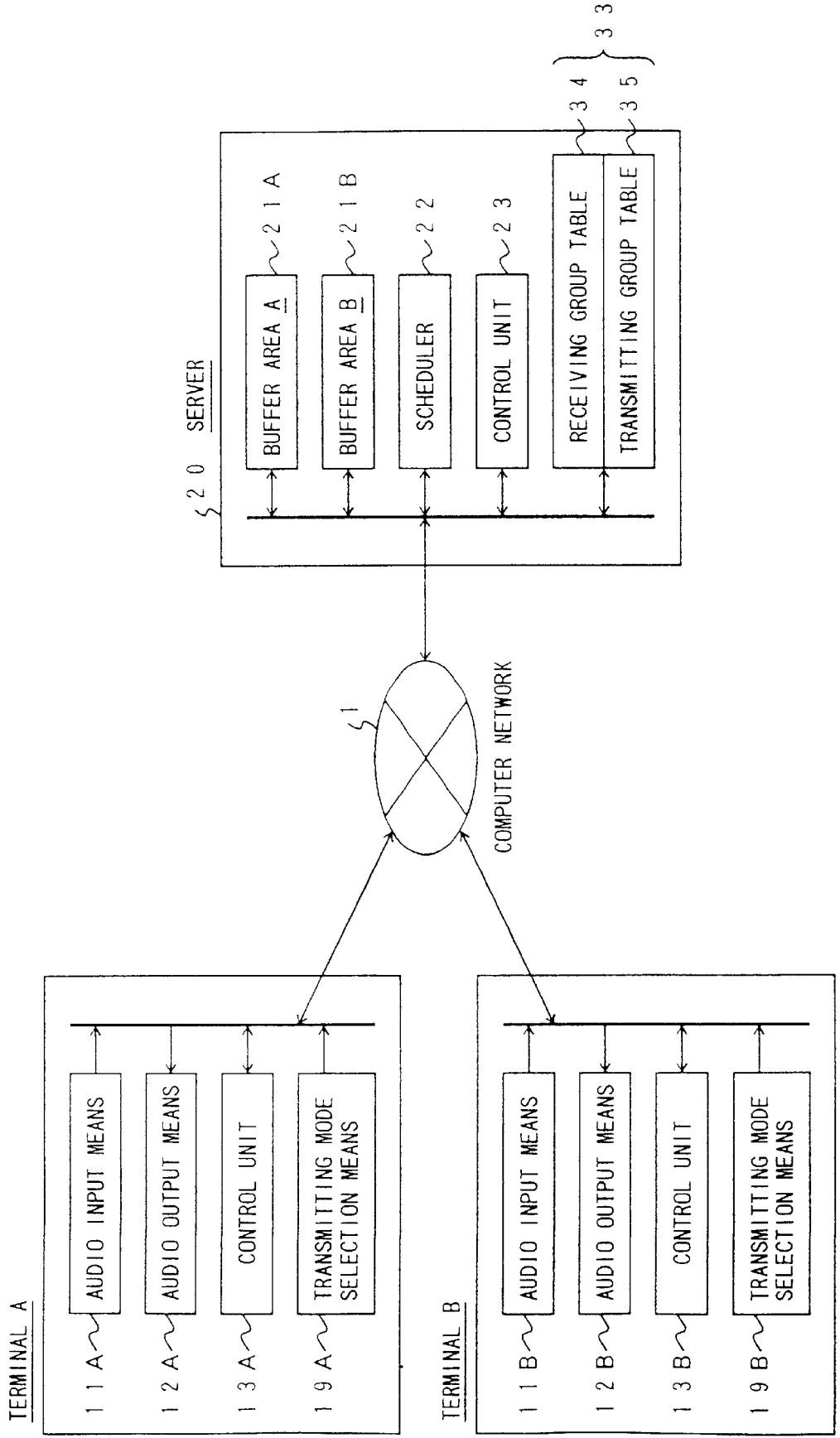
FIG. 12 is a principle view showing still further another aspect of the present invention.
Figure 13:
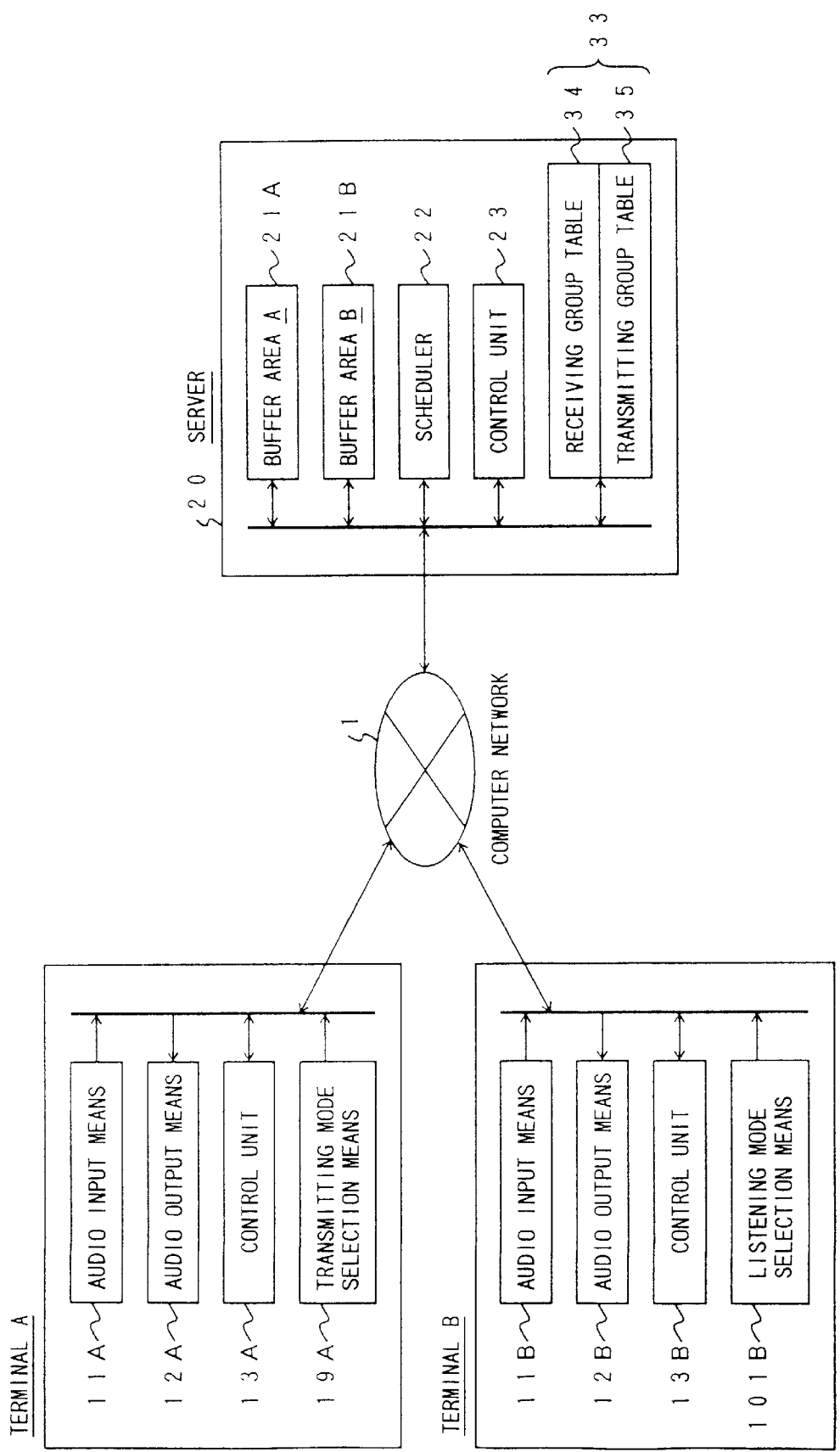
FIG. 13 is a principle view showing still further another aspect of the present invention.
Figure 14:
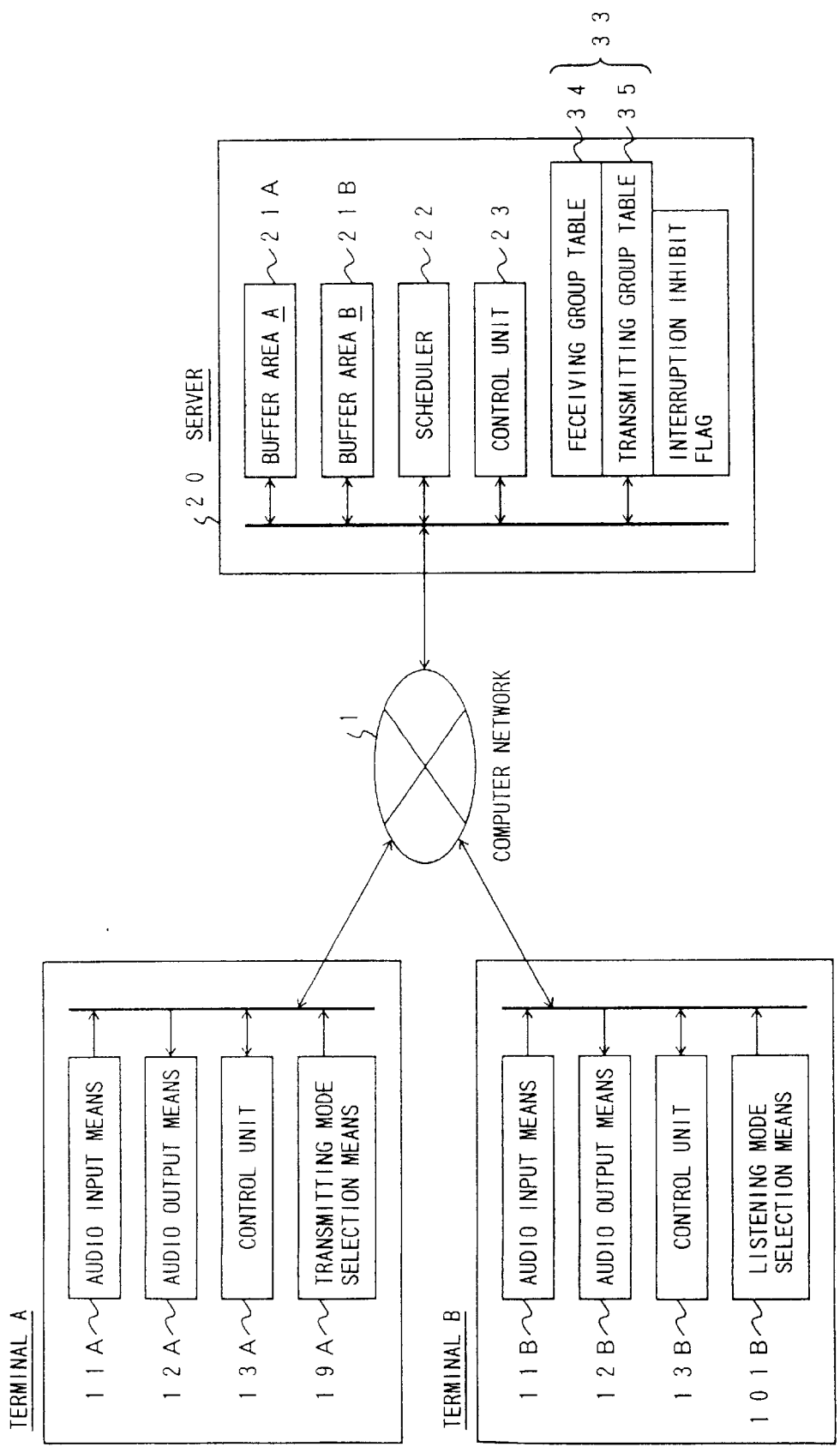
FIG. 14 is a principle view showing still further another aspect of the present invention.
Figure 15:
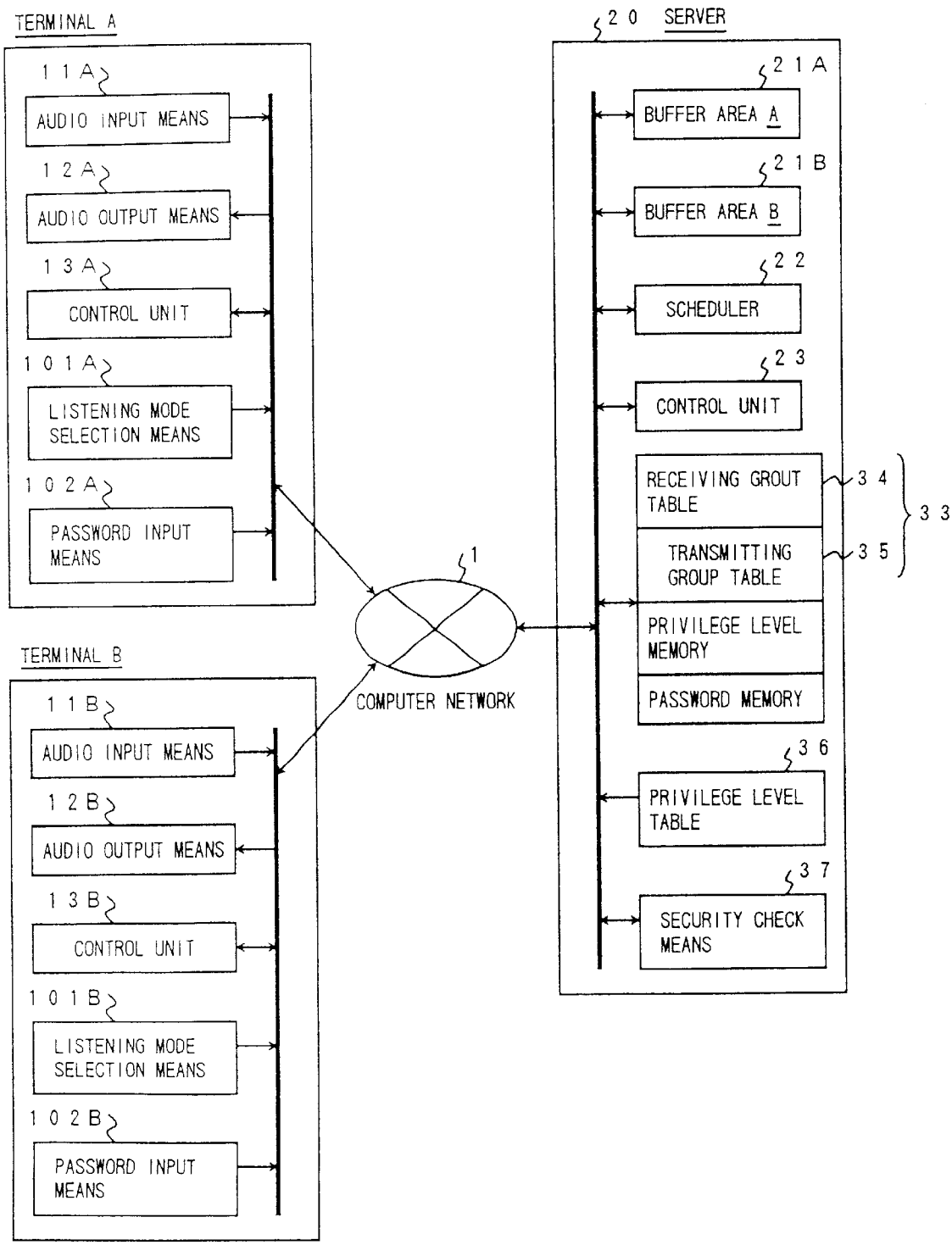
FIG. 15 is a principle view showing still further another aspect of the present invention.
Figure 16:
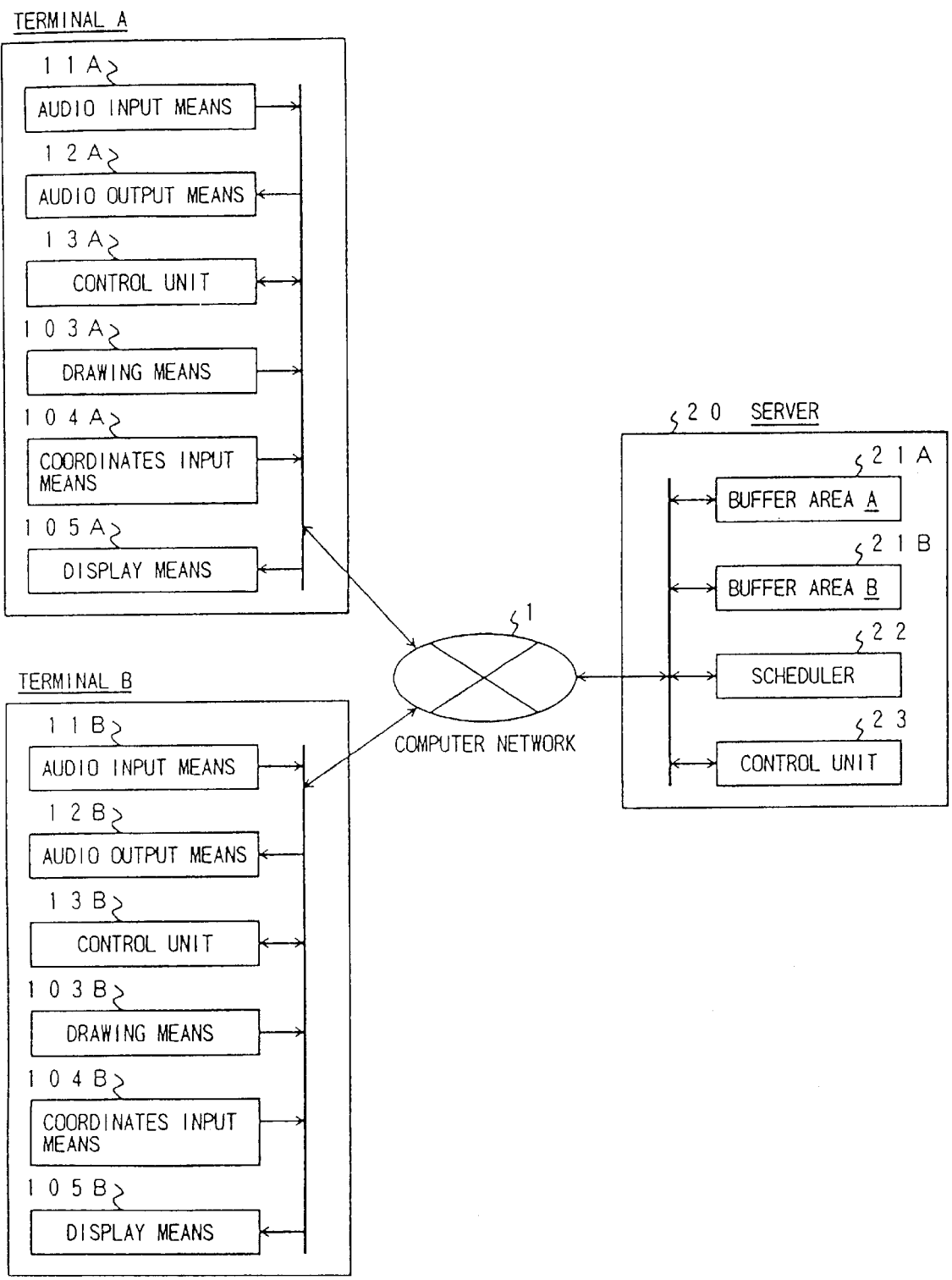
FIG. 16 is a principle view showing still further another aspect of the present invention.
Figure 17:
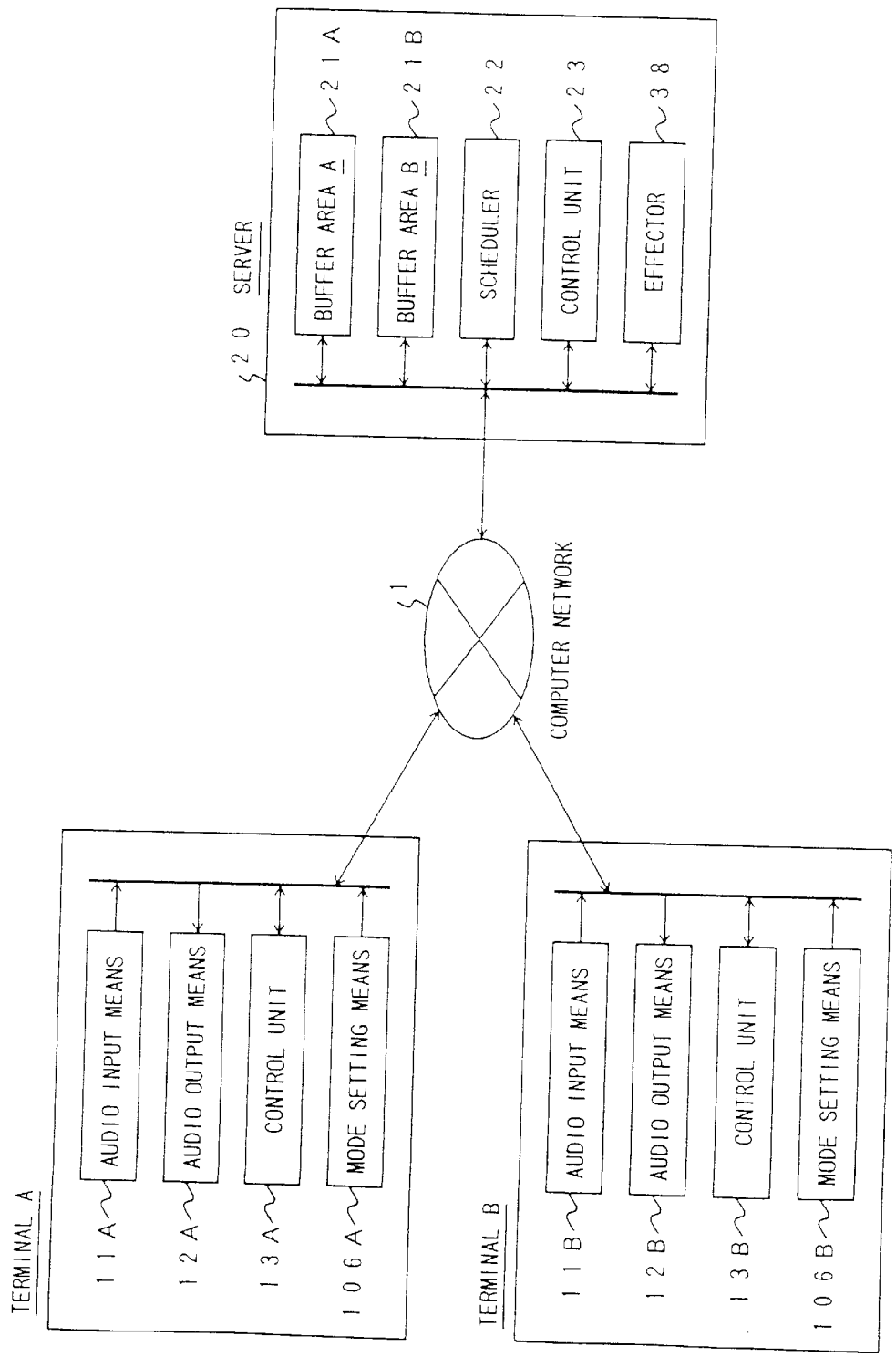
FIG. 17 is a principle view showing still further another aspect of the present invention.
Figure 18:
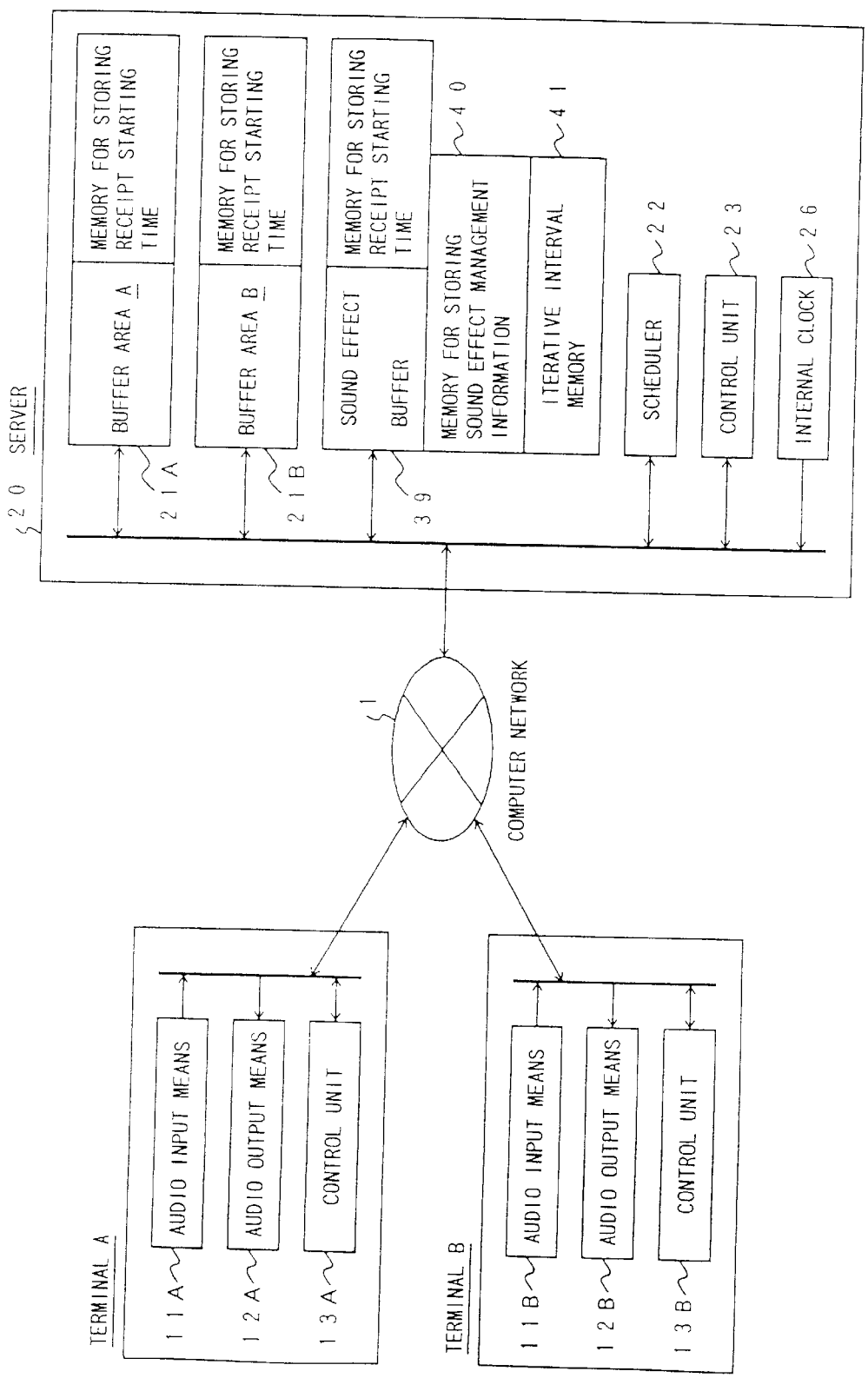
FIG. 18 is a principle view showing still further another aspect of the present invention.
Figure 19:
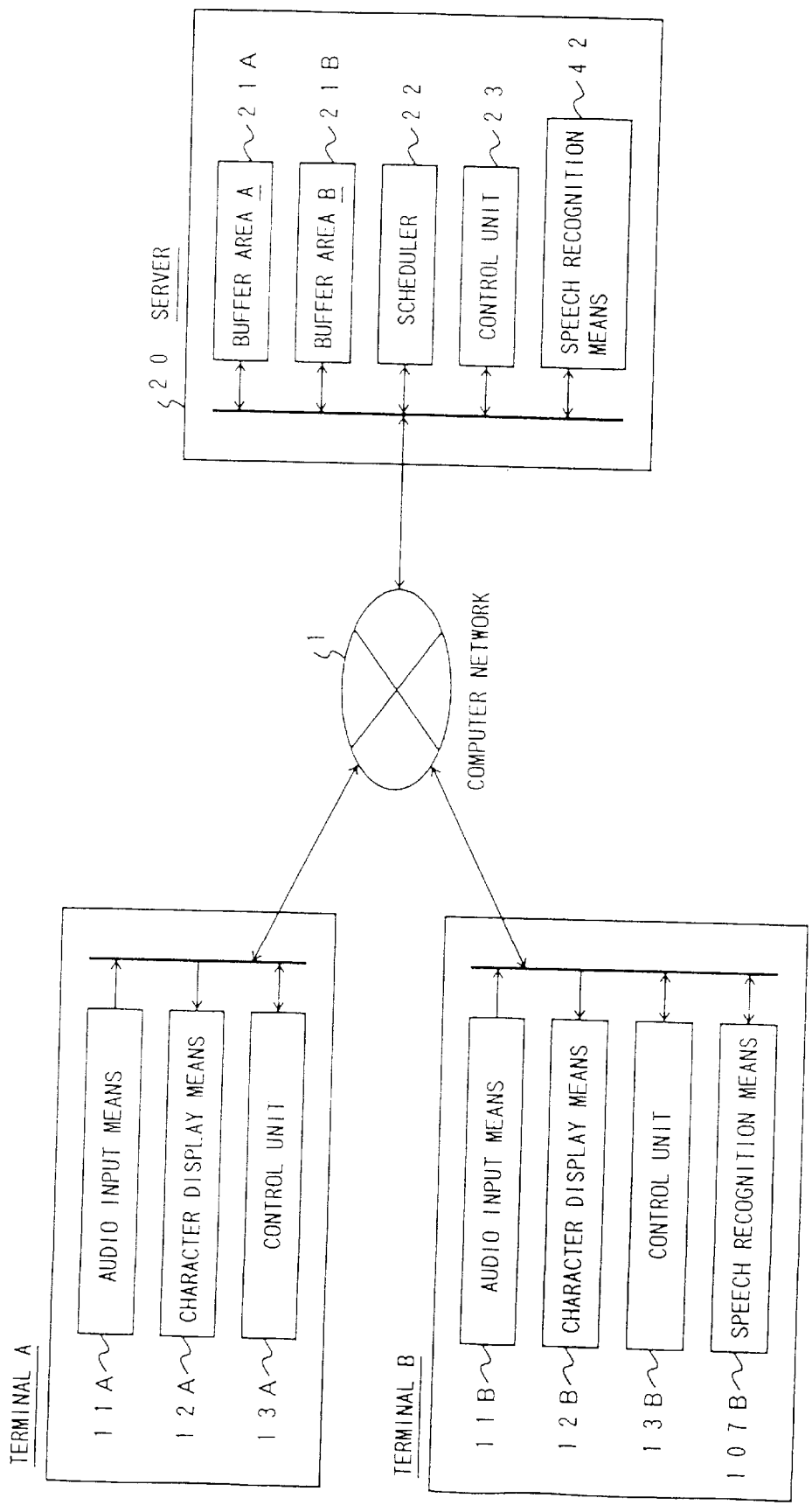
FIG. 19 is a principle view showing still further another aspect of the present invention.
Figure 20:
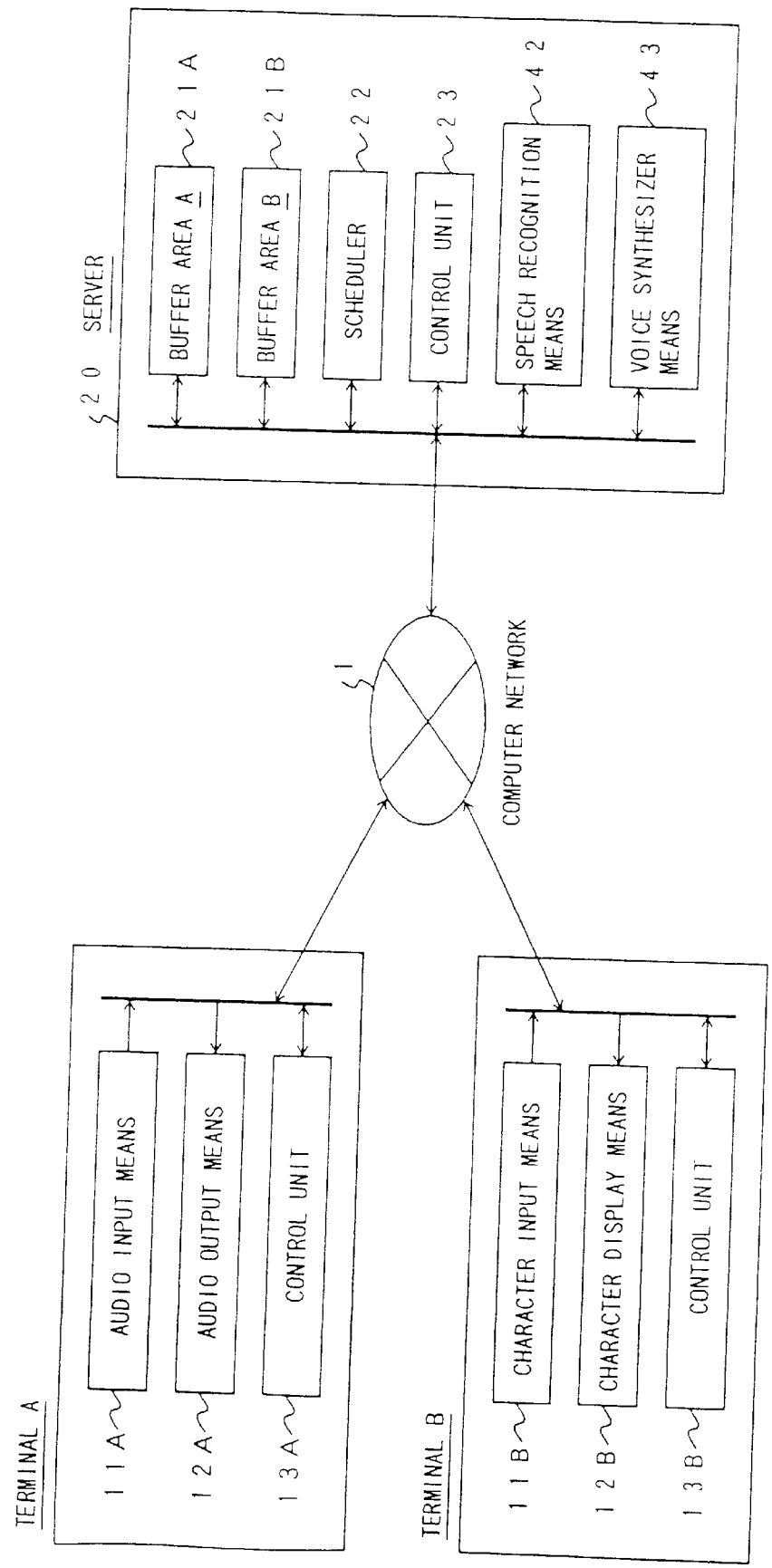
FIG. 20 is a principle view showing still further another aspect of the present invention.
Figure 21:
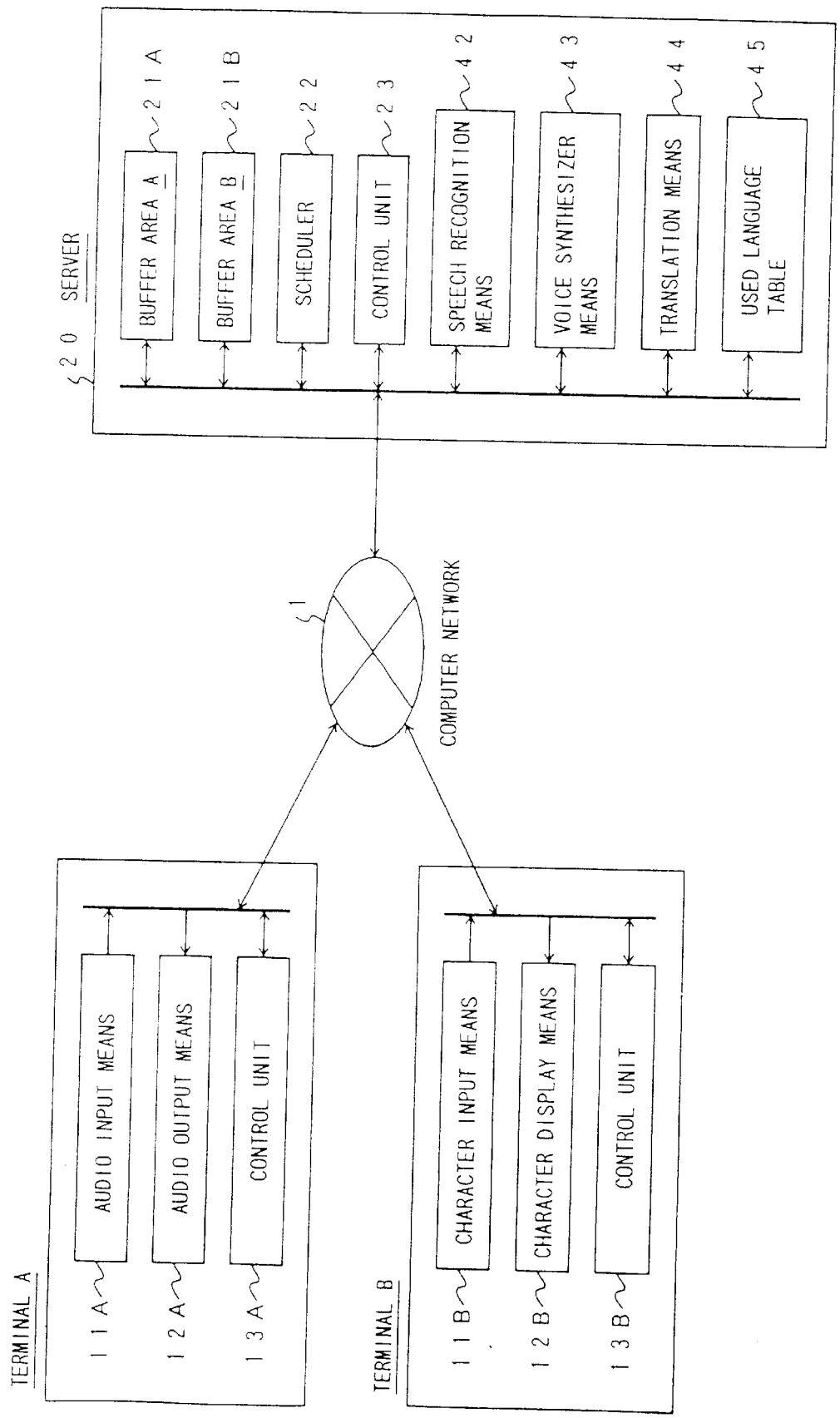
FIG. 21 is a principle view showing still further another aspect of the present invention.
Figure 22:
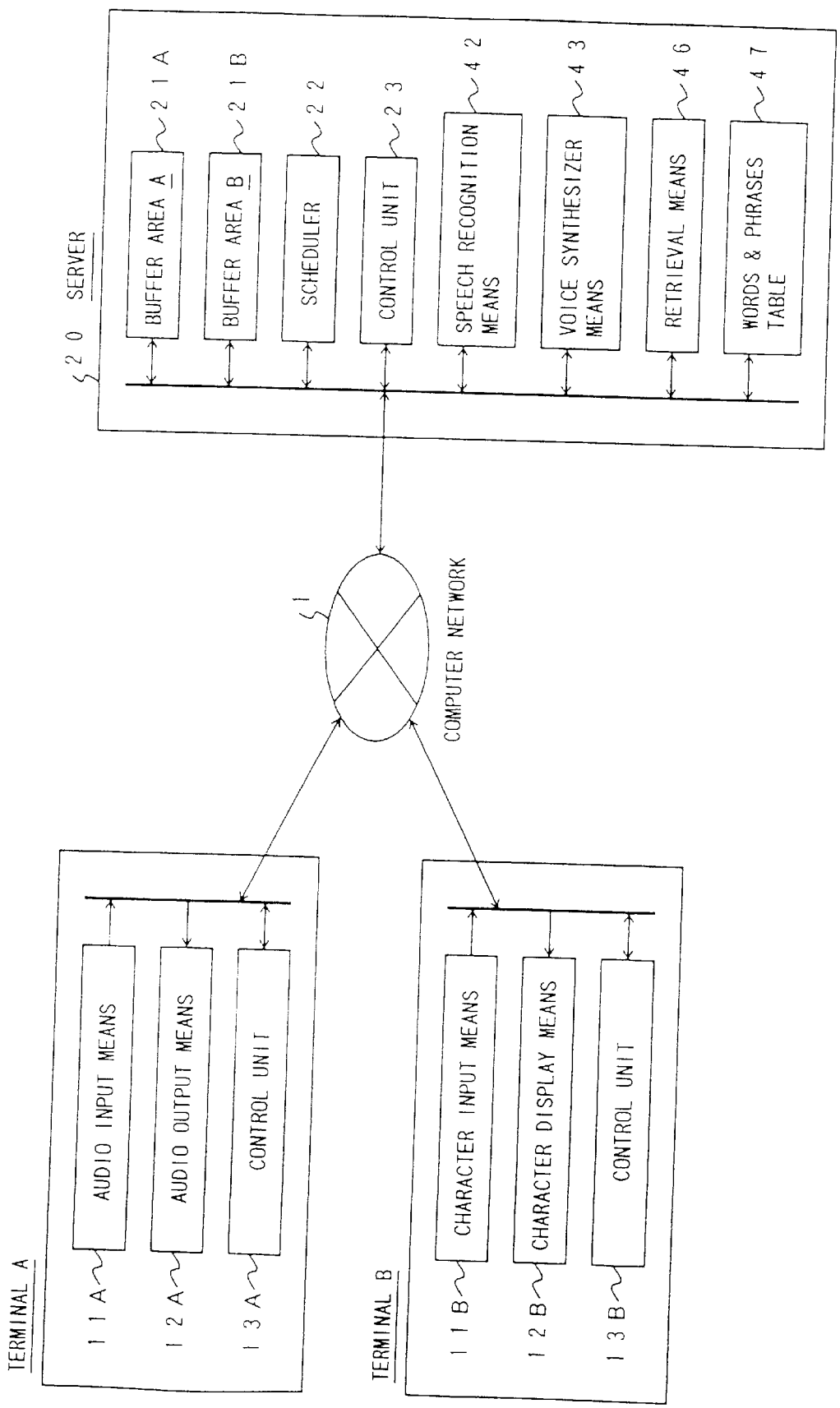
FIG. 22 is a principle view showing still further another aspect of the present invention.
Figure 23:
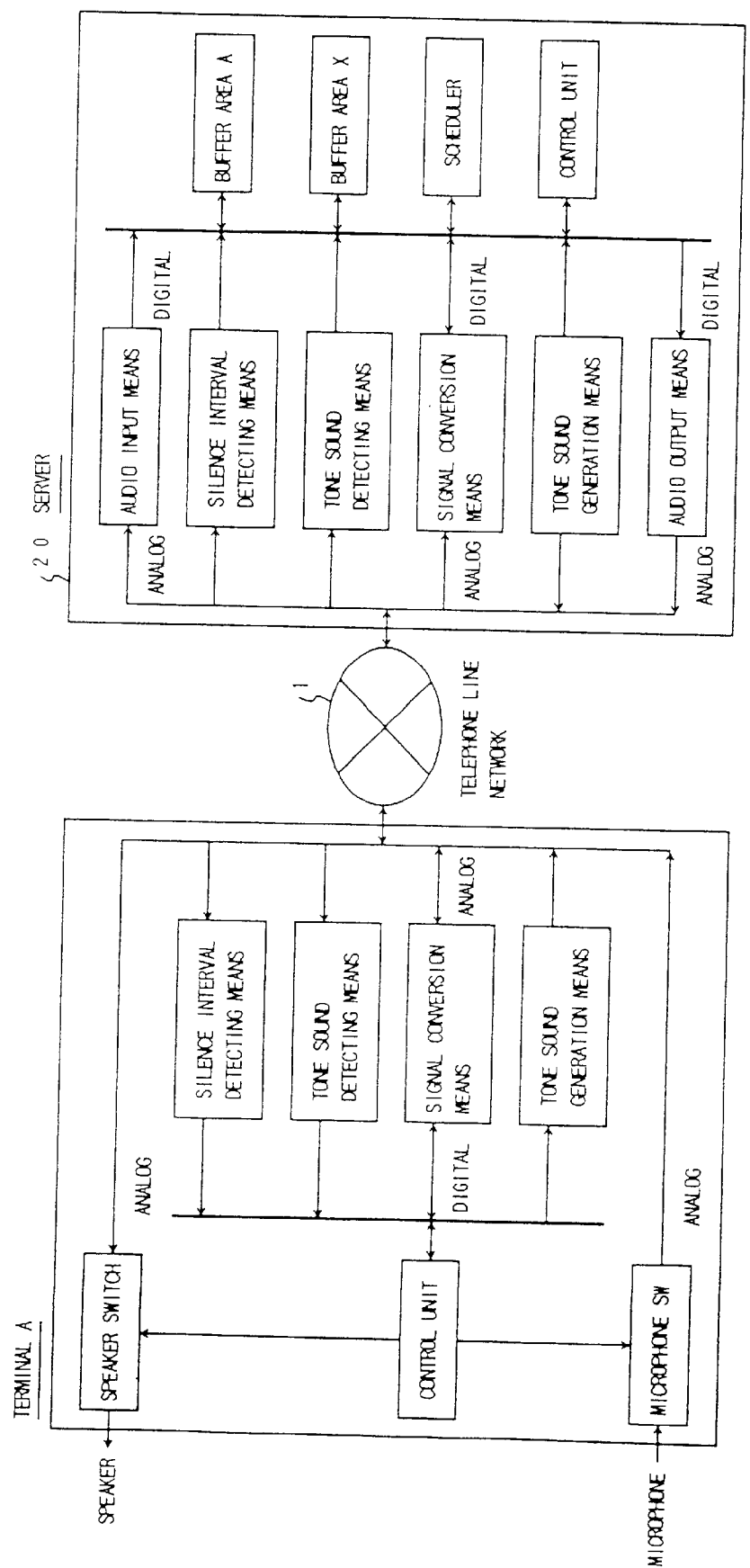
FIG. 23 is a principle view showing still further another aspect of the present invention.
Figure 24:
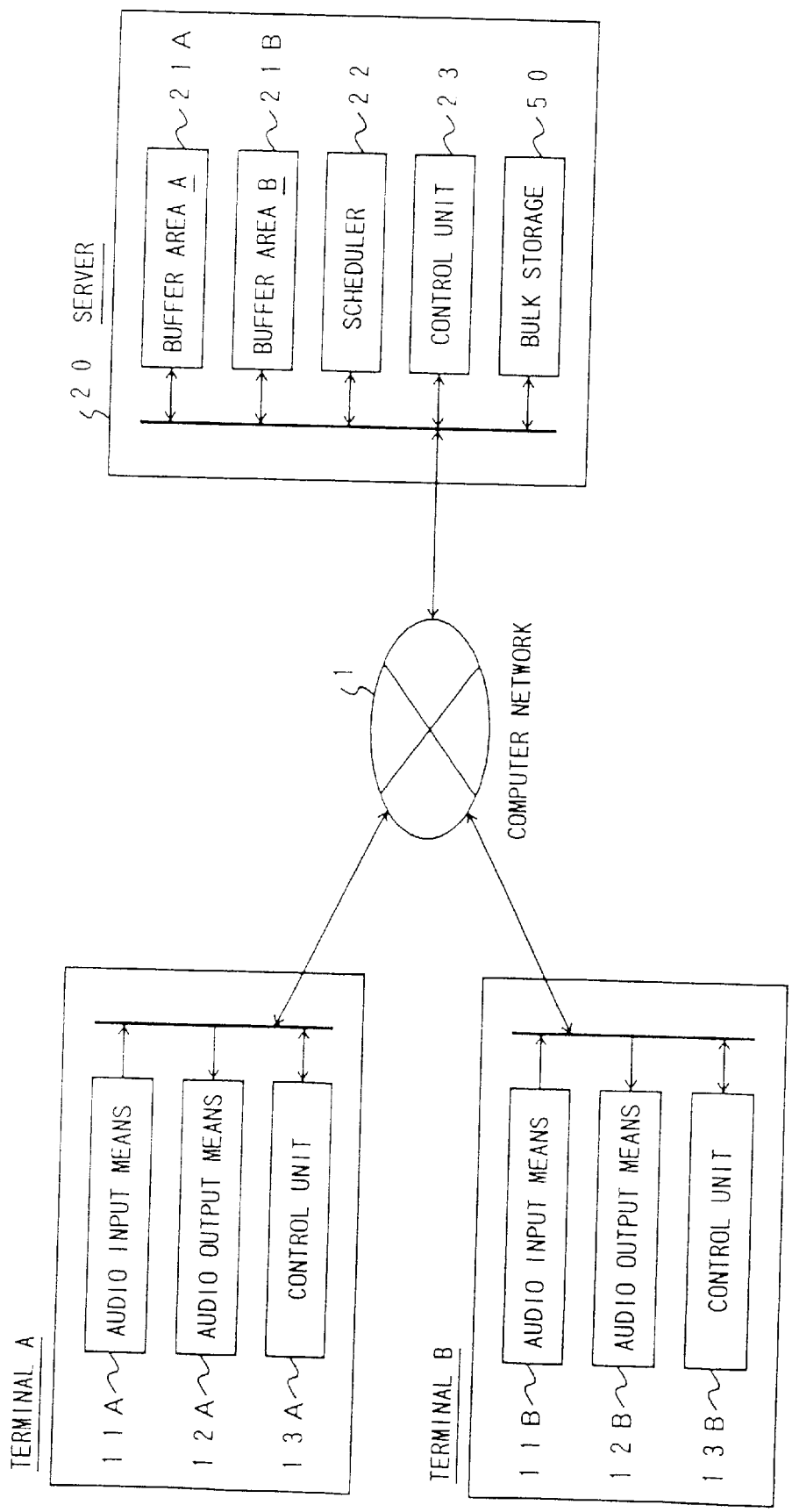
FIG. 24 is a principle view showing still further another aspect of the present invention.
Figure 25:
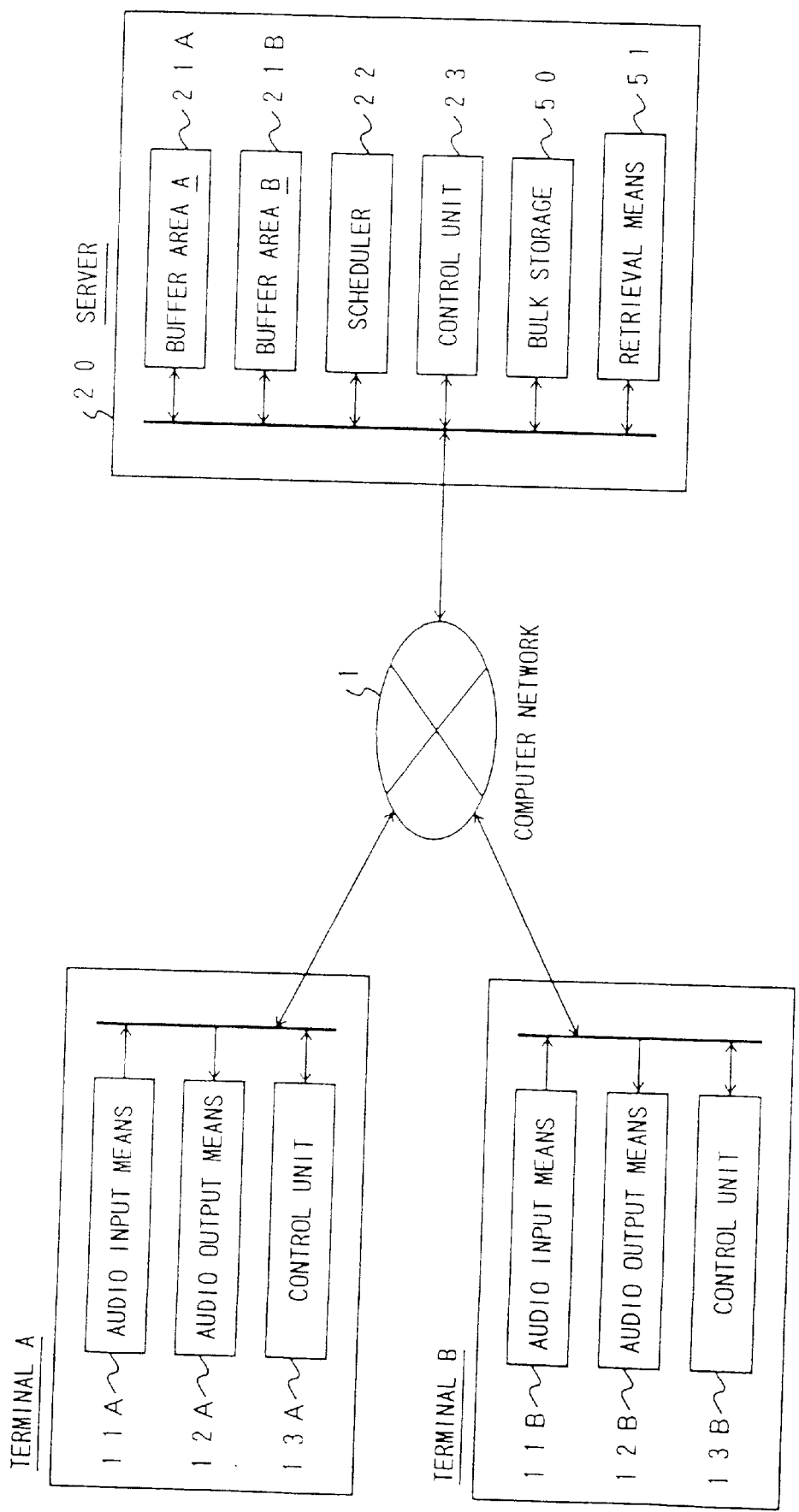
FIG. 25 is a principle view showing still further another aspect of the present invention.
Figure 26:
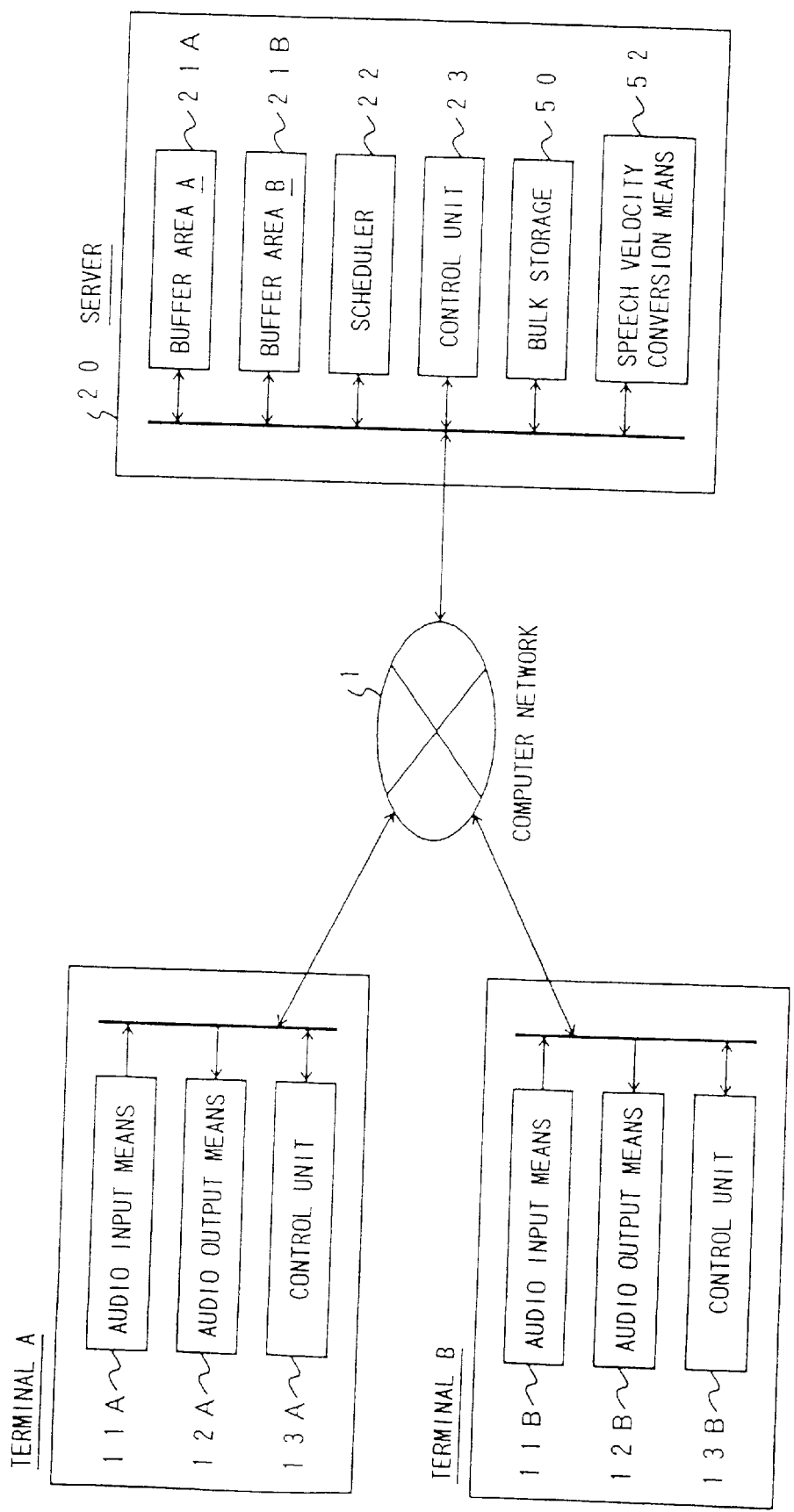
FIG. 26 is a principle view showing still further another aspect of the present invention.
Figure 27:
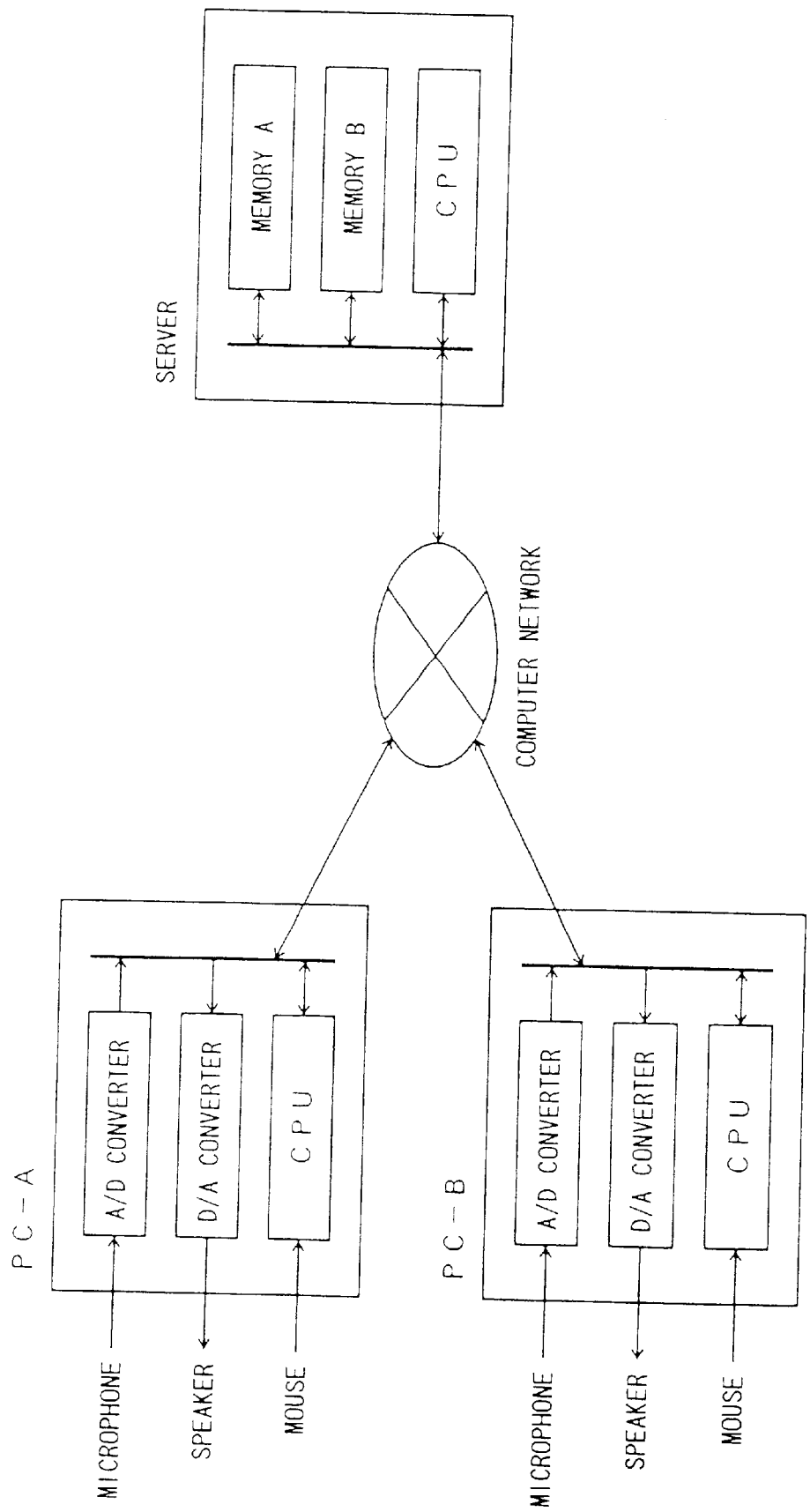
FIG. 27 is a block diagram of an audio interactive system according to the first embodiment of the present invention.

FIG. 27 is a block diagram of an audio interactive system according to the first embodiment of the present invention.

In the present embodiment, a mouse is used to instruct start and stop of the speech. While a mouse button is being depressed, an input entered through a microphone is subjected to a sampling process and an A/D conversion process as well. The digital data thus generated is transmitted to a server together with a user ID and a terminal ID in form of a packet in units of 256 bytes for example. When the mouse button is released, a packet is transmitted together with a data termination flag to the server. Speech issued from another terminal, which is distributed from the server, is supplied to a D/A converter to be converted into voice and then applied to a speaker.

A server control unit is implemented by a CPU and provides such a control that speeches are temporarily stored in buffer memories (memory A, memory B) for the associated terminals, respectively, referring to terminal IDs of data transmitted from the respective terminals. There are prepared the buffer memories of which number is the same as that of the connected terminals. The server control unit serves to distribute the speech on the buffer memory indicated by a scheduler to the respective terminal.

The scheduler is implemented by a CPU and serves to determine an order of distribution of the speech data stored in the buffer memories to the terminals in accordance with a certain course. For example, time in which the first packet of the speech from the terminal is received, is stored in the associated buffer memory. If there is a speech which has been transmitted from the terminal and not yet distributed, the scheduler instructs the control unit to distribute the remaining speech to the terminal. If there are a plurality of speeches not yet distributed, the scheduler instructs the control unit to select and distribute the oldest one in the received time, of those speeches.

Figure 28:
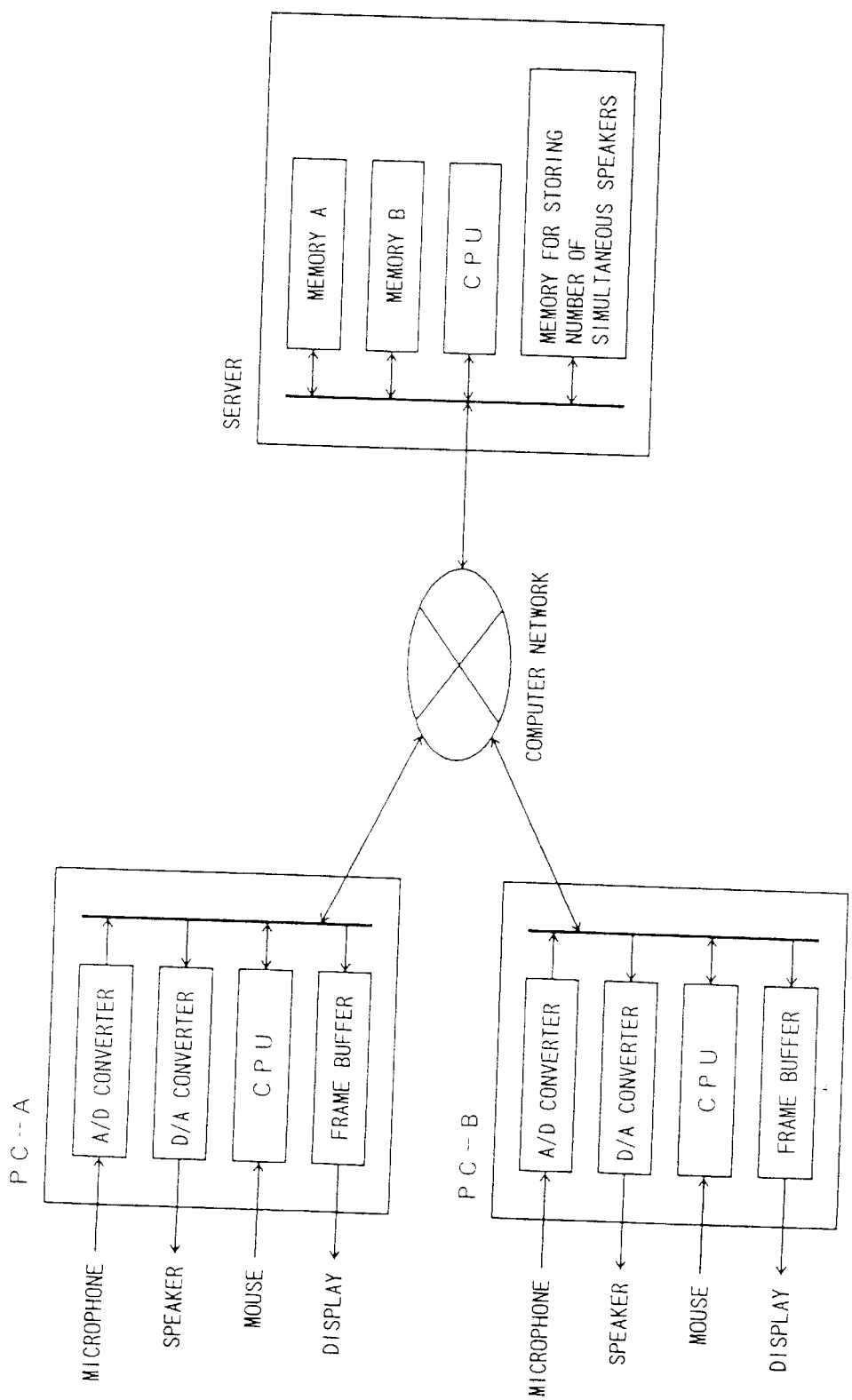
FIG. 28 is a block diagram of an audio interactive system according to the second embodiment of the present invention.

FIG. 28 is a block diagram of an audio interactive system according to the second embodiment of the present invention.

The present embodiment may be arranged in a similar fashion to that of the first embodiment shown in FIG. 27, but different in the point that the server incorporates thereinto a memory for storing a number of simultaneous speakers. According to the present embodiment, a mouse is used to inform a speech requirement and a speech termination. A speech allowance informing means is implemented by a display. A speech requirement to the server is performed through click of a speech requirement button by the mouse. Upon receipt of allowance from the server, the indication of the speech requirement button is switched to "speech allowance". Hereinafter, it is similar to the first embodiment. While a mouse button is being depressed, an input entered through a microphone is subjected to a sampling process and an A/D conversion process as well. The digital data thus generated is transmitted to a server together with a user ID and a terminal ID in form of a packet in units of 256 bytes for example. When the mouse button is released, a packet is transmitted together with a data termination flag to the server. Speech issued from another terminal, which is distributed from the server, is supplied to a D/A converter to be converted into voice and then applied to a speaker.

A server control unit is implemented by a CPU and provides such a control that speeches are temporarily stored in buffer memories for the associated terminals, respectively, referring to terminal IDs of data transmitted from the respective terminals. There are prepared the buffer memories of which number is the same as that of the connected terminals. The server control unit serves to distribute the speech on the buffer memory indicated by a scheduler to the respective terminal.

The scheduler is implemented by a CPU and serves to determine an order of distribution of the speech data stored in the buffer memories to the terminals in accordance with a certain course. For example, time in which the first packet of the speech from the terminal is received, is stored in the associated buffer memory. If there is a speech which has been transmitted from the terminal and not yet distributed, the scheduler instructs the control unit to distribute the remaining speech to the terminal. If there are a plurality of speeches not yet distributed, the scheduler instructs the control unit to select and distribute the oldest one in the received time, of those speeches.

A simultaneous speaker number management means is implemented by a simultaneous speaker number memory. When the server receives speech requirement from the terminal, the server confirms the numerical value stored in the simultaneous speaker number memory. If the numerical value is 1 or more, the server gives a notice of allowance for the terminal, and the numerical value is reduced by 1. If the numerical value is already 0, the server waits until a notice of speech termination arrives from some terminal.

In the terminal ends, upon receipt of a notice of allowance, it is informed the users through speech allowance displays that they are allowed to make speeches. After the users confirm the display, they start the speeches through depressing the mouse button, and after termination of their speeches, they inform the server 20 of termination of their speeches through releasing the mouse button.

In the server end, upon receipt of a notice of termination of the speeches, the numerical value stored in the simultaneous speaker number memory is increased by 1.

Figure 29:
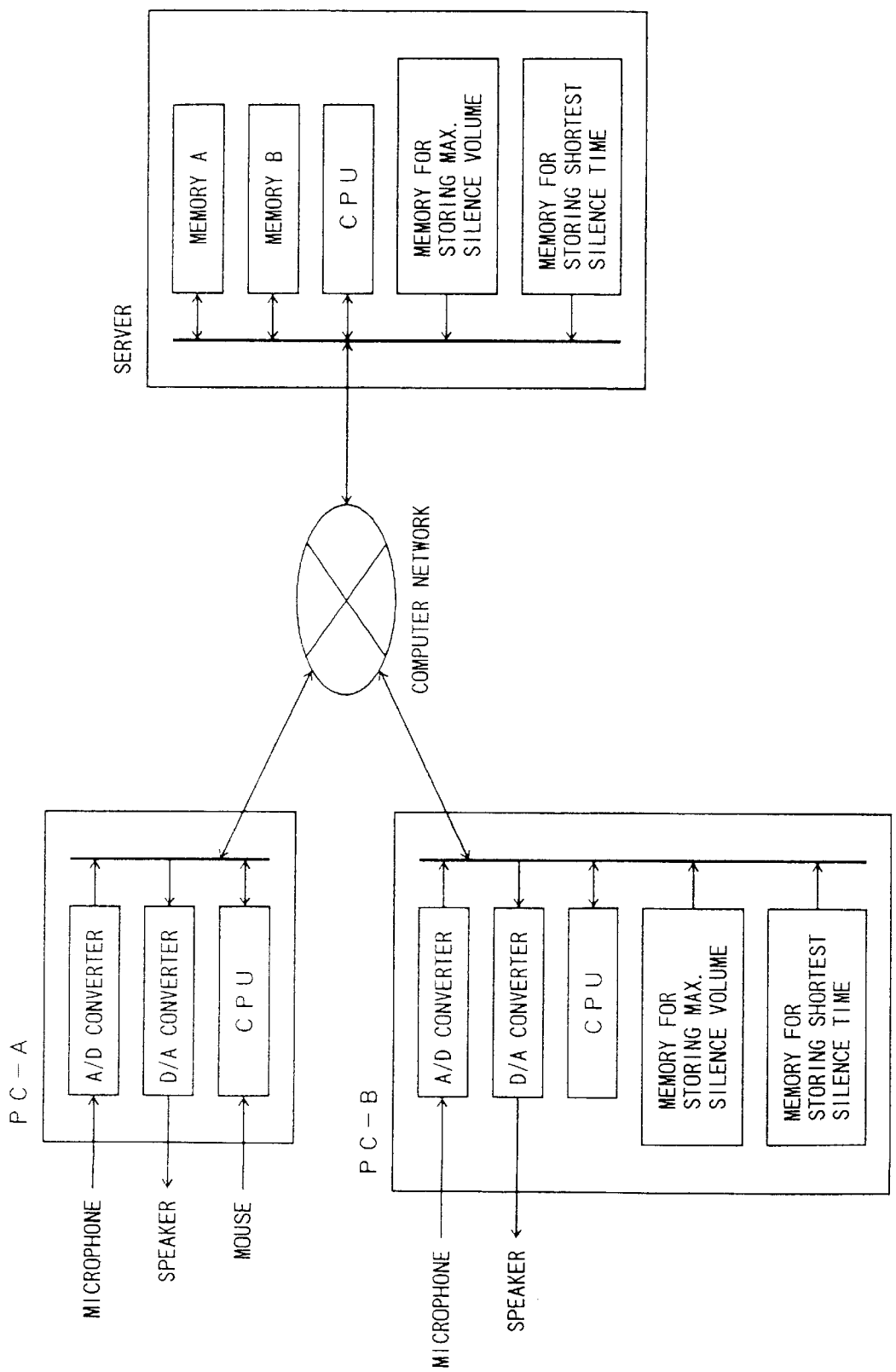
FIG. 29 is a block diagram of an audio interactive system according to the third embodiment of the present invention.

FIG. 29 is a block diagram of an audio interactive system according to the third embodiment of the present invention.

The present embodiment may be arranged in a similar fashion to that of the first embodiment shown in FIG. 27, but different in the point that there are provided a silence detection means, a memory for storing a maximum silence volume and a memory for storing the shortest silence time. The silence detection means is implemented by a CPU in which the absolute value of PCM data stored in the buffer memory is investigated to measure a sound volume. If the term in which the sound volume is smaller than a predetermined value "maximum silence volume" is longer than a predetermined time "shortest silence time", the speech is partitioned at the portion in which the sound volume is first below the maximum silence volume.

The server control unit distributes to the terminal the speech stored in the buffer memory indicated by the scheduler. At that time, the server control unit calls the silence detection means. If it is determined that the speech is of the silence, the distribution of the speech is temporarily stopped at that time point, and then the portion over the maximum silence volume, skipping the silence interval, is adopted as leading of the speech. The associated time is stored in the buffer memory.

With respect to other processing, it is similar to that of the first embodiment.

Another embodiment of the terminal end is illustrated in FIG. 29 with a PC-B of terminal. According to this embodiment, in a similar fashion to the above-mentioned detecting scheme for the silence, but not to instruct start and termination of the speech through the mouse button, the input entered from the microphone is always subjected to an A/D conversion, and the starting point and the terminating point of the speech are detected in accordance with the PCM output data.

The silence detection means is implemented by a CPU in which the absolute value of PCM output data resultant from the A/D conversion is investigated to measure a sound volume. If the sound volume becomes larger than a predetermined value "maximum silence quantity", it is interpreted that the speech starts at that point, and data are in turn transmitted to the server. Further, if the term in which the sound volume of the PCM output data is smaller than a predetermined value "maximum silence volume" is longer than a predetermined time "shortest silence time", the portion in which the sound volume is first below the maximum silence volume is regarded as the terminating point of the speech, and a packet is transmitted together with a data termination flag to the server. Subsequently, the resultant PCM output of the A/D conversion is monitored to wait the starting point of the next speech.

Figure 30:
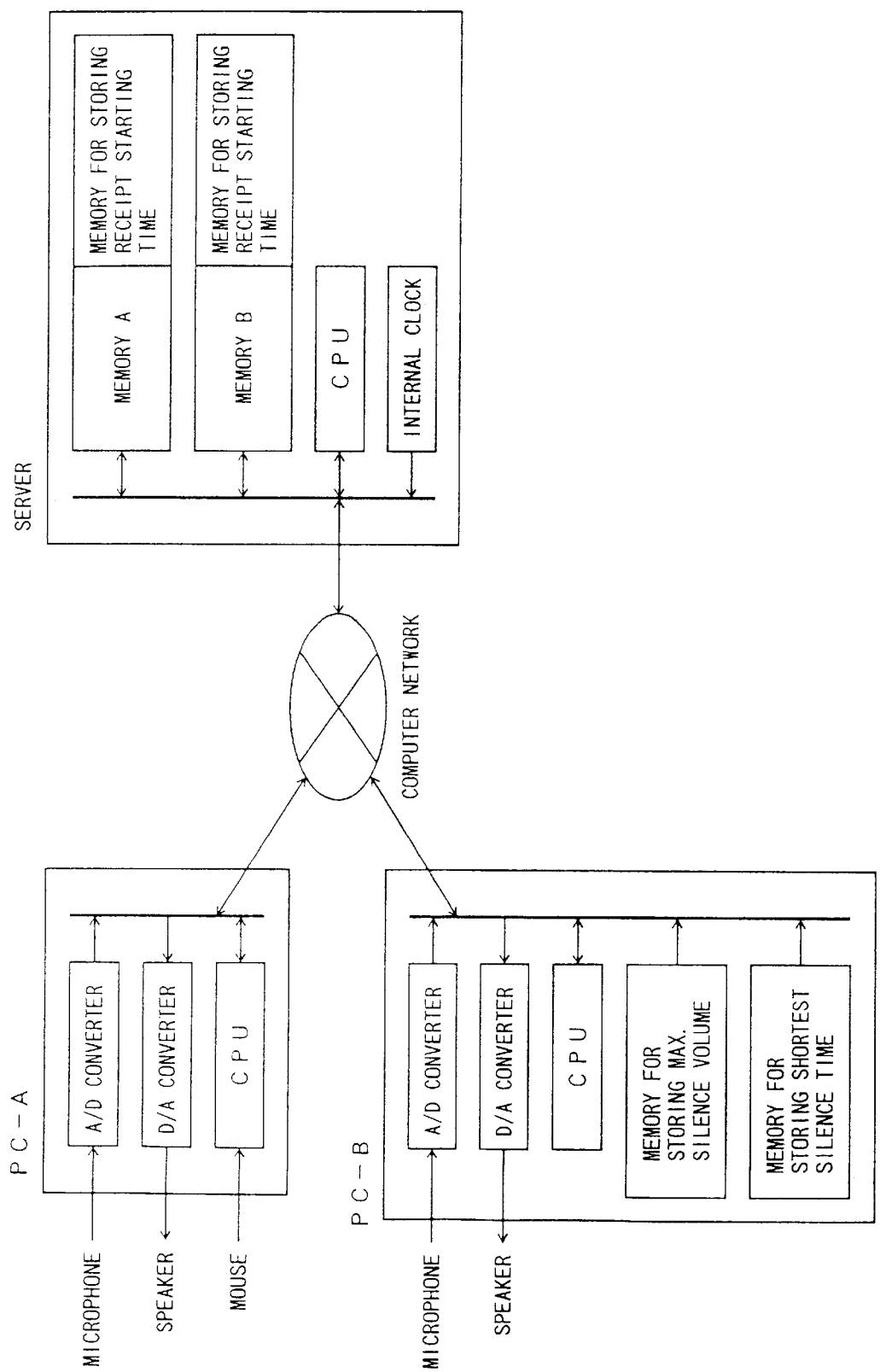
FIG. 30 is a block diagram of an audio interactive system according to the fourth embodiment of the present invention.

FIG. 30 is a block diagram of an audio interactive system according to the fourth embodiment of the present invention.

The present embodiment may be arranged in a similar fashion to that of the first embodiment shown in FIG. 27, but different in the point that each of the buffers has a receipt starting time memory.

A server control unit is implemented by a CPU and provides such a control that speeches are temporarily stored in buffer memories for the associated terminals, respectively, referring to terminal IDs of data transmitted from the respective terminals. At that time, time in which the first packet of the speech from the terminal is received, is stored in the associated receipt starting time memory. There are prepared the buffer memories of which number is the same as that of the connected terminals. The server control unit serves to distribute the speech on the buffer memory indicated by a scheduler to the respective terminal.

The scheduler is implemented by a CPU. If there is a speech which has been transmitted from the terminal and not yet distributed, the scheduler instructs the control unit to distribute the remaining speech to the terminal. If there are a plurality of speeches not yet distributed, the scheduler instructs the control unit to select and distribute the oldest one in the receiving start time, of those speeches.

Of course, in a similar fashion to that of the embodiment shown in FIG. 29, it is acceptable that the server side has the silence detection means, and also that the terminal end is so arranged to detect the starting point and the terminating point of the speech by the silence detection means, without the use of the mouse.

Figure 31:
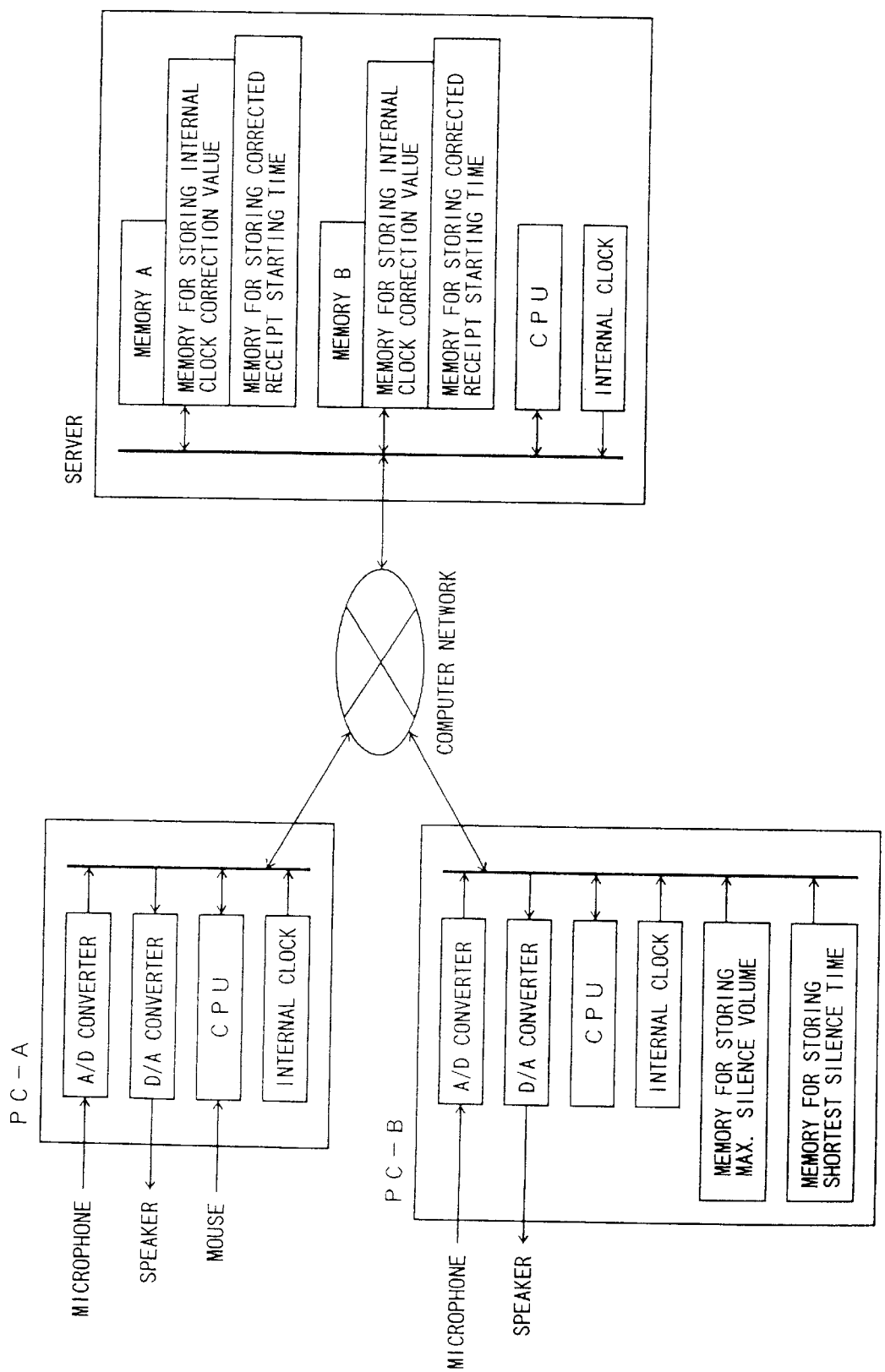
FIG. 31 is a block diagram of an audio interactive system according to the fifth embodiment of the present invention.

FIG. 31 is a block diagram of an audio interactive system according to the fifth embodiment of the present invention.

The present embodiment may be arranged in a similar fashion to that of the fourth embodiment shown in FIG. 30, but different in the point that the server has an internal time correction value computing unit enabled first at the time point when the associated terminal is connected thereto, an internal time correction value memory, and a corrected receipt starting time memory instead of the receipt starting time memory.

The internal time correction value computing unit is complemented by a CPU. When a new terminal is connected to the server, the internal time correction value computing unit instructs the terminal that local time of the terminal is read through the associated internal clock and the local time T1 thus read is transmitted to the server. Now it is assumed that a time of the instruction is expressed by Ts. The server waits that the terminal responsive to the instruction reports the local time of the terminal. When the server received the report from the terminal, this time is expressed by Te. Assuming that the reported local time of the terminal is expressed by T1, difference between an internal clock within the server and the internal clock of the terminal is expressed by an internal time correction value Td=Ts+(Te−Ts)/2−T1. This value is evaluated on all of the terminals A and B, and each of the obtained values is stored in the associated one of internal time correction value memories of buffers.

Each of the terminals is implemented by a CPU. Internal time Tx at which speech is made is counted by the internal clock, and the speech is transmitted to the server together with the time Tx.

The server control unit is implemented by a CPU and provides such a control that speeches are temporarily stored in buffer memories for the associated terminals, respectively, referring to terminal IDs of data transmitted from the respective terminals. At that time, the internal time Tx appended to the speech issued from the respective terminal is read, and the corrected receipt starting time=internal time Tx−the internal time correction value Td is computed, and the resultant value is stored in the associated corrected receipt starting time memory.

The scheduler is implemented by a CPU. If there is a speech which has been transmitted from the terminal and not yet distributed, the scheduler instructs the control unit to distribute the remaining speech to the terminal. If there are a plurality of speeches not yet distributed, the scheduler instructs the control unit to select and distribute the oldest one in the corrected receiving start time time, of those speeches. This feature makes it possible that the scheduler sequentially transmits the speeches to all the terminals in the order in which the speeches were actually made.

Of course, in a similar fashion to that of the embodiment shown in FIG. 29, it is acceptable that the server side has the silence detection means, and also that the terminal end is so arranged to detect the starting point and the terminating point of the speech by the silence detection means, without the use of the mouse.

Figure 32:
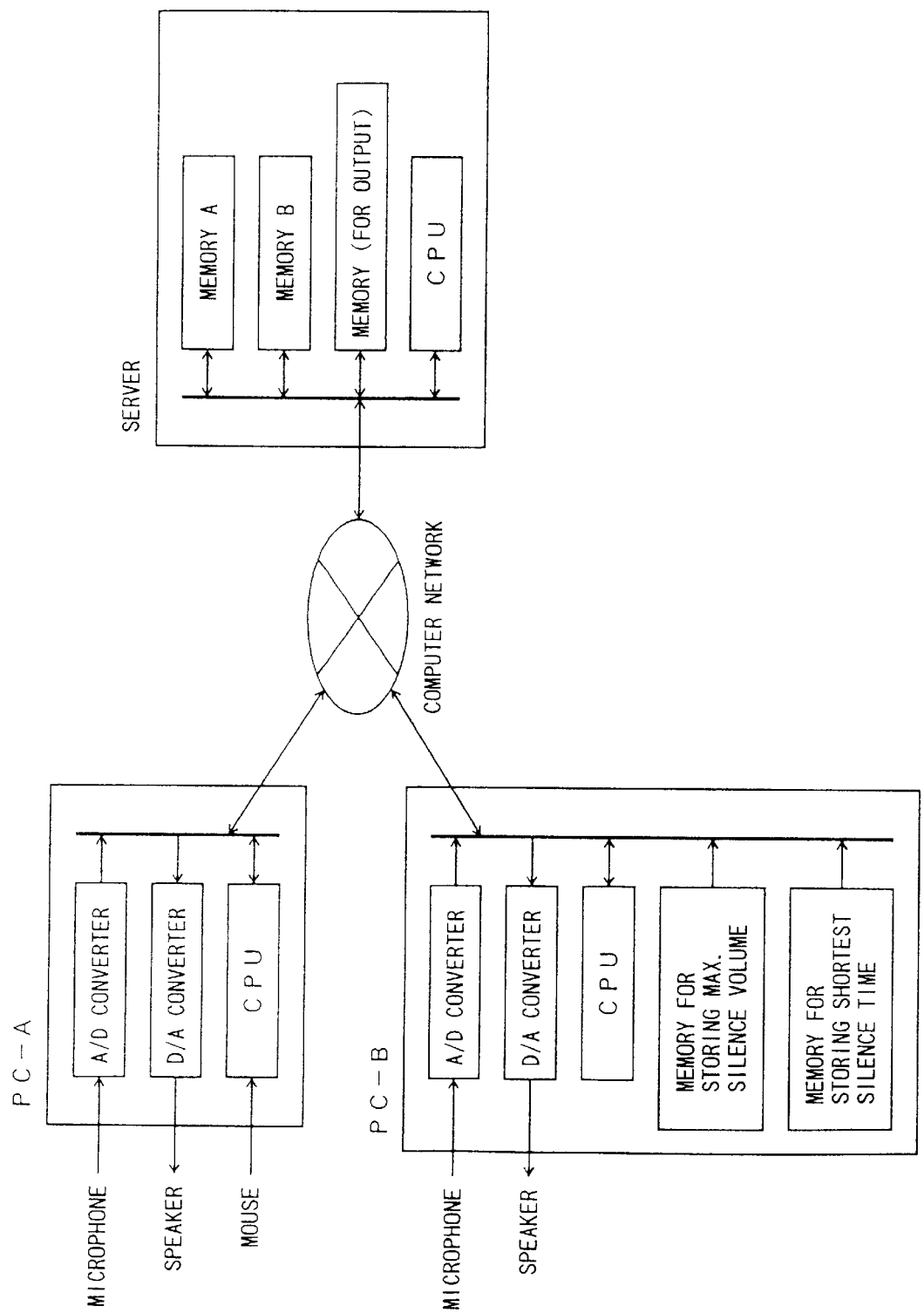
FIG. 32 is a block diagram of an audio interactive system according to the sixth embodiment of the present invention.

FIG. 32 is a block diagram of an audio interactive system according to the sixth embodiment of the present invention.

In the present embodiment, a mouse is used to instruct start and stop of the speech. While a mouse button is being depressed, an input entered through a microphone is subjected to a sampling process and an A/D conversion process as well. The digital data thus generated is transmitted to a server together with a user ID and a terminal ID in form of a packet in units of 256 bytes for example. Speech issued from another terminal, which is distributed from the server, is supplied to a D/A converter to be converted into voice and then applied to a speaker.

A server control unit is implemented by a CPU and provides such a control that speeches are temporarily stored in buffer memories for the associated terminals, respectively, referring to terminal IDs of data transmitted from the respective terminals. There are prepared the buffer memories of which number is the same as that of the connected terminals. The server control unit serves to distribute the mixed speech on the buffer memory to the respective terminal.

A mixer is implemented by a CPU and performs a mixing through addition of the same portion of times of speech data stored in the buffer memories, and stores the same subjected to the gain regulation in the output buffer memories. Of course, it is acceptable that the mixer is implemented by a DSP.

As a method of determination of the same time, for example, it is noted that time, at which the server received first packet of the speech issued from the respective terminal, is stored in the associated buffer memory, and data of the time of interest in processing is determined through offset from the leading position of the buffer, thereby deriving data involved in the same time stored in the respective buffers.

As a method of gain regulation, for example, it is noted that when an addition result is over the maximum value of a PCM, it is clipped to the maximum value of the PCM. Alternatively, when an addition result is over the maximum value of a PCM, it is normalized to be the maximum value of the PCM, and the coefficient at that time is held in form of the gain factor. This gain factor is applied also to the subsequent addition result. The gain factor is controlled to be attenuated to 1 in accordance with the time constant.

Of course, in a similar fashion to that of the embodiment shown in FIG. 29, it is acceptable that the terminal side is arranged to provide the silence detection means, thereby automatically detecting the starting point and the terminating point of the speech on the basis of the signal level of the input of the silence detection means, without the use of the mouse.

Figure 33:
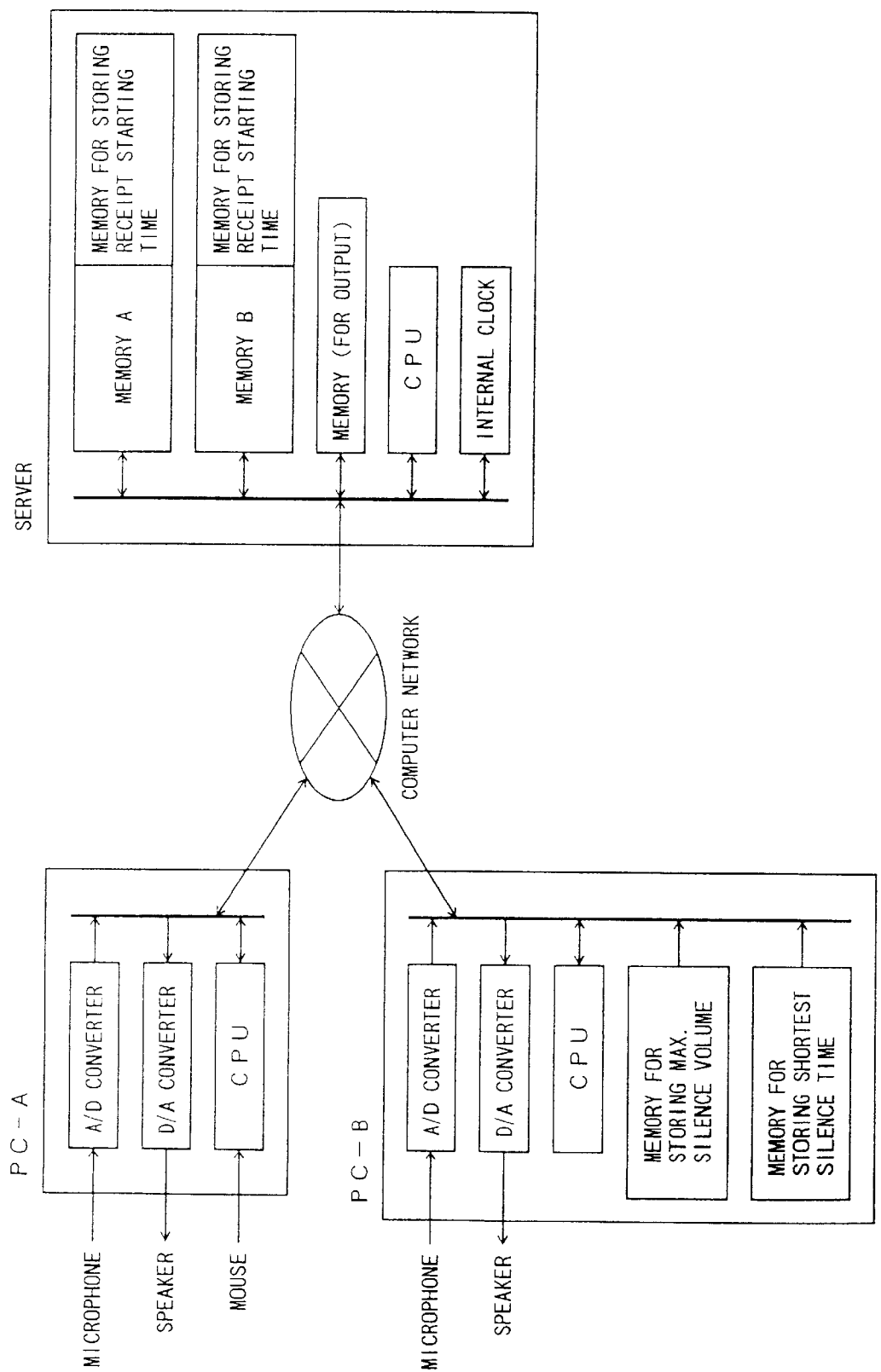
FIG. 33 is a block diagram of an audio interactive system according to the seventh embodiment of the present invention.

FIG. 33 is a block diagram of an audio interactive system according to the seventh embodiment of the present invention.

The present embodiment may be arranged in a similar fashion to that of the sixth embodiment shown in FIG. 27, but different in the point that each of the buffer memories has a receipt starting time memory. In the present embodiment, a mouse is used to instruct start and stop of the speech. While a mouse button is being depressed, an input entered through a microphone is subjected to a sampling process and an A/D conversion process as well. The digital data thus generated is transmitted to a server together with a user ID and a terminal ID in form of a packet in units of 256 bytes for example. Speech issued from another terminal, which is distributed from the server, is supplied to a D/A converter to be converted into voice and then applied to a speaker.

A server control unit is implemented by a CPU and provides such a control that speeches are temporarily stored in buffer memories for the associated terminals, respectively, referring to terminal IDs of data transmitted from the respective terminals. At that time, time in which the first packet of the speech from the terminal is received, is stored in the associated receipt starting time memory. There are prepared the buffer memories of which number is the same as that of the connected terminals. The server control unit serves to distribute the mixed speech on the buffer memory to the respective terminal.

A mixer is implemented by a CPU and performs a mixing through addition of the same times of data stored in the buffer memories, and stores the same subjected to the gain regulation in the output buffer memories. Data of the time of interest in processing can be derived on the basis of offset of speech data stored in the respective buffer memory from the leading position of the buffer and the receipt time of the speech.

As a method of gain regulation, for example, it is noted that when an addition result is over the maximum value of a PCM, it is clipped to the maximum value of the PCM. Alternatively, when an addition result is over the maximum value of a PCM, it is normalized to be the maximum value of the PCM, and the coefficient at that time is held in form of the gain factor. This gain factor is applied also to the subsequent addition result. The gain factor is controlled to be attenuated to 1 in accordance with the time constant.

These addition processing and gain regulation processing may be implemented by a DSP.

In a similar fashion to that of the embodiment shown in FIG. 29, it is acceptable that the terminal side is arranged to provide the silence detection means, thereby automatically detecting the starting point and the terminating point of the speech on the basis of the signal level of the input of the silence detection means, without the use of the mouse.

Figure 34:
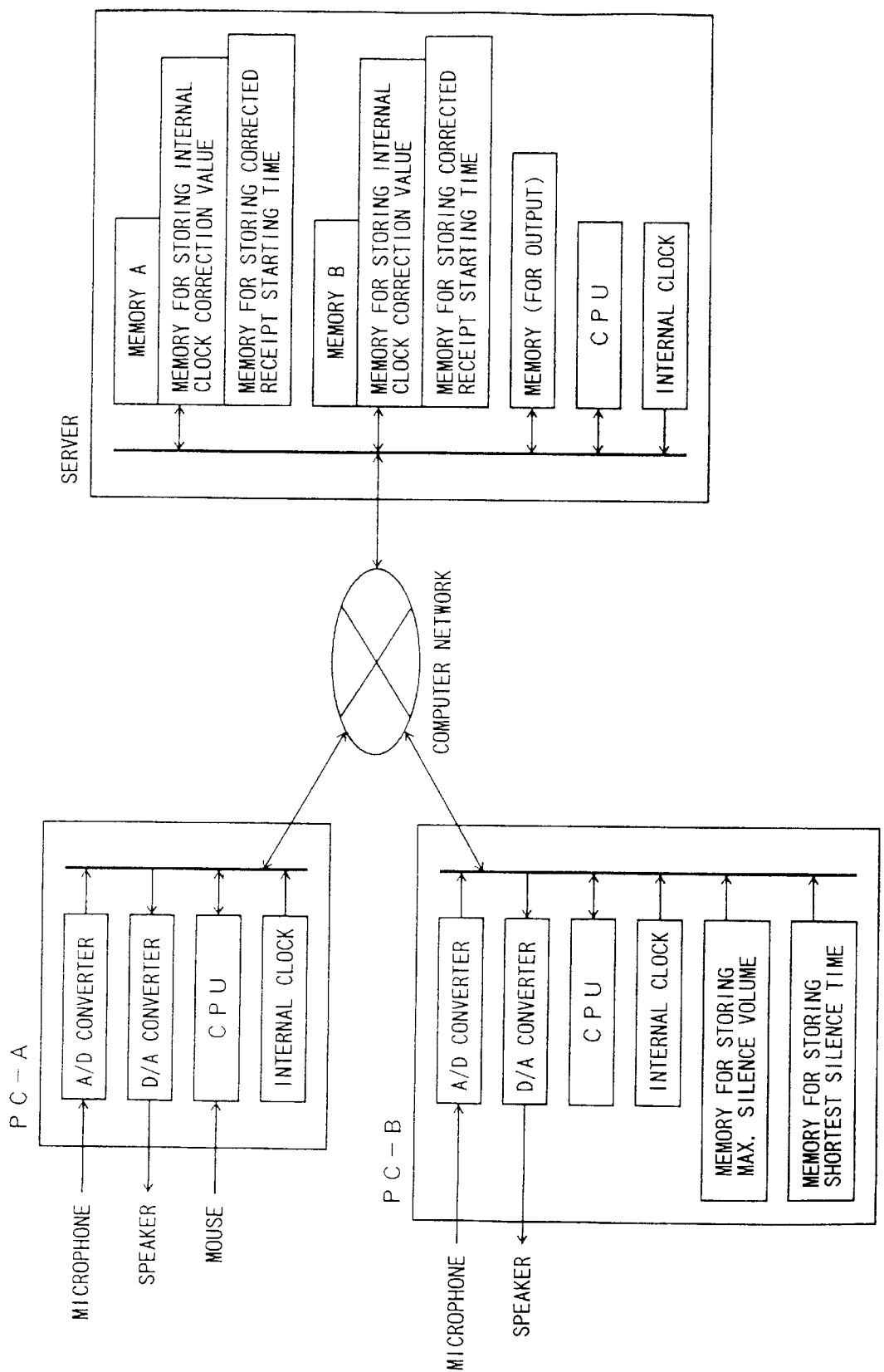
FIG. 34 is a block diagram of an audio interactive system according to the eighth embodiment of the present invention.

FIG. 34 is a block diagram of an audio interactive system according to the eighth embodiment of the present invention.

The present embodiment may be arranged in a similar fashion to that of the seventh embodiment, but different in the point that the server has an internal time correction value computing unit enabled first at the time point when the associated terminal is connected thereto, an internal time correction value memory, and a corrected receipt starting time memory instead of the receipt starting time memory.

The internal time correction value computing unit is complemented by a CPU. When a new terminal is connected to the server, the internal time correction value computing unit instructs the terminal that local time of the terminal is read through the associated internal clock and the local time T1 thus read is transmitted to the server. Now it is assumed that a time of the instruction is expressed by Ts. The server waits that the terminal responsive to the instruction reports the local time of the terminal. When the server received the report from the terminal, this time is expressed by Te. Assuming that the reported local time of the terminal is expressed by T1, difference between an internal clock within the server and the internal clock of the terminal is expressed by an internal time correction value $Td=Ts+(Te-Ts)/2-T1$. This value is evaluated on all of the terminals A and B, and each of the obtained values is stored in the associated one of internal time correction value memories of buffers.

Each of the terminals is implemented by a CPU. Internal time Tx at which speech is made is counted by the internal clock, and the speech is transmitted to the server together with the time Tx.

The server control unit is implemented by a CPU and provides such a control that speeches are temporarily stored in buffer memories for the associated terminals, respectively, referring to terminal IDs of data transmitted from the respective terminals. At that time, the internal time Tx appended to the speech issued from the respective terminal is read, and the corrected receipt starting time=internal time Tx−the internal time correction value Td is computed, and the resultant value is stored in the associated corrected receipt starting time memory.

A mixer is implemented by a CPU and performs a mixing through addition of the same times of data stored in the buffer memories, and stores the same subjected to the gain regulation in the output buffer memories. Data of the time of interest in processing can be derived on the basis of offset of speech data stored in the respective buffer memory from the leading position of the buffer and the corrected receipt time of the speech.

As a method of gain regulation, for example, it is noted that when an addition result is over the maximum value of a PCM, it is clipped to the maximum value of the PCM. Alternatively, when an addition result is over the maximum value of a PCM, it is normalized to be the maximum value of the PCM, and the coefficient at that time is held in form of the gain factor. This gain factor is applied also to the subsequent addition result. The gain factor is controlled to be attenuated to 1 in accordance with the time constant.

These addition processing and gain regulation processing may be implemented by a DSP.

In a similar fashion to that of the embodiment shown in FIG. 29, it is acceptable that the terminal side is arranged to provide the silence detection means, thereby automatically detecting the starting point and the terminating point of the speech on the basis of the signal level of the input of the silence detection means, without the use of the mouse.

Figure 35:
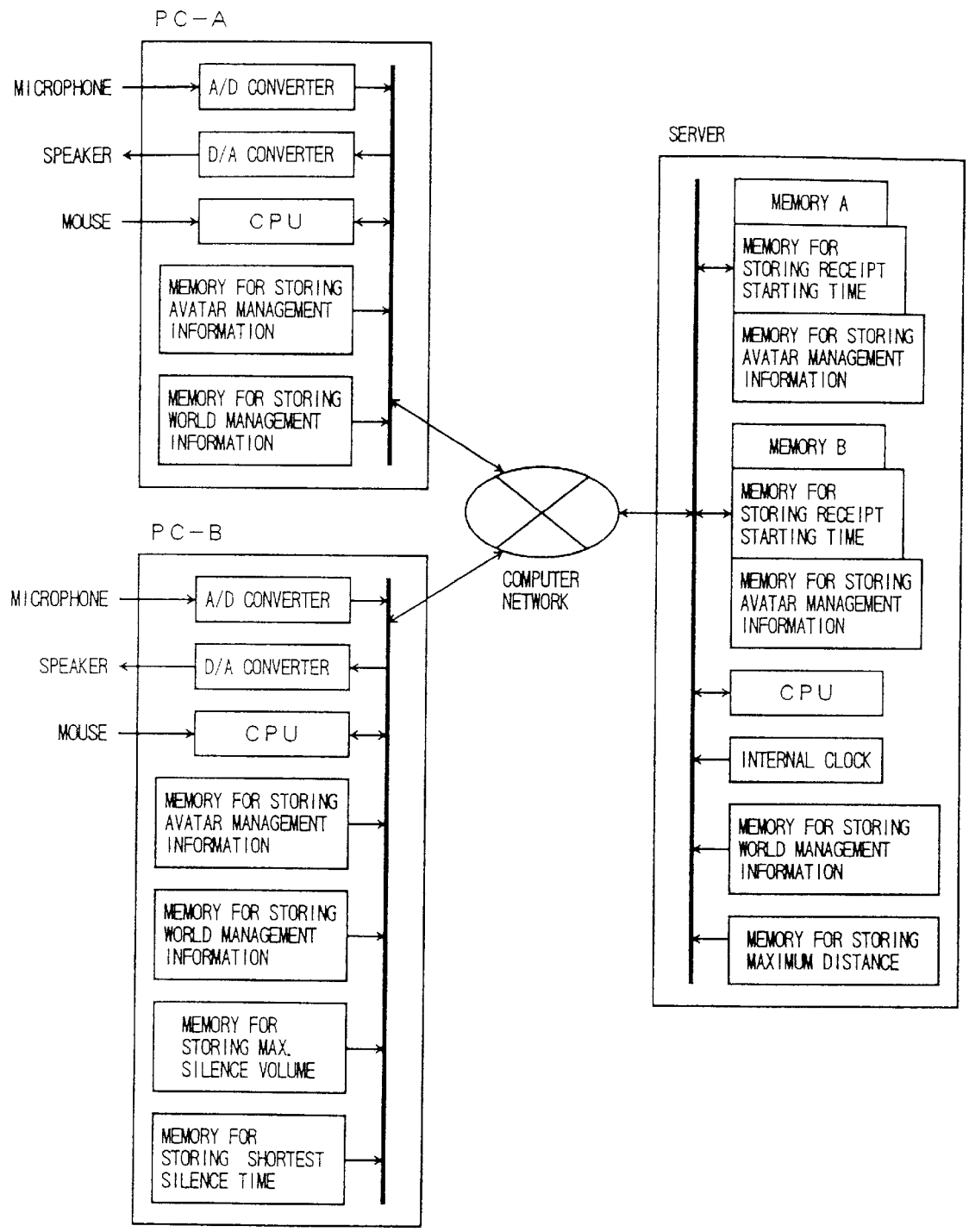
FIG. 35 is a block diagram of an audio interactive system according to the ninth embodiment of the present invention.

FIG. 35 is a block diagram of an audio interactive system according to the ninth embodiment of the present invention.

The present embodiment may be arranged in a similar fashion to that of the first embodiment shown in FIG. 30, but different in the point that the server and the terminal each incorporate thereinto an avatar management information memory and a world management information memory, and the server has a maximum distance memory.

According to the present embodiment, the user of each of the terminals has imaginarily three-dimensional coordinates, one's eyes direction, and sight. These kinds of information are held in the form of avatar management information in both each of the terminals and the server. When the user indicates his movement and a movement of his eyes direction through a mouse or a keyboard, the corresponding information of the avatar management information of the terminal is updated. When the avatar management information is updated, a notice of update is transmitted from the terminal to the server, so that the corresponding information at the server end is also updated in a similar fashion. World management information is information indicating as to where is what building in the imaginary three-dimensional world, that is, polygon data.

A server control unit is implemented by a CPU and provides such a control that speeches are temporarily stored in buffer memories for the associated terminals, respectively, referring to terminal IDs of data transmitted from the respective terminals. At that time, time in which the first packet of the speech from the terminal is received, is stored in the associated receipt starting time memory. There are prepared the buffer memories of which number is the same as that of the connected terminals. The server control unit serves to distribute the speech on the buffer memory indicated by a scheduler to the respective terminal. Further, the control unit updates, upon receipt of a notice of avatar information update from the terminal, the corresponding avatar information.

The scheduler is implemented by a CPU in which speeches to be distributed on each terminal and their order are scrutinized. If there is a speech which has been transmitted from another terminal and not yet distributed, the scheduler computes the positional relation and the sight on the basis of avatar management information of the terminal of concern and avatar management information of a certain speaker and the world management information as well. As a result, if it is determined that a distance between two avatars is over a predetermined maximum distance apart, it is regarded that the speech cannot be heard and is not transmitted. Also with respect to the speech issued from the user who is out of sight, it is regarded that the speech cannot be heard and is not transmitted. With respect to speeches other than the above, in a similar fashion to that of the embodiment explained referring to FIG. 30, the scheduler instructs the control unit to select and distribute the oldest one in the receiving start time, of those speeches.

Of course, in a similar fashion to that of the embodiment shown in FIG. 29, it is acceptable that the server side has the silence detection means, and also that the terminal end is so arranged to detect the starting point and the terminating point of the speech by the silence detection means, without the use of the mouse.

Figure 36:
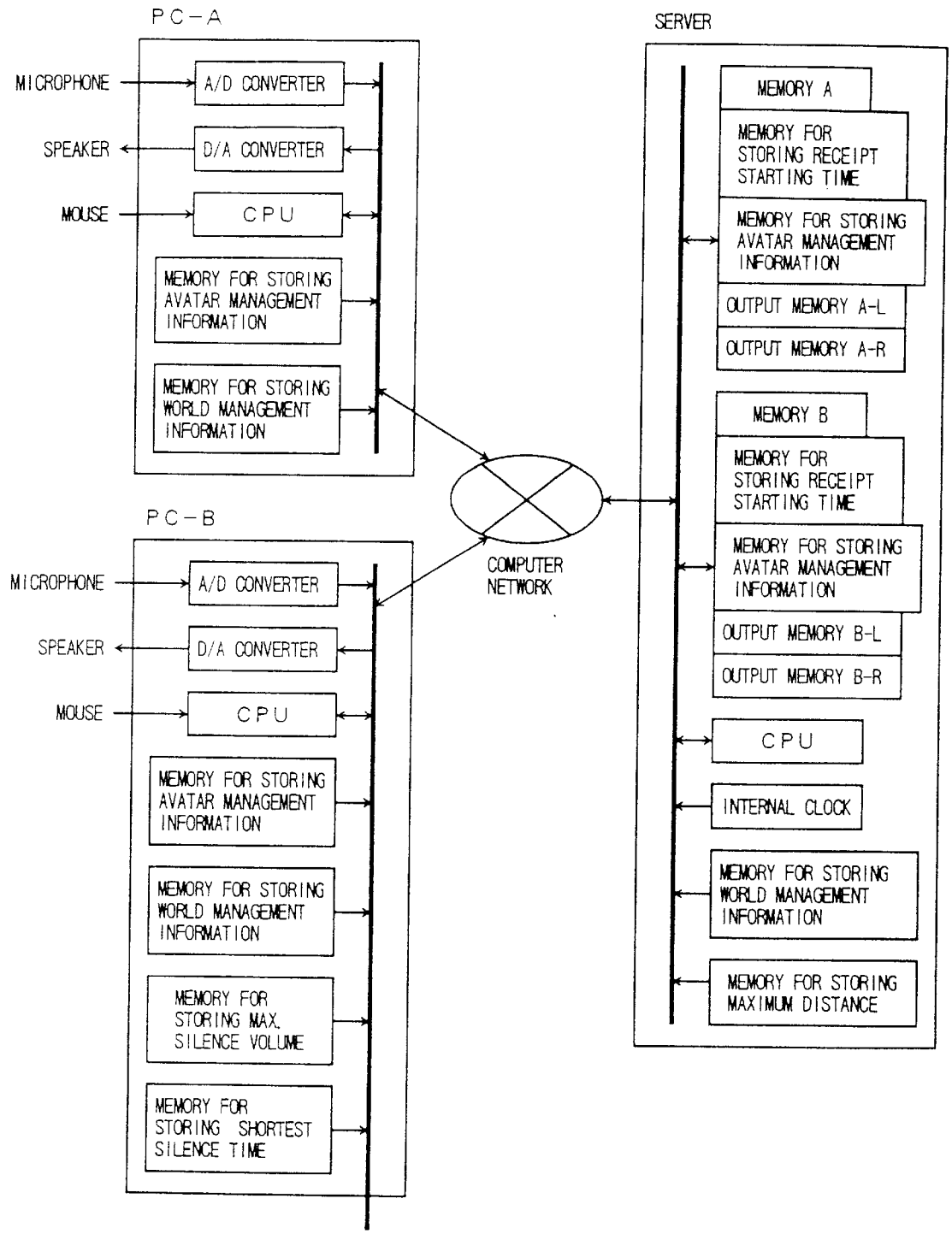
FIG. 36 is a block diagram of an audio interactive system according to the tenth embodiment of the present invention.

FIG. 36 is a block diagram of an audio interactive system according to the tenth embodiment of the present invention.

The present embodiment may be arranged in a similar fashion to that of the first embodiment shown in FIG. 32, but different in the point that two channels LR of output buffer areas are given, and the server and the terminal each incorporate thereinto an avatar management information memory and a world management information memory, and the server has a maximum distance memory.

According to the present embodiment, the user of each of the terminals has imaginarily three-dimensional coordinates, one's eyes direction, and sight. These kinds of information are held in the form of avatar management information in both each of the terminals and the server. When the user indicates his movement and a movement of his eyes direction through a mouse or a keyboard, the corresponding information of the avatar management information of the terminal is updated. When the avatar management information is updated, a notice of update is transmitted from the terminal to the server, so that the corresponding information at the server end is also updated in a similar fashion. World management information is information indicating as to where is what building in the imaginary three-dimensional world, that is, polygon data.

A server control unit is implemented by a CPU and provides such a control that speeches are temporarily stored in buffer memories for the associated terminals, respectively, referring to terminal IDs of data transmitted from the respective terminals. At that time, time in which the first packet of the speech from the terminal is received, is stored in the associated receipt starting time memory. There are prepared the buffer memories of which number is the same as that of the connected terminals. Further, the control unit updates, upon receipt of a notice of avatar information update from the terminal, the corresponding avatar information. If there is a speech which has been transmitted from another terminal and not yet distributed, the scheduler computes the positional relation and the sight on the basis of avatar management information of the terminal of concern and avatar management information of a certain speaker and the world management information as well. As a result, if it is determined that a distance between two avatars is over a predetermined maximum distance apart, it is regarded that the speech cannot be heard and is not transmitted. Also with respect to the speech issued from the user who is out of sight, it is regarded that the speech cannot be heard and is not transmitted.

An effector is implemented by a CPU. With respect to the speeches stored in the buffer memories, in case of other than the above, the speeches stored in the buffer memories are processed by the effector in such a manner that the sound volume is smaller as a logical distance between the speaker and the listener is extended, taking into account of a logical positional relation between the speaker and the listener and their eyes directions. Further, a sound volume ratio of the left and the right, a phase and a tone quality (characteristic of a filter) are varied in accordance with a direction. In a case where there is an obstacle between the speaker and the listener, an echo is applied or a tone quality (characteristic of a filter) is varied, in order to express that sound is propagated indirectly.

The thus processed speeches from the respective terminals are subjected to a scheduling process and are sequentially distributed to the respective terminals.

Of course, in a similar fashion to that of the embodiment shown in FIG. 29, it is acceptable that the server side has the silence detection means, and also that the terminal end is so arranged to detect the starting point and the terminating point of the speech by the silence detection means, without the use of the mouse.

Figure 37:
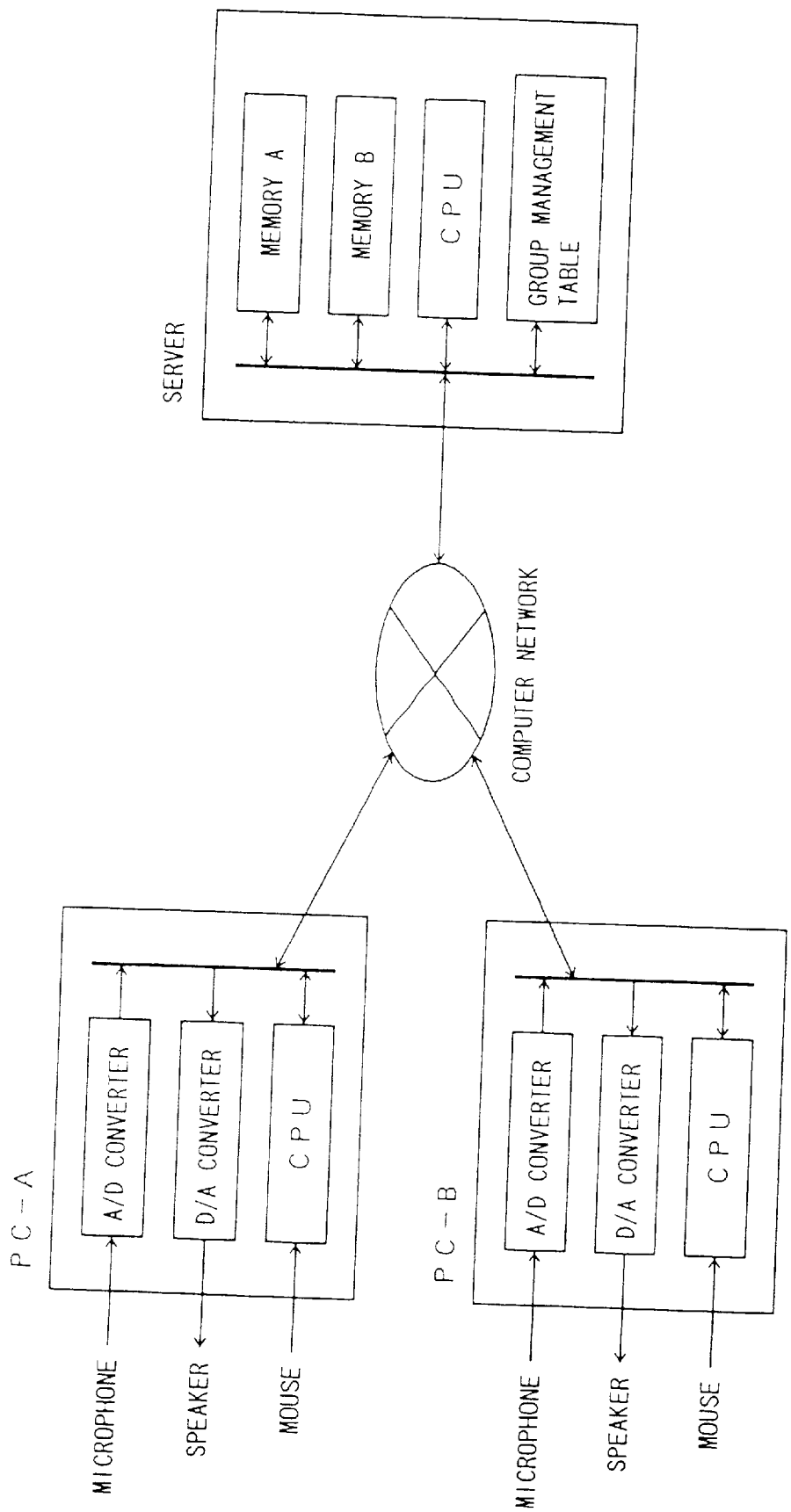
FIG. 37 is a block diagram of an audio interactive system according to the eleventh embodiment of the present invention.
Figure 38:
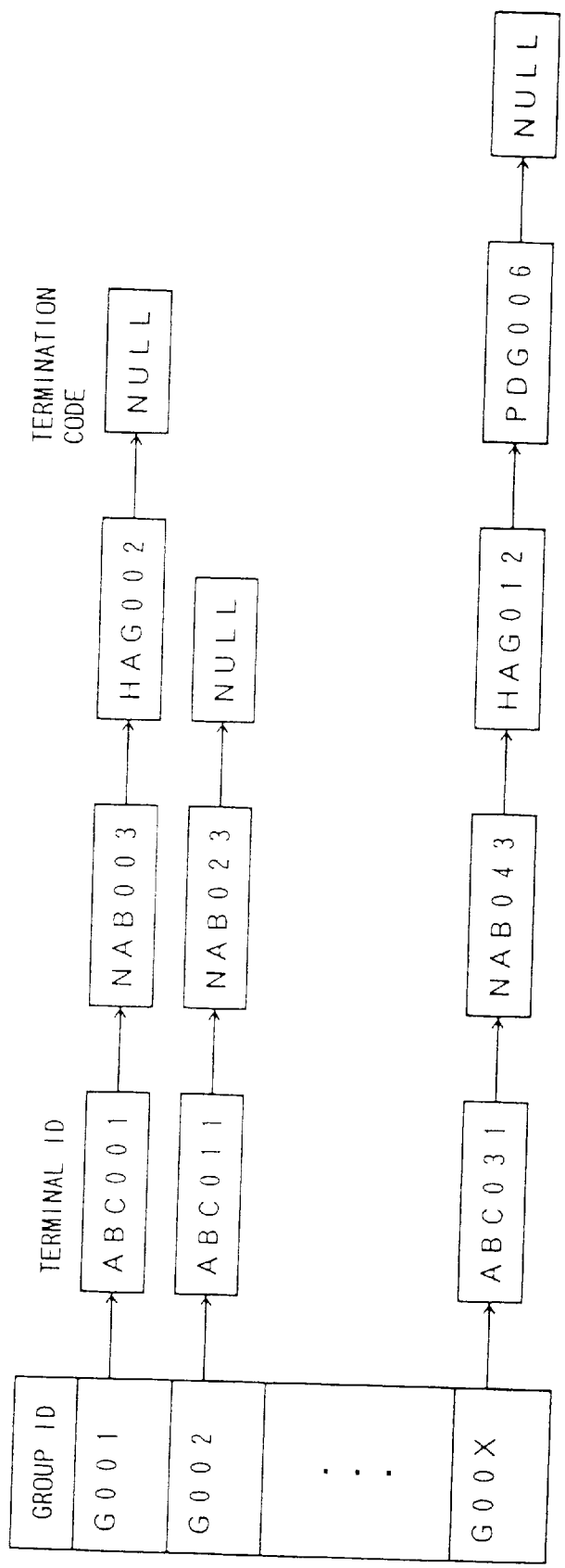
FIG. 38 is an illustration of a group management table by way of example.

FIG. 37 is a block diagram of an audio interactive system according to the eleventh embodiment of the present invention. FIG. 38 is an illustration of a group management table by way of example.

The present embodiment may be arranged in a similar fashion to that of the embodiment shown in FIG. 27, but different in the point that the server has a group management table.

In the present embodiment, a mouse is used to instruct start and stop of the speech. While a mouse button is being depressed, an input entered through a microphone is subjected to a sampling process and an A/D conversion process as well. The digital data thus generated is transmitted to a server together with a user ID and a terminal ID in form of a packet in units of 256 bytes for example. When the mouse button is released, a packet is transmitted together with a data termination flag to the server. Speech issued from another terminal, which is distributed from the server, is supplied to a D/A converter to be converted into voice and then applied to a speaker.

A server control unit is implemented by a CPU and provides such a control that speeches are temporarily stored in buffer memories for the associated terminals, respectively, referring to terminal IDs of data transmitted from the respective terminals. There are prepared the buffer memories of which number is the same as that of the connected terminals. The server control unit serves to distribute the speech on the buffer memory indicated by a scheduler to the respective terminal indicated by the terminal ID registered in the group management table.

The scheduler is implemented by a CPU and serves to determine an order of distribution of the speech data stored in the buffer memories to the terminals in accordance with a certain course. For example, time in which the first packet of the speech from the terminal is received, is stored in the associated buffer memory. If there is a speech which has been transmitted from the terminal and not yet distributed, the scheduler instructs the control unit to distribute the remaining speech to the terminal. If there are a plurality of speeches not yet distributed, the scheduler instructs the control unit to select and distribute the oldest one in the received time, of those speeches.

Here, while there is shown the embodiment using a similar scheduler to that of FIG. 27, it is acceptable to arrange the embodiment using a similar mixer to that of FIG. 32.

Figure 39:
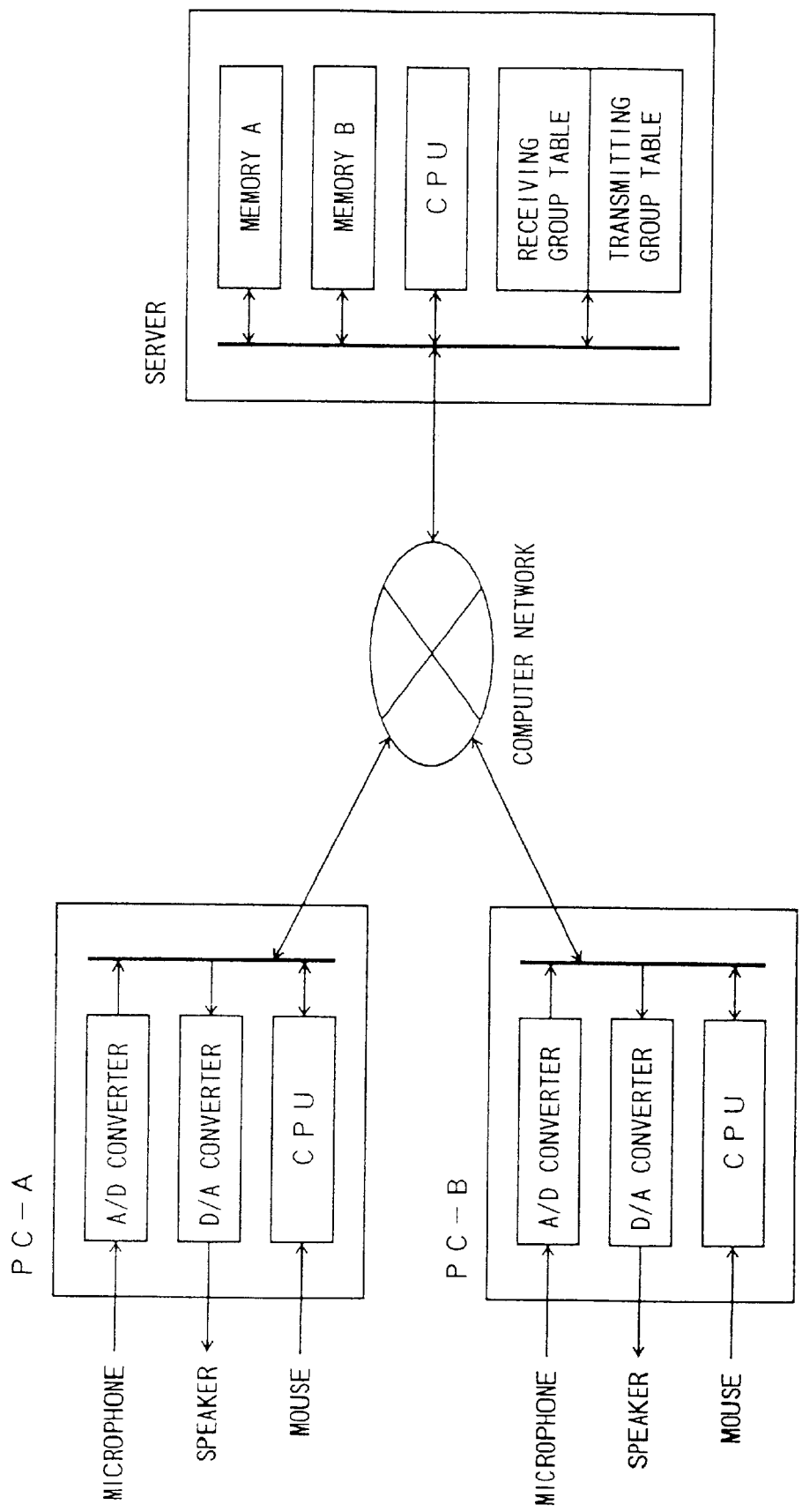
FIG. 39 is a block diagram of an audio interactive system according to the twelfth embodiment of the present invention.
Figure 40:
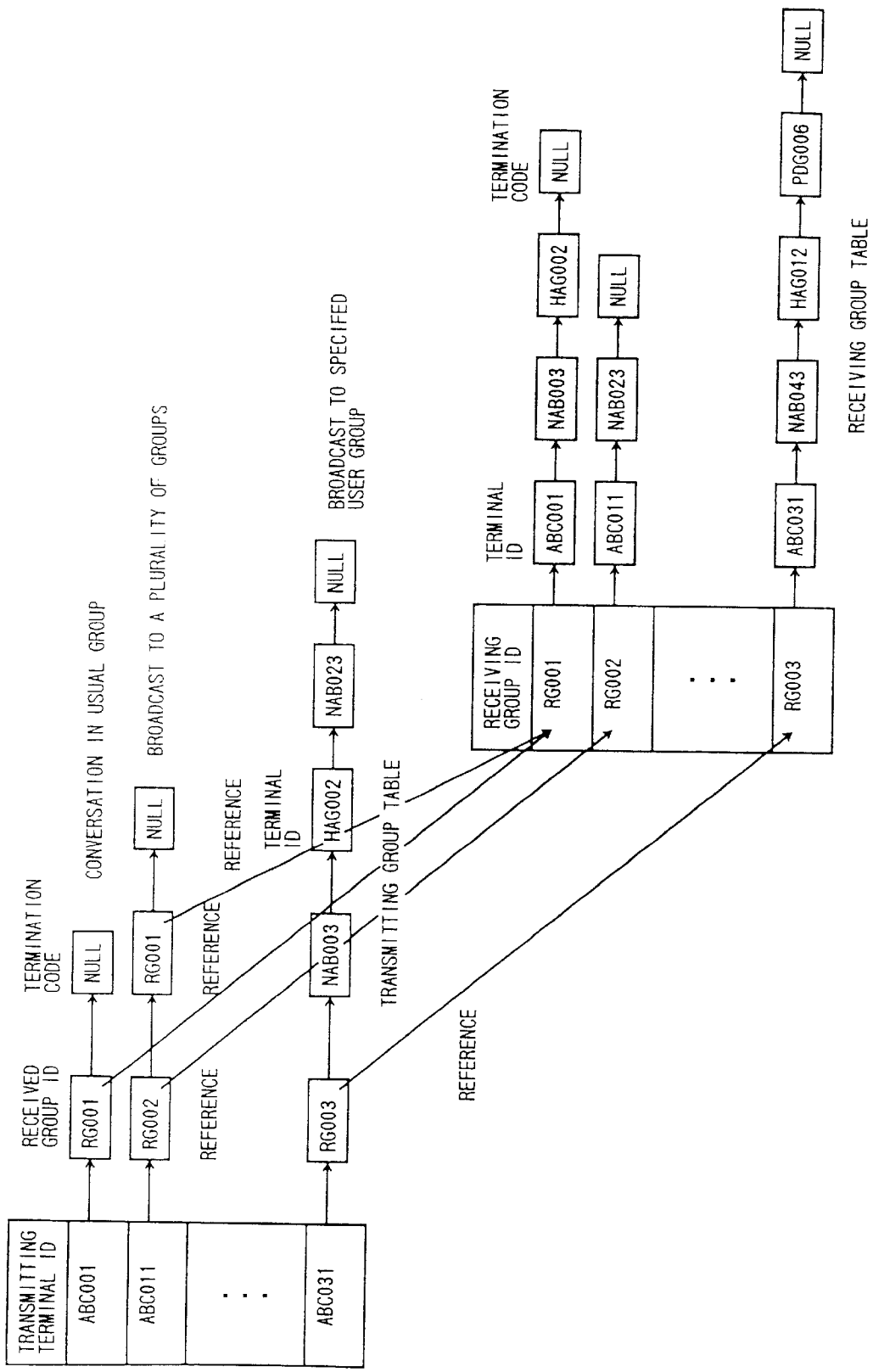
FIG. 40 is an illustration of a transmitting group table and an receiving group table by way of example.

FIG. 39 is a block diagram of an audio interactive system according to the twelfth embodiment of the present invention. FIG. 40 is an illustration of a transmitting group table and an receiving group table by way of example.

The present embodiment may be arranged in a similar fashion to that of the embodiment shown in FIG. 37, but different in the point that the terminal has a calling mode selection means, and the server has a transmitting group table and an receiving group table.

In the present embodiment, a mouse is used to instruct start and stop of the speech. While a mouse button is being depressed, an input entered through a microphone is subjected to a sampling process and an A/D conversion process as well. The digital data thus generated is transmitted to a server together with a user ID and a terminal ID in form of a packet in units of 256 bytes for example. When the mouse button is released, a packet is transmitted together with a data termination flag to the server. Speech issued from another terminal, which is distributed from the server, is supplied to a D/A converter to be converted into voice and then applied to a speaker.

A server control unit is implemented by a CPU and provides such a control that speeches are temporarily stored in buffer memories for the associated terminals, respectively, referring to terminal IDs of data transmitted from the respective terminals. There are prepared the buffer memories of which number is the same as that of the connected terminals. The server control unit serves to distribute the speech on the buffer memory indicated by a scheduler to the respective terminal indicated by the terminal ID registered in the transmitting group table and the terminal ID registered in the receiving group table indicated by receiving group ID.

The scheduler is implemented by a CPU and serves to determine an order of distribution of the speech data stored in the buffer memories to the terminals in accordance with a certain course. For example, time in which the first packet of the speech from the terminal is received, is stored in the associated buffer memory. If there is a speech which has been transmitted from the terminal and not yet distributed, the scheduler instructs the control unit to distribute the remaining speech to the terminal. If there are a plurality of speeches not yet distributed, the scheduler instructs the control unit to select and distribute the oldest one in the received time, of those speeches.

The calling mode selecting means is constituted of a CPU and a mouse. A user can indicate a desired mode through click of an icon indicating his desired mode.

Here, while there is shown the embodiment using a similar scheduler to that of FIG. 27, it is acceptable to arrange the embodiment using a similar mixer to that of FIG. 32.

Figure 41:
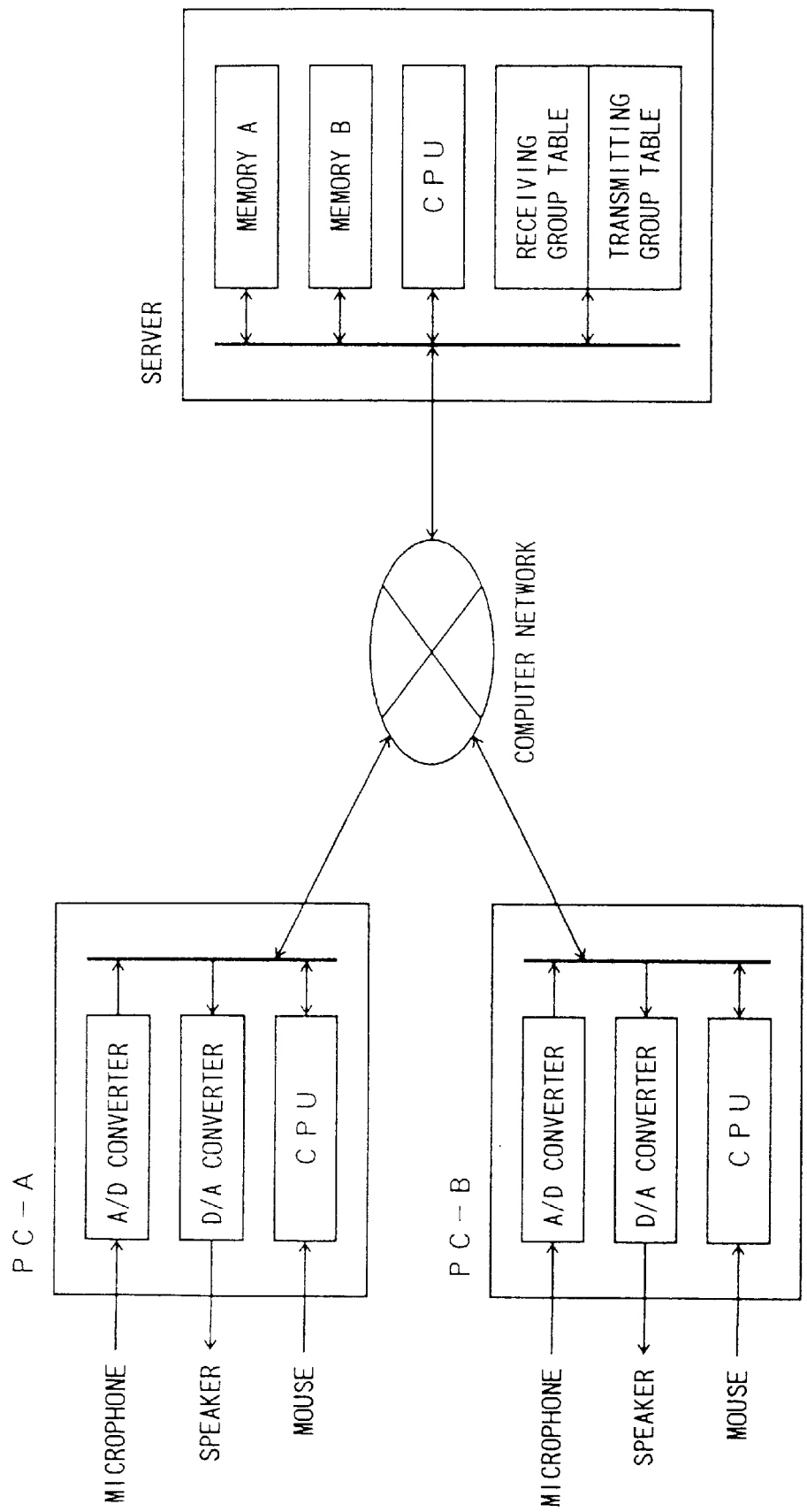
FIG. 41 is a block diagram of an audio interactive system according to the thirteenth embodiment of the present invention.
Figure 42:
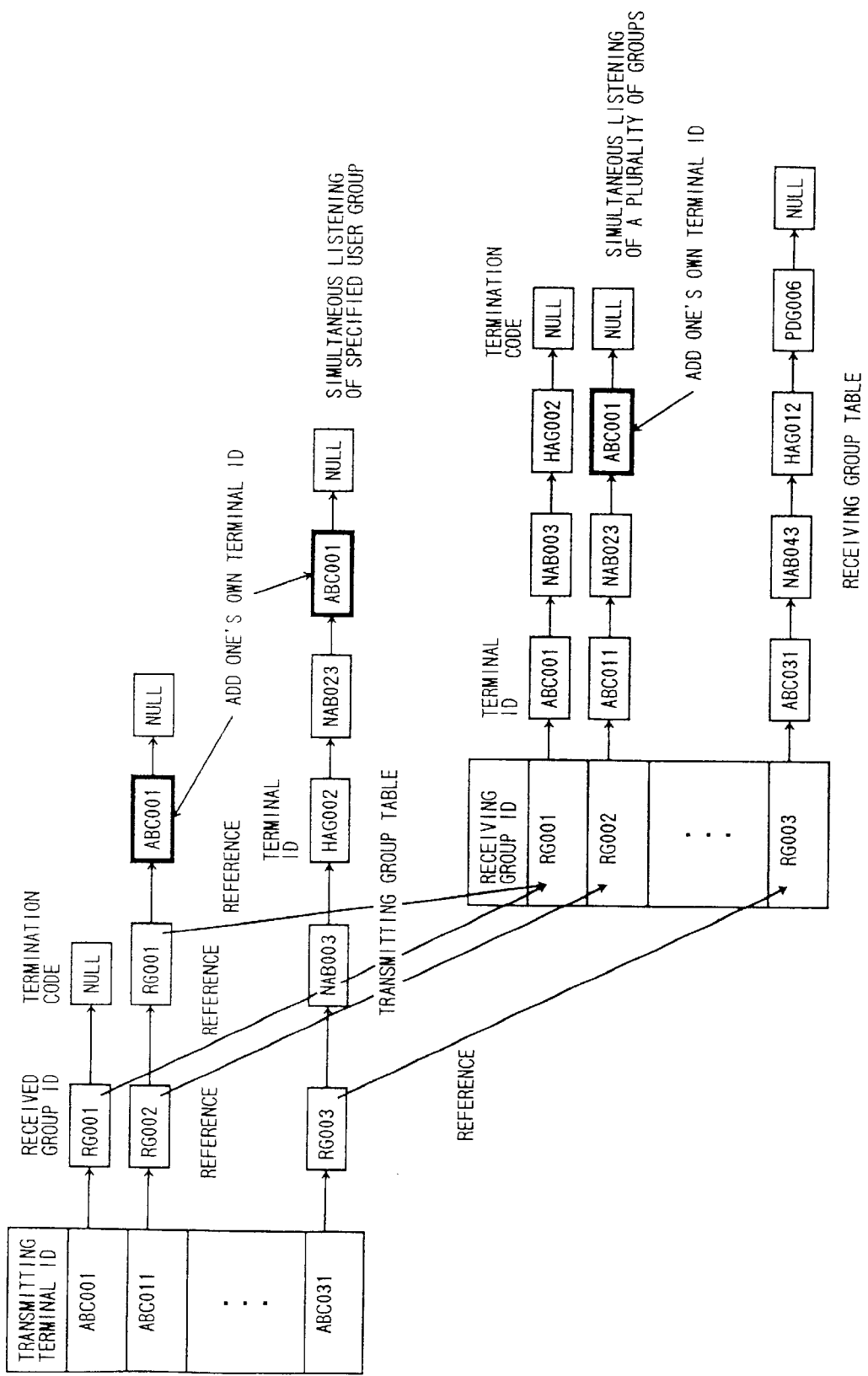
FIG. 42 is an illustration of a transmitting group table and an receiving group table by way of example.

FIG. 41 is a block diagram of an audio interactive system according to the thirteenth embodiment of the present invention. FIG. 42 is an illustration of a transmitting group table and an receiving group table by way of example.

The present embodiment may be arranged in a similar fashion to that of the embodiment shown in FIG. 37, but different in the point that the terminal has a listening mode selection means, and the server has a transmitting group table and an receiving group table.

In the present embodiment, a mouse is used to instruct start and stop of the speech. While a mouse button is being depressed, an input entered through a microphone is subjected to a sampling process and an A/D conversion process as well. The digital data thus generated is transmitted to a server together with a user ID and a terminal ID in form of a packet in units of 256 bytes for example. When the mouse button is released, a packet is transmitted together with a data termination flag to the server. Speech issued from another terminal, which is distributed from the server, is supplied to a D/A converter to be converted into voice and then applied to a speaker.

A server control unit is implemented by a CPU and provides such a control that speeches are temporarily stored in buffer memories for the associated terminals, respectively, referring to terminal IDs of data transmitted from the respective terminals. There are prepared the buffer memories of which number is the same as that of the connected terminals. The server control unit serves to distribute the speech on the buffer memory indicated by a scheduler to the respective terminal indicated by the terminal ID registered in the transmitting group table and the terminal ID registered in the receiving group table indicated by receiving group ID.

The scheduler is implemented by a CPU and serves to determine an order of distribution of the speech data stored in the buffer memories to the terminals in accordance with a certain course. For example, time in which the first packet of the speech from the terminal is received, is stored in the associated buffer memory. If there is a speech which has been transmitted from the terminal and not yet distributed, the scheduler instructs the control unit to distribute the remaining speech to the terminal. If there are a plurality of speeches not yet distributed, the scheduler instructs the control unit to select and distribute the oldest one in the received time, of those speeches.

The listening mode selecting means is constituted of a CPU and a mouse. A user can indicate a desired mode through click of an icon indicating his desired mode.

Here, while there is shown the embodiment using a similar scheduler to that of FIG. 27, it is acceptable to arrange the embodiment using a similar mixer to that of FIG. 32.

Figure 43:
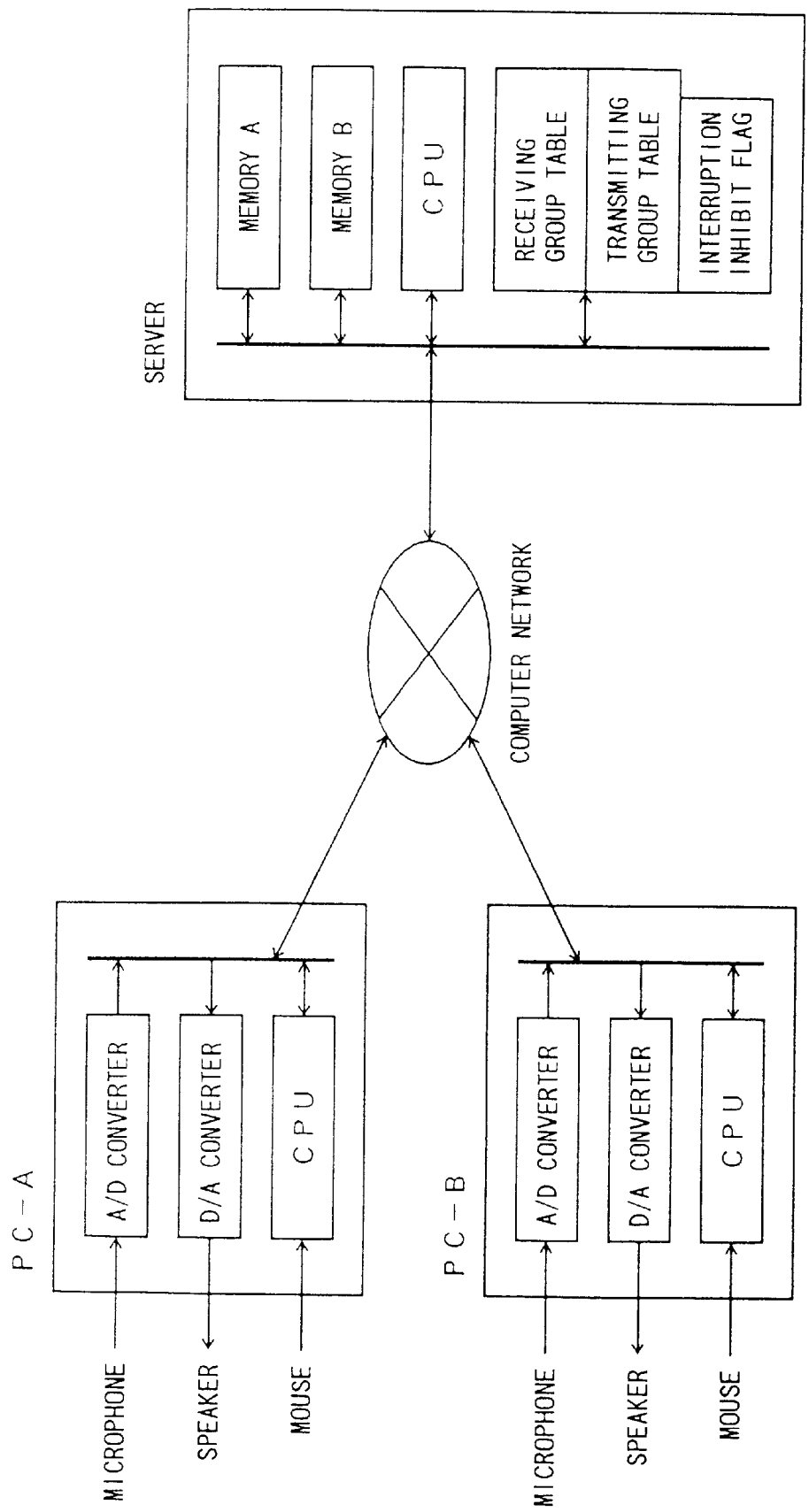
FIG. 43 is a block diagram of an audio interactive system according to the fourteenth embodiment of the present invention.
Figure 44:
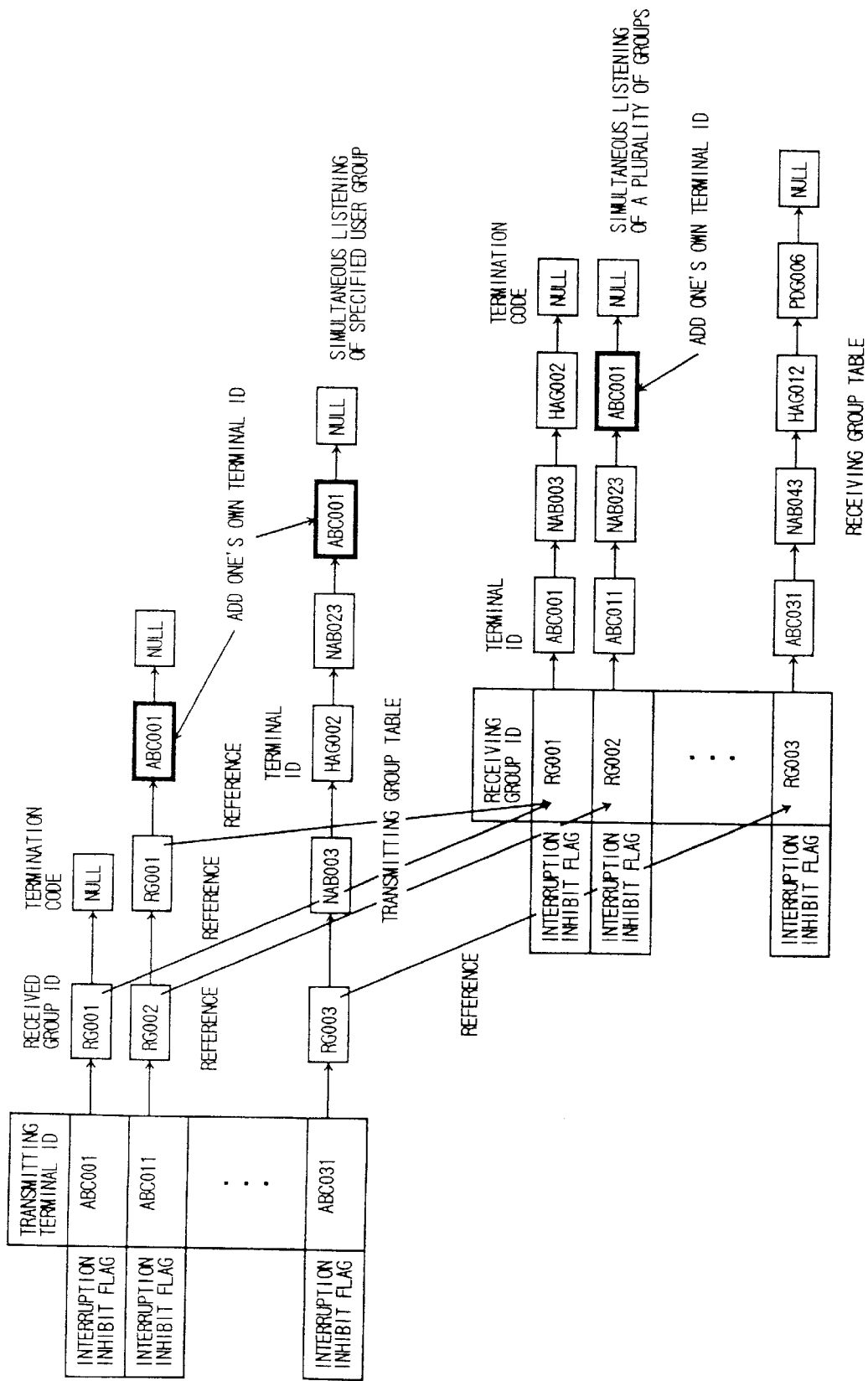
FIG. 44 is an illustration of a transmitting group table and an receiving group table by way of example.

FIG. 43 is a block diagram of an audio interactive system according to the fourteenth embodiment of the present invention. FIG. 44 is an illustration of a transmitting group table and an receiving group table by way of example.

The present embodiment may be arranged in a similar fashion to that of the embodiment shown in FIG. 41, but different in the point that an interruption inhibit flag is appended to a trasmitting group table and an receiving group table. In the server, upon receipt of a notice of the interruption inhibit, if it is involved in the interruption inhibit to the receiving group, an interruption inhibit flag of the associated group of the receiving group table 34 is turned on. On the other hand, if it is involved in the interruption inhibit to one's own terminal, an interruption inhibit flag of the associated terminal ID of the transmitting group table. When a designation of a speech mode is issued from a certain user, the interruption inhibit flag of the receiving group table and the interruption inhibit flag of the associated terminal ID of the transmitting group table 35 are confirmed, and if their flags are turned on, the registration onto the transmitting group table is rejected.

In a case where a designation of the transmitting mode is performed in combination of this embodiment with the embodiment shown in FIG. 47 which will be described later, if a privilege level value is higher than a value of the receiving group, or a value of the terminal ID, it is acceptable that the receiving group or the terminal ID is allowed to make speeches regardless of the interruption inhibit flag.

Figure 45:
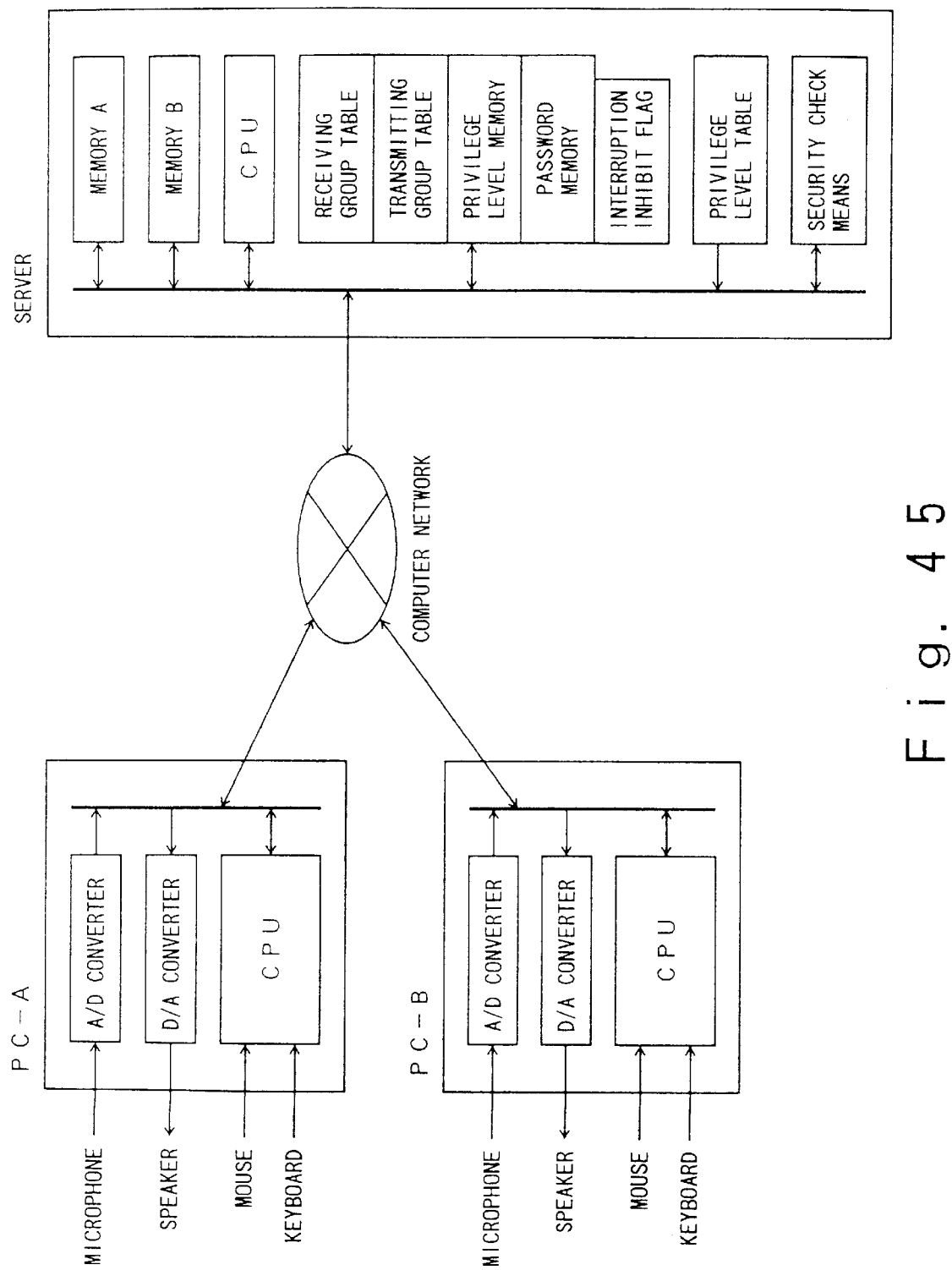
FIG. 45 is a block diagram of an audio interactive system according to the fifteenth embodiment of the present invention.
Figure 46:
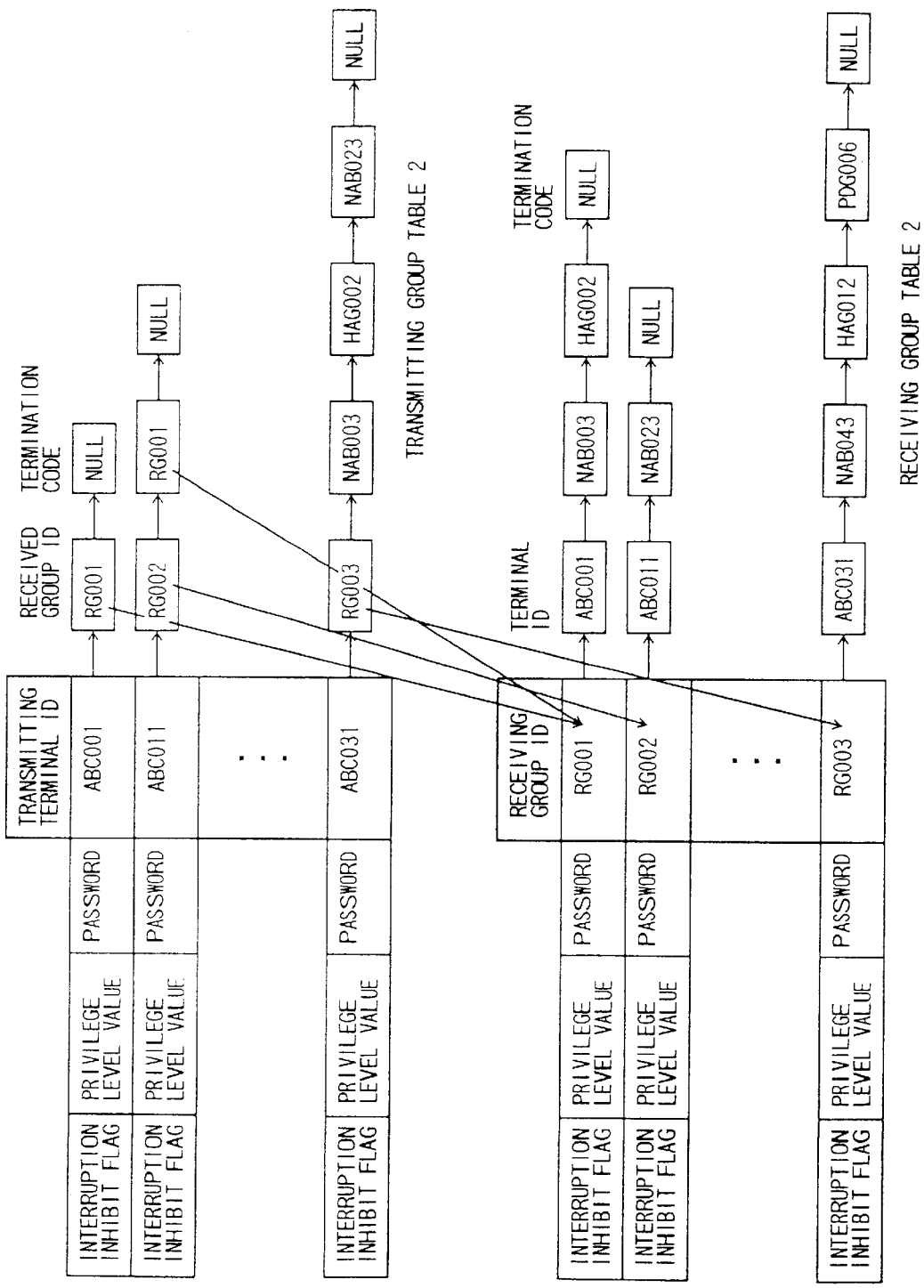
FIG. 46 is an illustration of a transmitting group table and an receiving group table by way of example.

Thus constructed fifteenth embodiment of the present invention is shown in FIGS. 45 and 46. The detailed description will be omitted.

Figure 47:
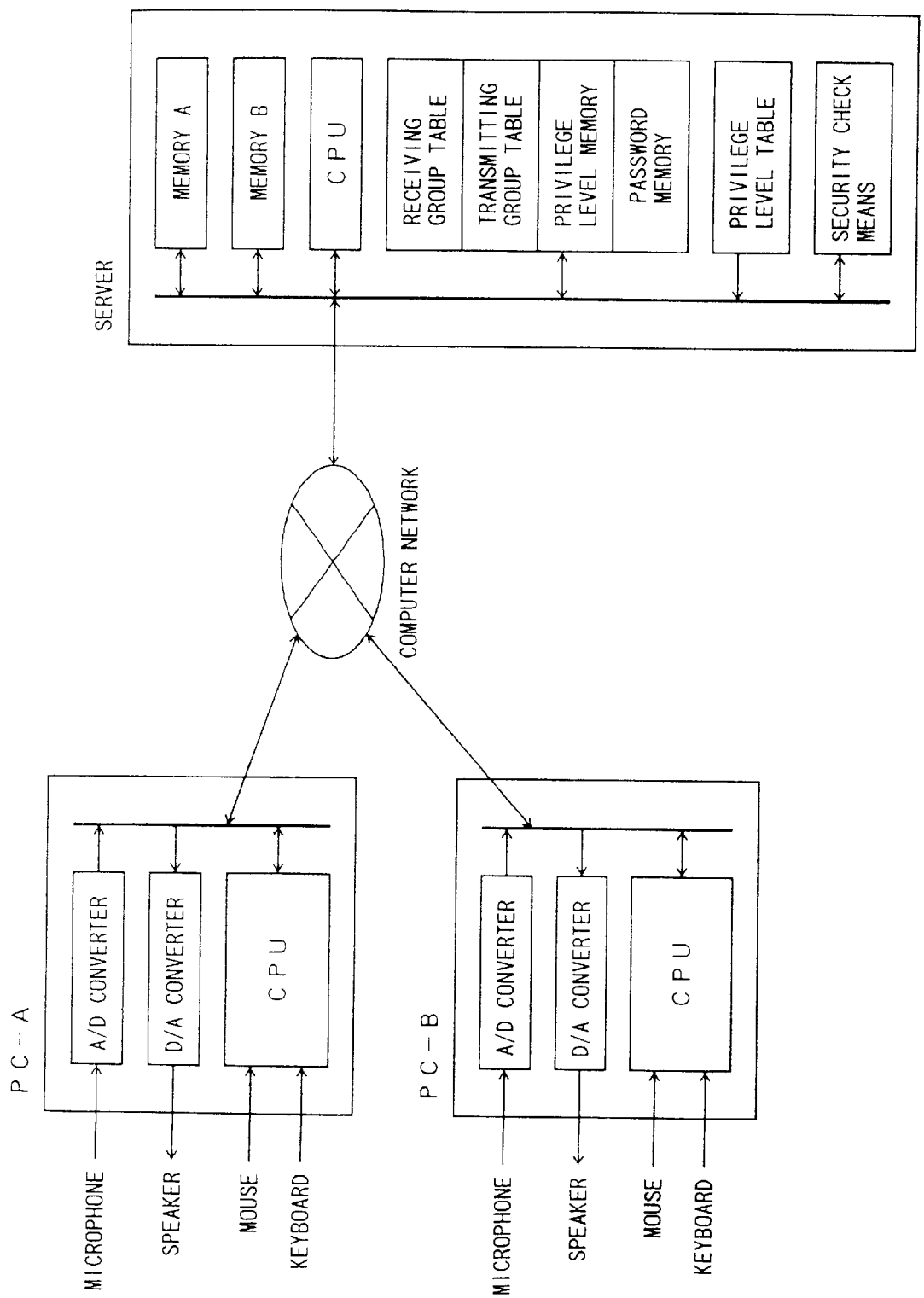
FIG. 47 is a block diagram of an audio interactive system according to the sixteenth embodiment of the present invention.
Figure 48:
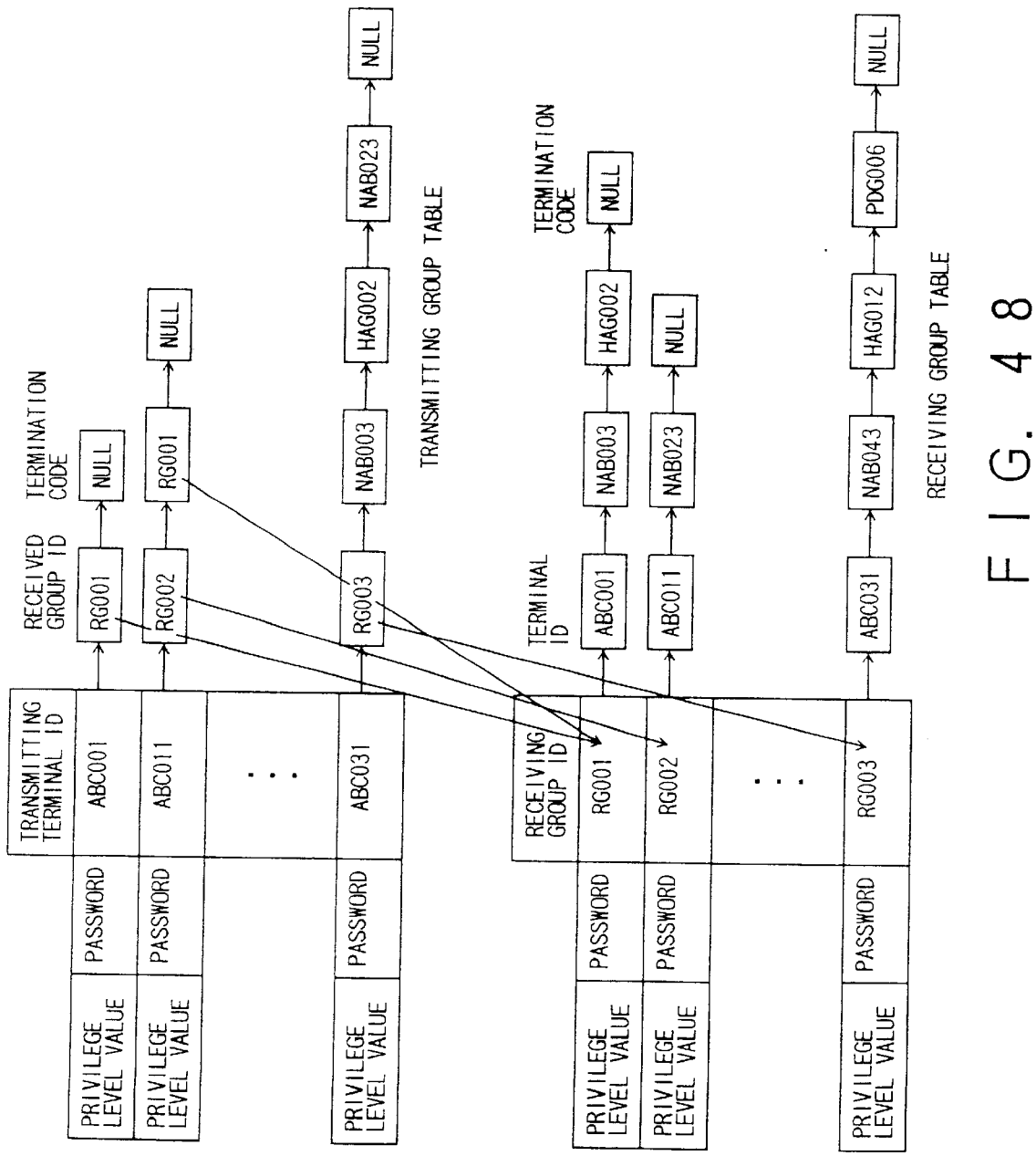
FIG. 48 is an illustration of a transmitting group table and an receiving group table by way of example.

FIG. 47 is a block diagram of an audio interactive system according to the sixteenth embodiment of the present invention. FIG. 48 is an illustration of a transmitting group table and an receiving group table by way of example.

The present embodiment may be arranged in a similar fashion to that of the embodiment shown in FIG. 41, but different in the point that each of the terminals is provided with a password input means, a server 20 is provided with a security check means, a privilege level table 36 for each user, a receiving group table and a transmitting group table, and each of entries of the receiving group table 34 and the transmitting group table 35 is provided with a privilege level memory and a password memory.

In the present embodiment, a mouse is used to instruct start and stop of the speech. While a mouse button is being depressed, an input entered through a microphone is subjected to a sampling process and an A/D conversion process as well. The digital data thus generated is transmitted to a server together with a user ID and a terminal ID in form of a packet in units of 256 bytes for example. When the mouse button is released, a packet is transmitted together with a data termination flag to the server. Speech issued from another terminal, which is distributed from the server, is supplied to a D/A converter to be converted into voice and then applied to a speaker.

A server control unit is implemented by a CPU and provides such a control that speeches are temporarily stored in buffer memories for the associated terminals, respectively, referring to terminal IDs of data transmitted from the respective terminals. There are prepared the buffer memories of which number is the same as that of the connected terminals. The server control unit serves to distribute the speech on the buffer memory indicated by a scheduler to the respective terminal indicated by the terminal ID registered in the transmitting group table and the terminal ID registered in the receiving group table indicated by receiving group ID.

The scheduler is implemented by a CPU and serves to determine an order of distribution of the speech data stored in the buffer memories to the terminals in accordance with a certain course. For example, time in which the first packet of the speech from the terminal is received, is stored in the associated buffer memory. If there is a speech which has been transmitted from the terminal and not yet distributed, the scheduler instructs the control unit to distribute the remaining speech to the terminal. If there are a plurality of speeches not yet distributed, the scheduler instructs the control unit to select and distribute the oldest one in the received time, of those speeches.

The listening mode selecting means is constituted of a CPU and a mouse. A user can indicate a desired mode through click of an icon indicating his desired mode.

The security check means is implemented by a CPU in which upon receipt of a requirement of rewriting of the receiving group table and the originating group table from a user, if the user's privilege level value is smaller than the privilege level value of the entry of the respective tables, the rewriting is allowed unconditionally, and if it is larger than the privilege level value, the password is entered from the terminal, and only when it matched with the entry of the table, the rewriting is allowed.

Here, while there is shown the embodiment using a similar scheduler to that of FIG. 27, it is acceptable to arrange the embodiment using a similar mixer to that of FIG. 32.

Figure 49:
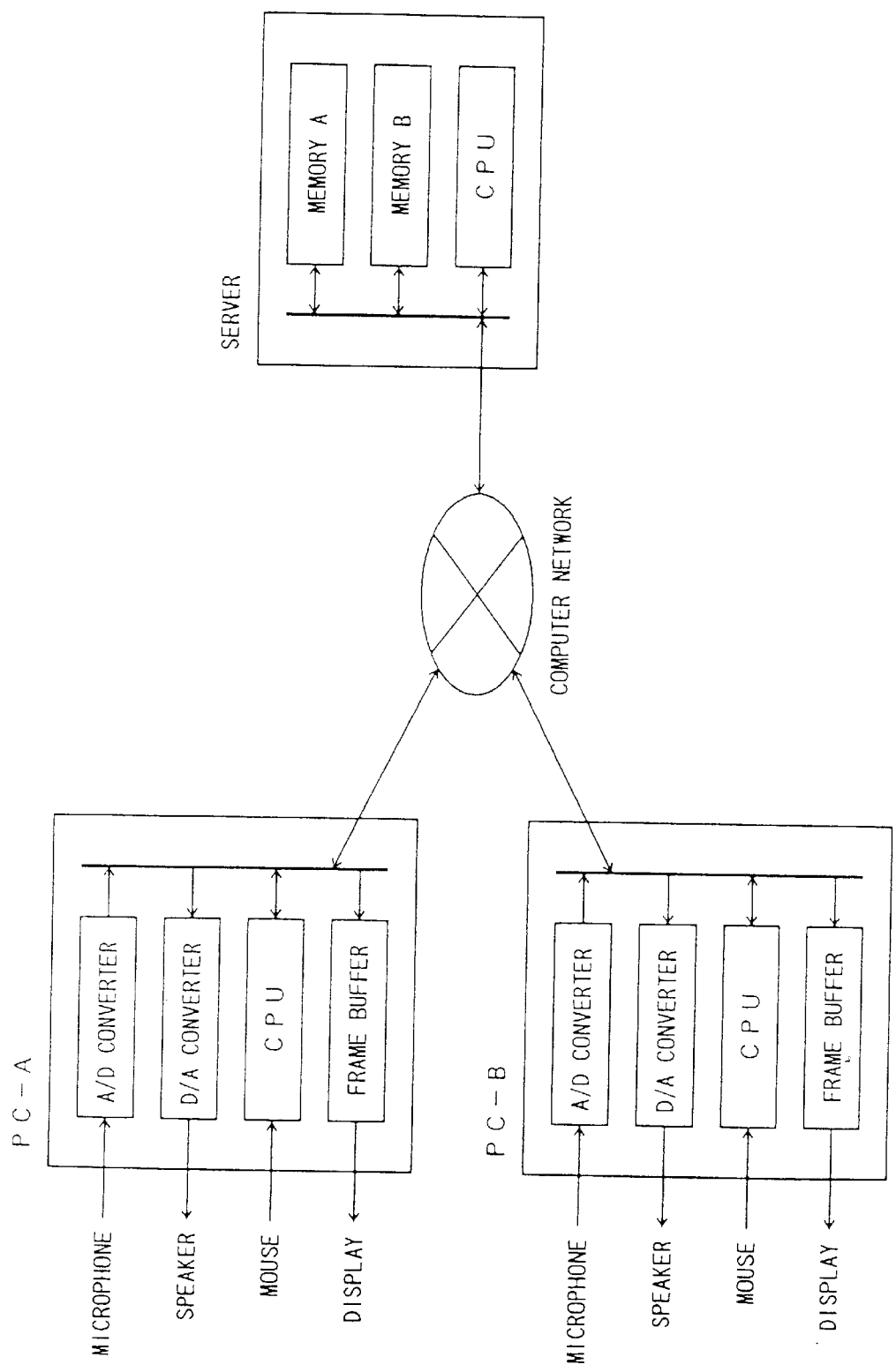
FIG. 49 is a block diagram of an audio interactive system according to the seventeenth embodiment of the present invention.
Figure 50:
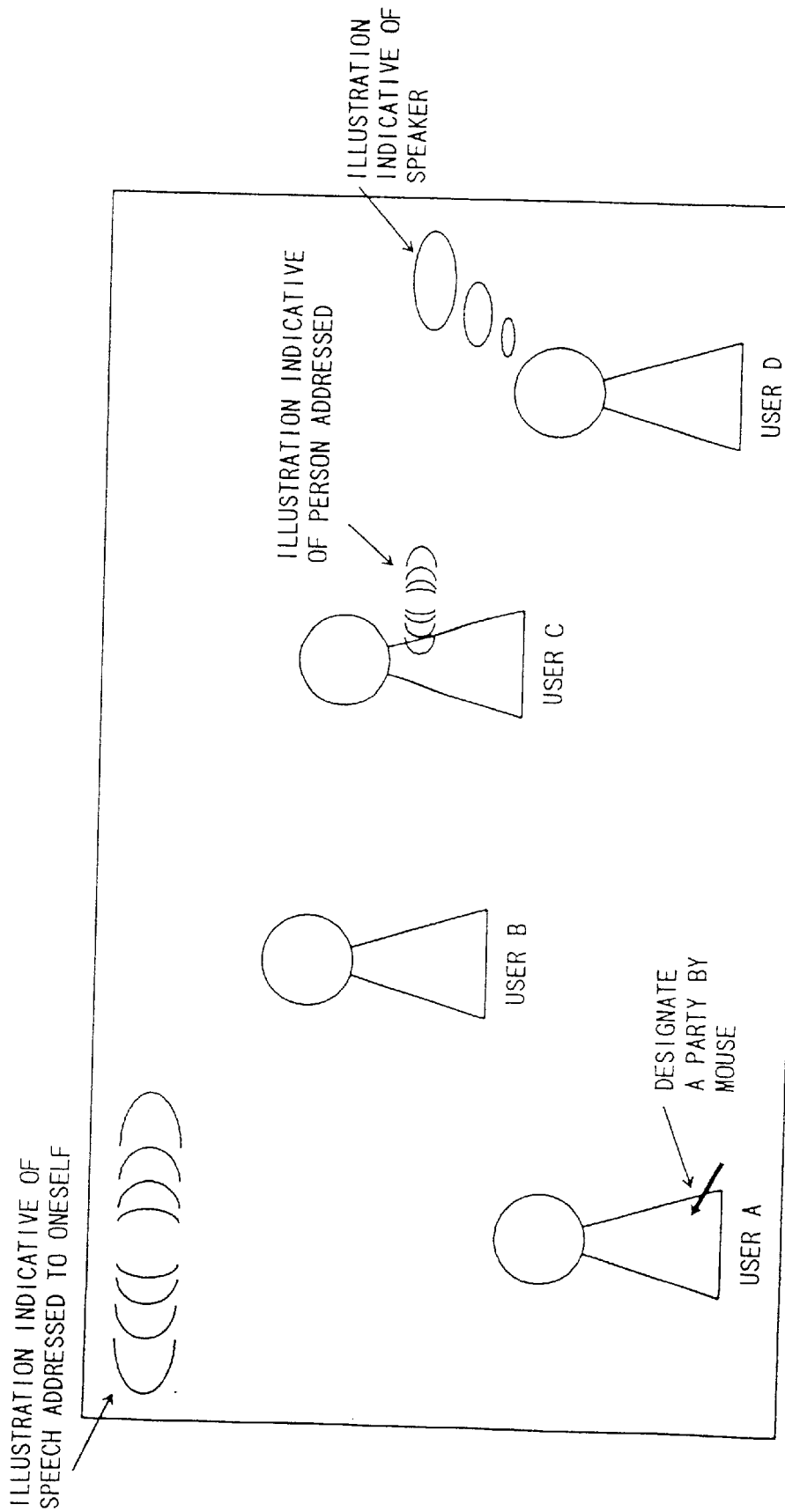
FIG. 50 is a view showing a sample of an illustration displayed on a display unit.

FIG. 49 is a block diagram of an audio interactive system according to the seventeenth embodiment of the present invention. FIG. 50 is a view showing a sample of an illustration displayed on a display unit.

The present embodiment may be arranged in a similar fashion to that of the first embodiment shown in FIG. 27, but different in the point that each of the terminals is provided with a control unit, a display means, a coordinates input means, and a drawing means.

According to the present embodiment, a user as a party of the speech is displayed on a display in form of an illustration of a person. Thus, an operator as a user designates the party of the speech by talking while clicking the displayed illustration of a person with a mouse and the like.

The control unit of the terminal is implemented by a CPU in which a movement of the mouse is monitored to check as to which illustration of a person on the display is clicked by the mouse, thereby specifying the party of speech.

The drawing means is also implemented by a CPU in which an illustration of a balloon is appended to an illustration on the display corresponding to the user now on speaking, thereby identifying a person who is speaking. On the other hand, an illustration of a calling tone is appended to an illustration of a person who is talked, thereby identifying a person who is talked. In a case where oneself is talked, an illustration of a calling tone is displayed on the screen at left upper together with an occurrence of sound like "pi".

Other processing is the same as that of the first embodiment shown in FIG. 27.

Figure 51:
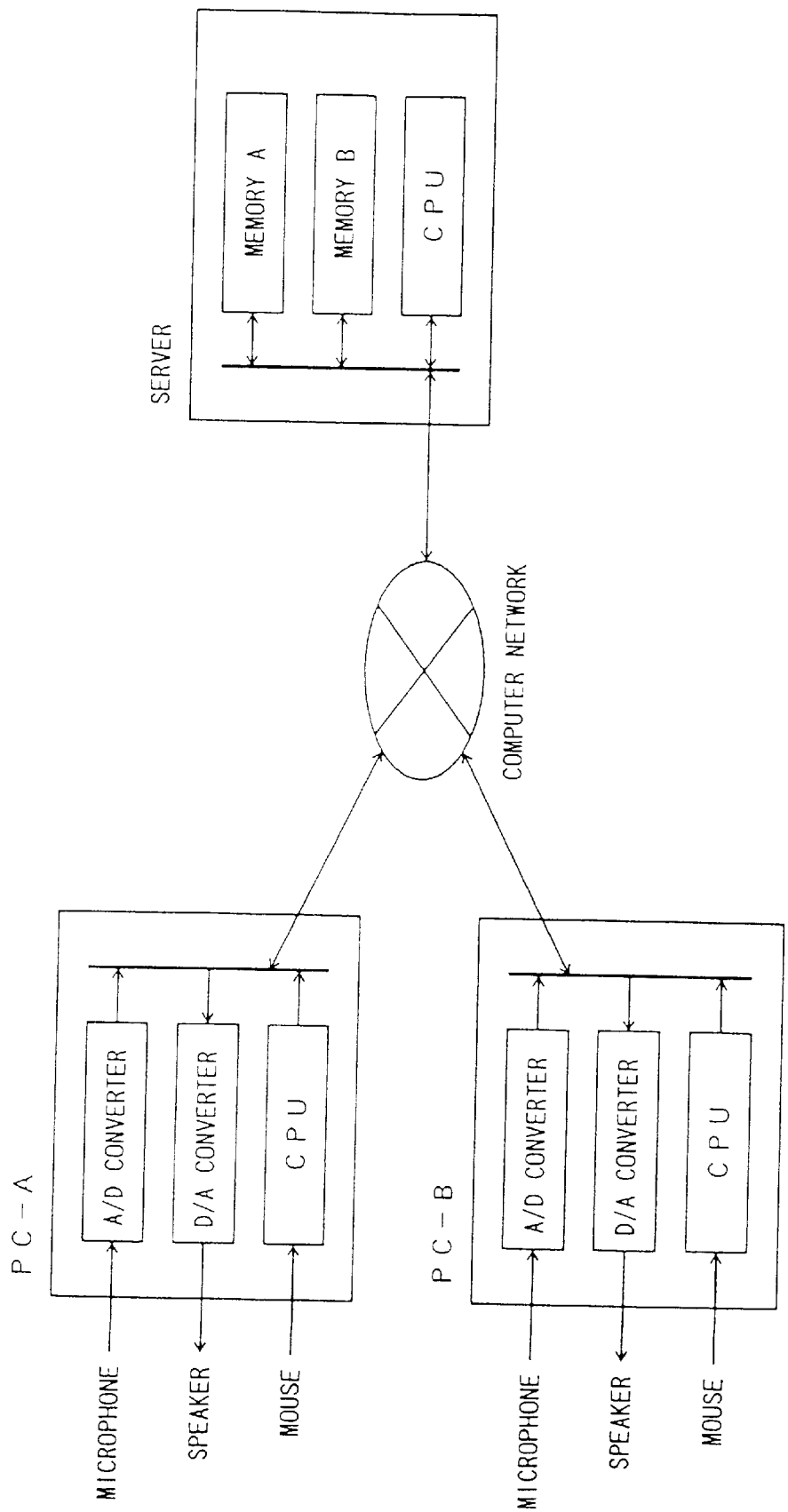
FIG. 51 is a block diagram of an audio interactive system according to the eighteenth embodiment of the present invention.

FIG. 51 is a block diagram of an audio interactive system according to the eighteenth embodiment of the present invention.

The present embodiment may be arranged in a similar fashion to that of the first embodiment shown in FIG. 27, but different in the point that the server is provided with an effector, and each of the terminals is provided with a control unit and a mode setting means.

The mode setting means and the control unit of the terminal are implemented by a CPU in which when a user clicks an icon to set up a speech to a silent mode, the control unit transmits to the server the speech together with a silent flag.

The control unit of the server is implemented by a CPU in which when the server receives from a terminal a speech to which a silent flag is appended, the speech is changed in tone quality through filtering the audio wave using an effector.

The effector is also implemented by a CPU in which spectrum of a voice is changed by an FFT, an IFFT and the like.

Other processing is the same as that of the first embodiment.

Figure 52:
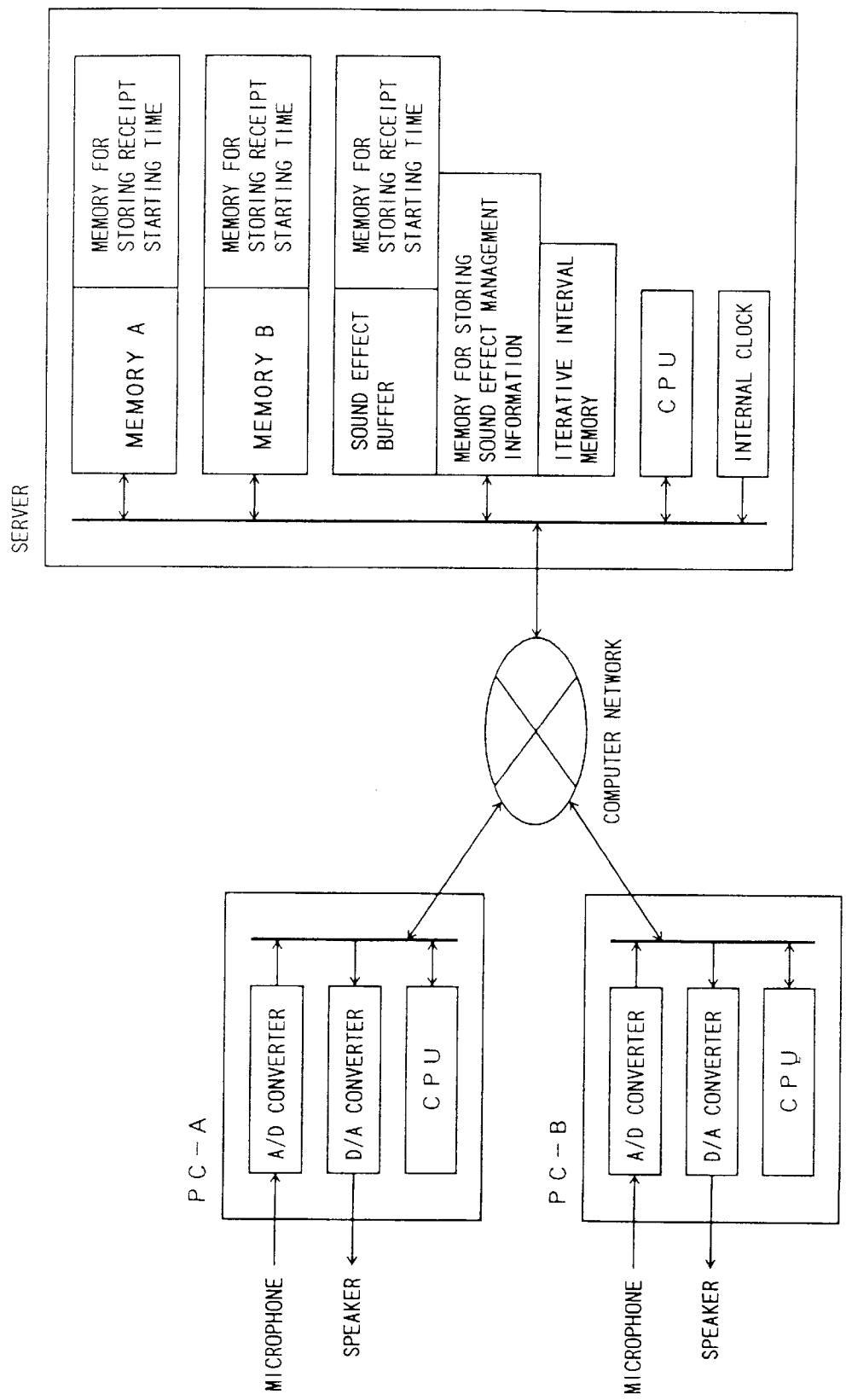
FIG. 52 is a block diagram of an audio interactive system according to the nineteenth embodiment of the present invention.

FIG. 52 is a block diagram of an audio interactive system according to the nineteenth embodiment of the present invention.

The present embodiment may be arranged in a similar fashion to that of the fourth embodiment shown in FIG. 30, but different in the point that the server is provided with a sound effect memory, a sound effect management information memory, an iterative interval memory, and a receipt starting time memory.

The scheduler is implemented by a CPU in which speeches to be distributed on each terminal and their order are scrutinized. If there is speeches which have been transmitted from another terminal and not yet distributed, the scheduler instructs the control unit to distribute the speeches in the order of older ones. At that time, the scheduling is performed in such a manner that the contents of the sound effect memory are also distributed to the terminals at an iterative interval. In other words, the scheduler sets up at an iterative interval the receipt starting time in the similar fashion of that of speeches received from the terminals, and distributes the speeches in the similar fashion of that of other speeches.

Other processing is the same as that of the first embodiment shown in FIG. 30.

Figure 53:
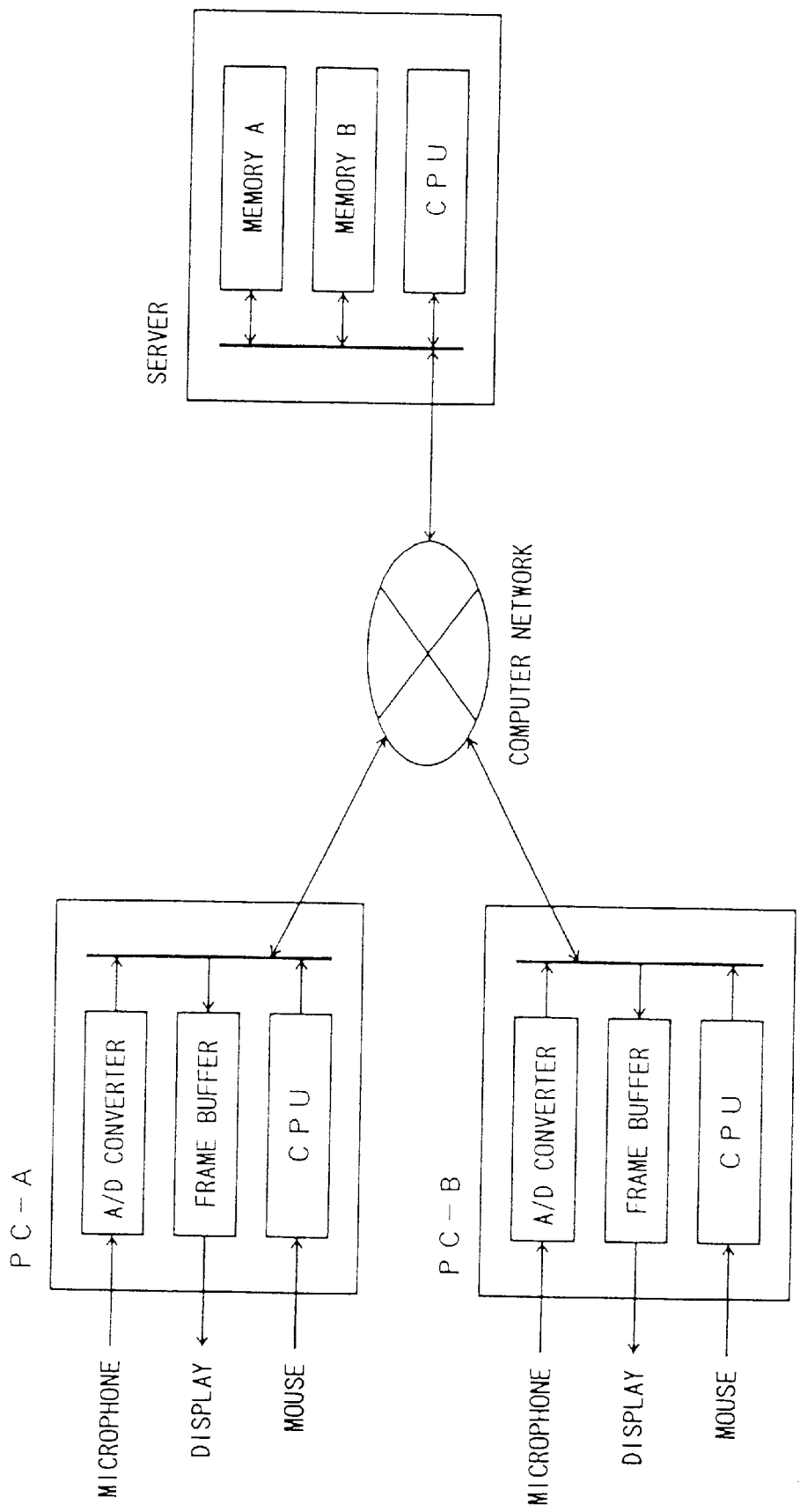
FIG. 53 is a block diagram of an audio interactive system according to the twentieth embodiment of the present invention.

FIG. 53 is a block diagram of an audio interactive system according to the twentieth embodiment of the present invention.

The present embodiment may be arranged in a similar fashion to that of the first embodiment shown in FIG. 27, but different in the point that the server is provided with an audio recognition means, and the terminal is provided with a character display means.

The control unit of the server is implemented by a CPU in which speeches on the buffer memory designated by the scheduler are distributed to the respective terminals. In this case, if the terminal, which intends to distribute speeches, has no audio output means, the audio recognition means is used to convert the speeches to the text, and then transmitted.

The audio recognition means is implemented by a CPU, and particularly, an audio recognition program involved in, for example, Windows Sound System.

The character display means is implemented by a frame buffer and a display. The received text is displayed on the display unit.

Other processing is the same as that of the embodiment shown in FIG. 27.

It is acceptable that the audio recognition means is appended to the terminal, so that text conversion is effected at the terminal end.

Figure 54:
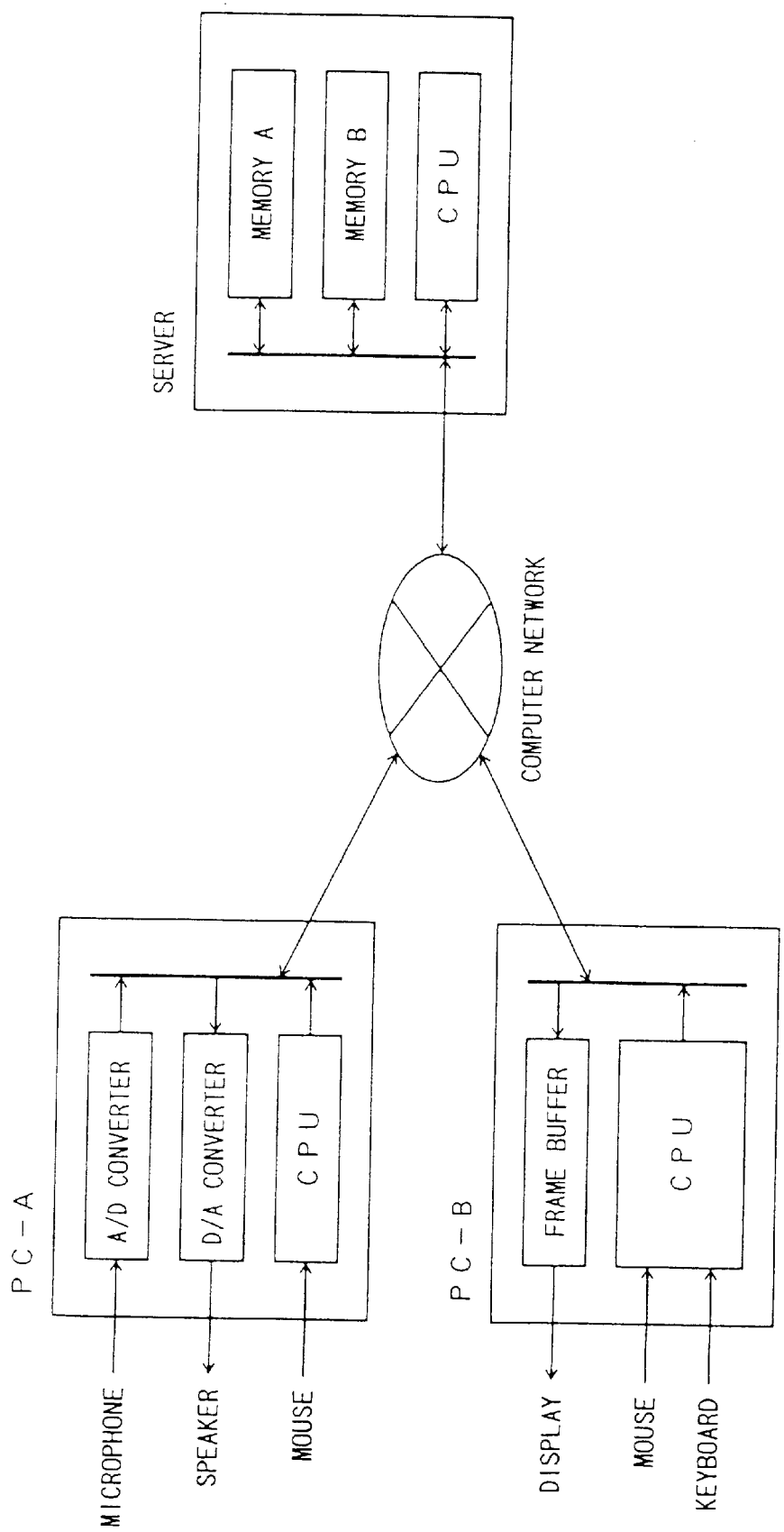
FIG. 54 is a block diagram of an audio interactive system according to the twenty-first embodiment of the present invention.

FIG. 54 is a block diagram of an audio interactive system according to the twenty-first embodiment of the present invention.

The present embodiment may be arranged in a similar fashion to that of the twentieth embodiment shown in FIG. 53, but different in the point that the server is provided with a voice synthesizer means.

The control unit of the server is implemented by a CPU in which speeches on the buffer memory designated by the scheduler are distributed to the respective terminals. In this case, if speeches intended to be distributed are of a text, and a terminal, to which the speeches are to be directed, has an audio output means, the voice synthesizer means is used to convert the text to a PCM voice, and then transmitted.

The voice synthesizer means is implemented by a CPU, and particularly, a voice synthesizing program involved in, for example, Windows Sound System.

Other processing is the same as that of the embodiment shown in FIG. 53.

Figure 55:
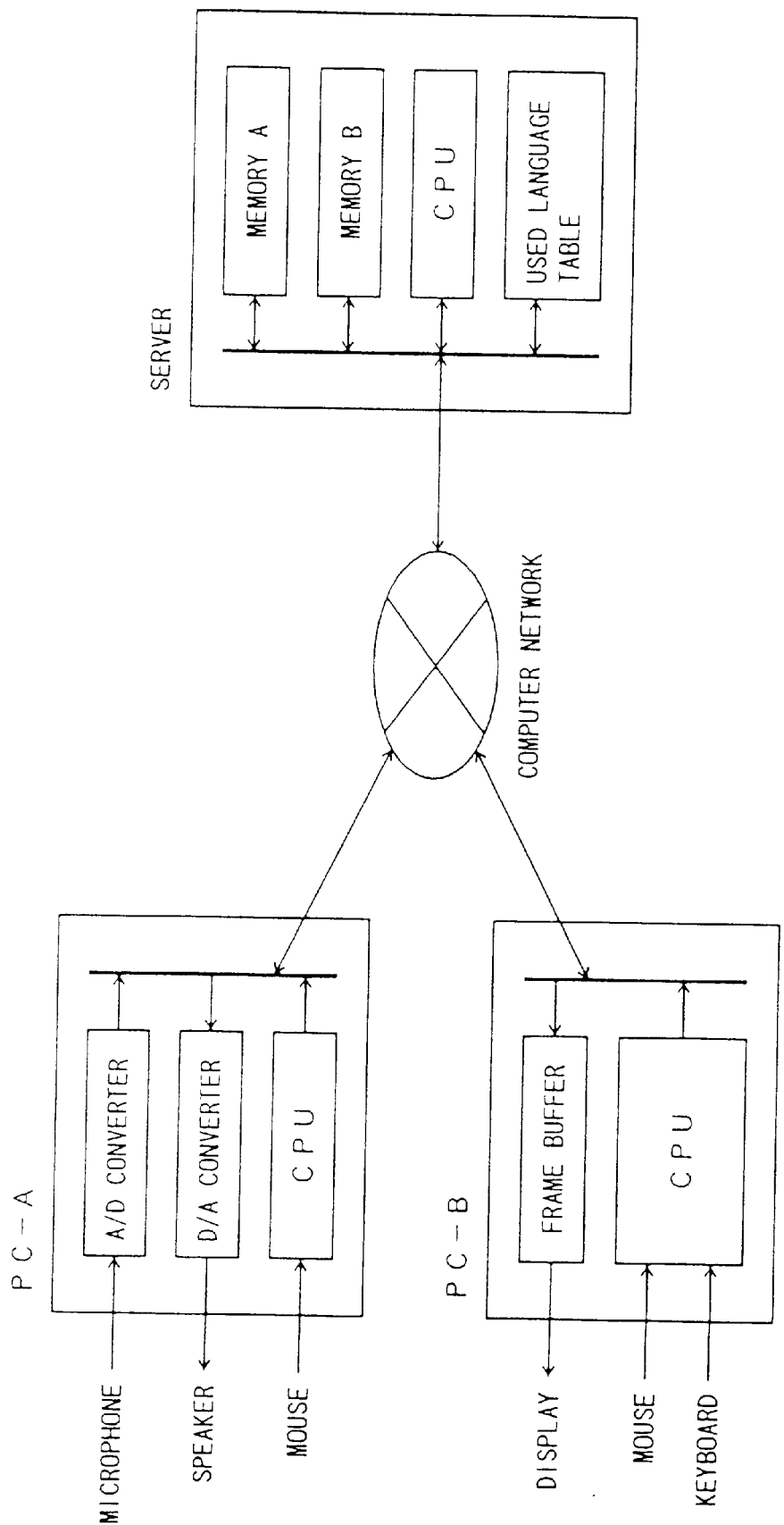
FIG. 55 is a block diagram of an audio interactive system according to the twenty-second embodiment of the present invention.

FIG. 55 is a block diagram of an audio interactive system according to the twenty-second embodiment of the present invention.

The present embodiment may be arranged in a similar fashion to that of the embodiment shown in FIG. 54, but different in the point that the server is provided with a translation means and a used language table.

The terminal transmits to the server a speech together with the associated used language code.

The control unit of the server is implemented by a CPU in which speeches on the buffer memory designated by the scheduler are distributed to the respective terminals. In this case, if a used language code of the speech does not match with that of a terminal which is described in the used language code, the speech is converted into a text by the speech recognition means, and then translated by a translation means, and further the resultant text is converted into a PCM voice by the voice synthesizer means and then transmitted.

The translation means is implemented by a CPU, and specifically, it is, for example, an ALTAS translation system.

Other processing is the same as that of the embodiment shown in FIG. 54.

Figure 56:
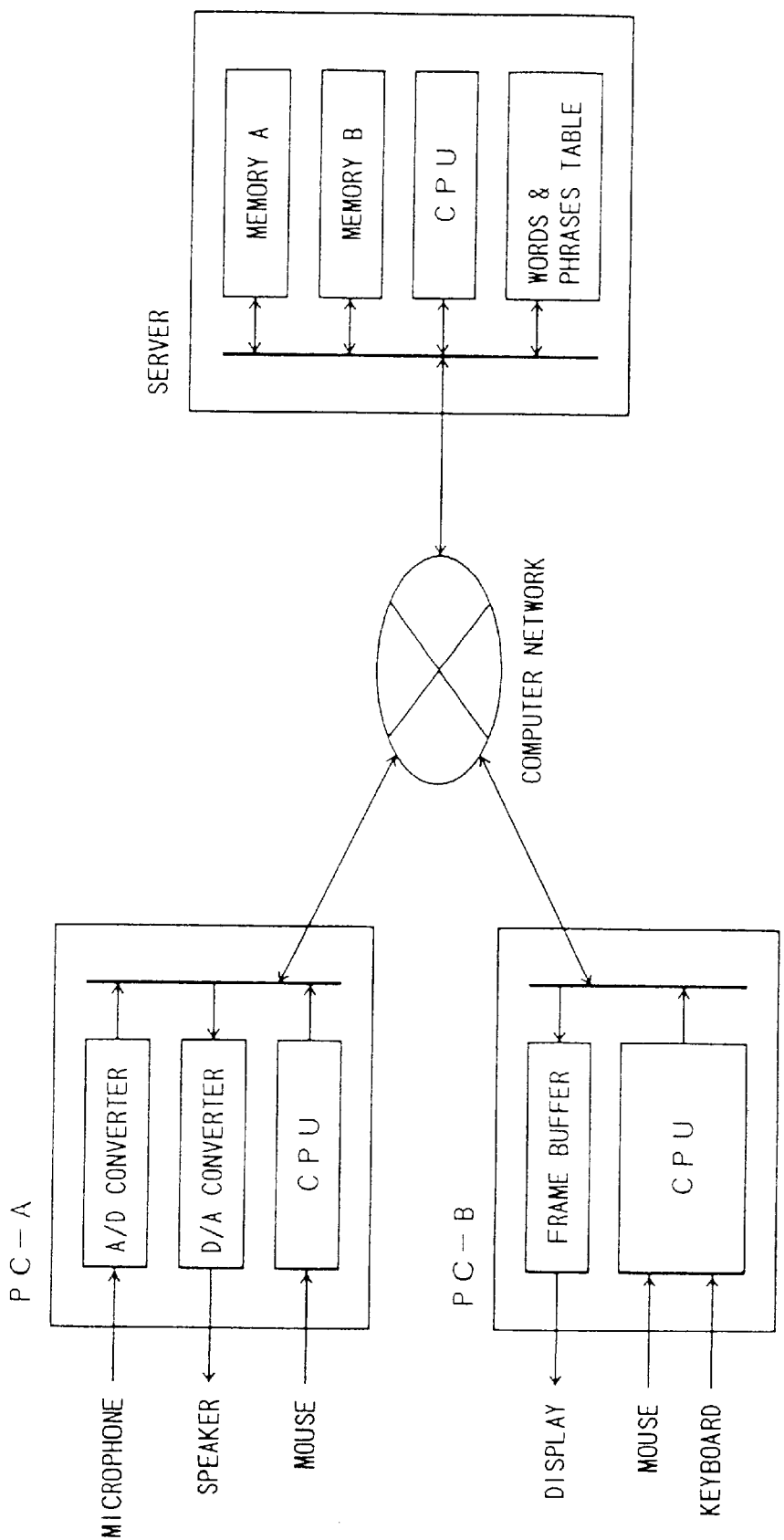
FIG. 56 is a block diagram of an audio interactive system according to the twenty-third embodiment of the present invention.

FIG. 56 is a block diagram of an audio interactive system according to the twenty-third embodiment of the present invention.

The present embodiment may be arranged in a similar fashion to that of the embodiment shown in FIG. 54, but different in the point that the server is provided with a retrieval means and a words and phrases table.

The control unit of the server is implemented by a CPU in which each of speeches is stored in the associated buffer memory for terminal referring to the terminals ID transmitted from the respective terminals. The PCM audio data is converted into text data using the speech recognition means. The retrieval means is used to retrieve as to whether words and phrases, which are registered in the words and phrases table, exist in the text. If the words and phrases exist, they are deleted or edited, and converted into PCM voice using the voice synthesizer means. The speech thus derived are distributed to the terminals in accordance with the instruction of the scheduler.

Other processing is the same as that of the embodiment shown in FIG. 54.

Figure 57:
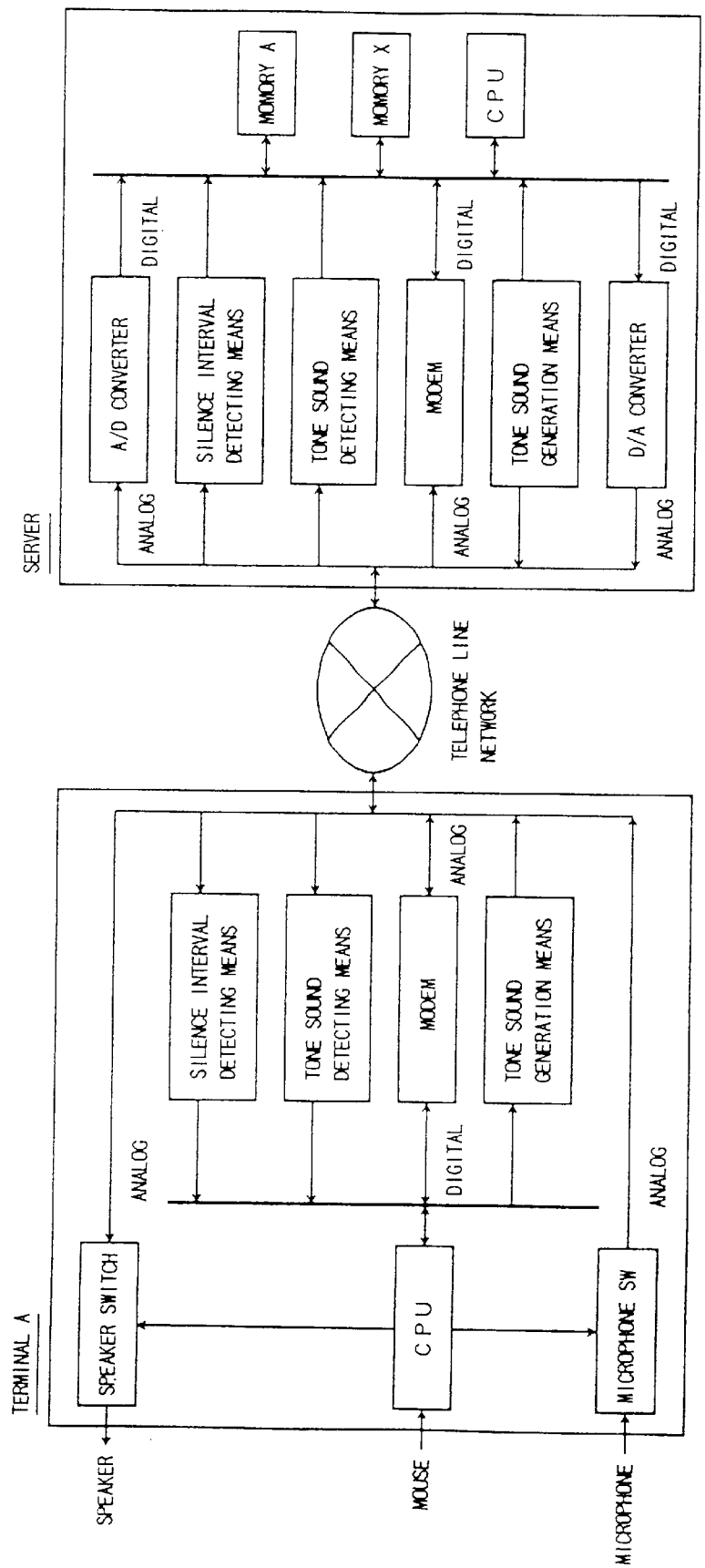
FIG. 57 is a block diagram of an audio interactive system according to the twenty-fourth embodiment of the present invention.

FIG. 57 is a block diagram of an audio interactive system according to the twenty-fourth embodiment of the present invention.

According to the present embodiment, a speech issued from the terminal is transmitted in the form of analog voice to the server, and also when speeches are distributed from the server to the respective terminals, the speeches are distributed in the form of analog voice.

In an arrangement in which terminals and a server are connected via an analog of telephone line network, and data are transmitted and received using a modem, analog data such as speeches are passed as it is without being subjected to the digitalizing process. For the purpose of a notification and a detection of the termination of analog data, the terminal is provided with a tone sound detecting means, a tone sound generating means, a silence interval detecting means, a speaker switch means for selecting a connection between the telephone line network and a speaker, and a microphone switch means for selecting a connection between the telephone line network and a microphone.

The control unit of the terminal transmits to the server, when it is detected that a mouse is depressed, an analog data start code to inform of such a matter that subsequent data become analog data. And the control unit turns on the microphone switch so that a microphone input is fed to the telephone line network. When the mouse is released to terminate the speech, the control unit turns off the microphone switch, and after the lapse of a predetermined silence term causes the tone sound generating means to generate a predetermined tone sound. Thereafter, the control unit returns to a service for an exchange of digital data through a modem. When the control unit receives the analog data start code from the server, the control unit turns on the speaker switch so that an analog voice is fed to the speaker. At that time, the silence interval detecting means monitors the analog voice. When the silence interval is detected and it is confirmed that the sound immediately after is the tone sound by the tone sound detecting means, the speaker switch is turned off. Thereafter, the control unit receives the subsequent data in the form of digital data.

When the control unit of the server receives the analog data start code from the terminal, the subsequent data are converted into PCM data through an A/D conversion, and then stored in the buffer memories for the terminals. At that time, the silence interval detecting means monitors the analog voice. When the silence interval is detected and it is confirmed that the sound immediately after is the tone sound by the tone sound detecting means, the data input through the A/D conversion is terminated. In a case where speeches are distributed to the terminals in accordance with the instruction of the scheduler, first, the analog data start code is transmitted, and then the contents of the buffer area are outputted to the telephone line network in the form of analog signals, while being subjected to the D/A conversion. After termination of the output, after the lapse of a predetermined silence term, the tone sound generating means generates a predetermined tone sound. Thereafter, the control unit returns to a service for an exchange of digital data through a modem.

The signal conversion means converts the digital information into the modulated analog signals, and reversely, the modulated analog signals into the digital signals.

The scheduler and other processing are the same as that of the first embodiment shown in FIG. 27.

Figure 58:
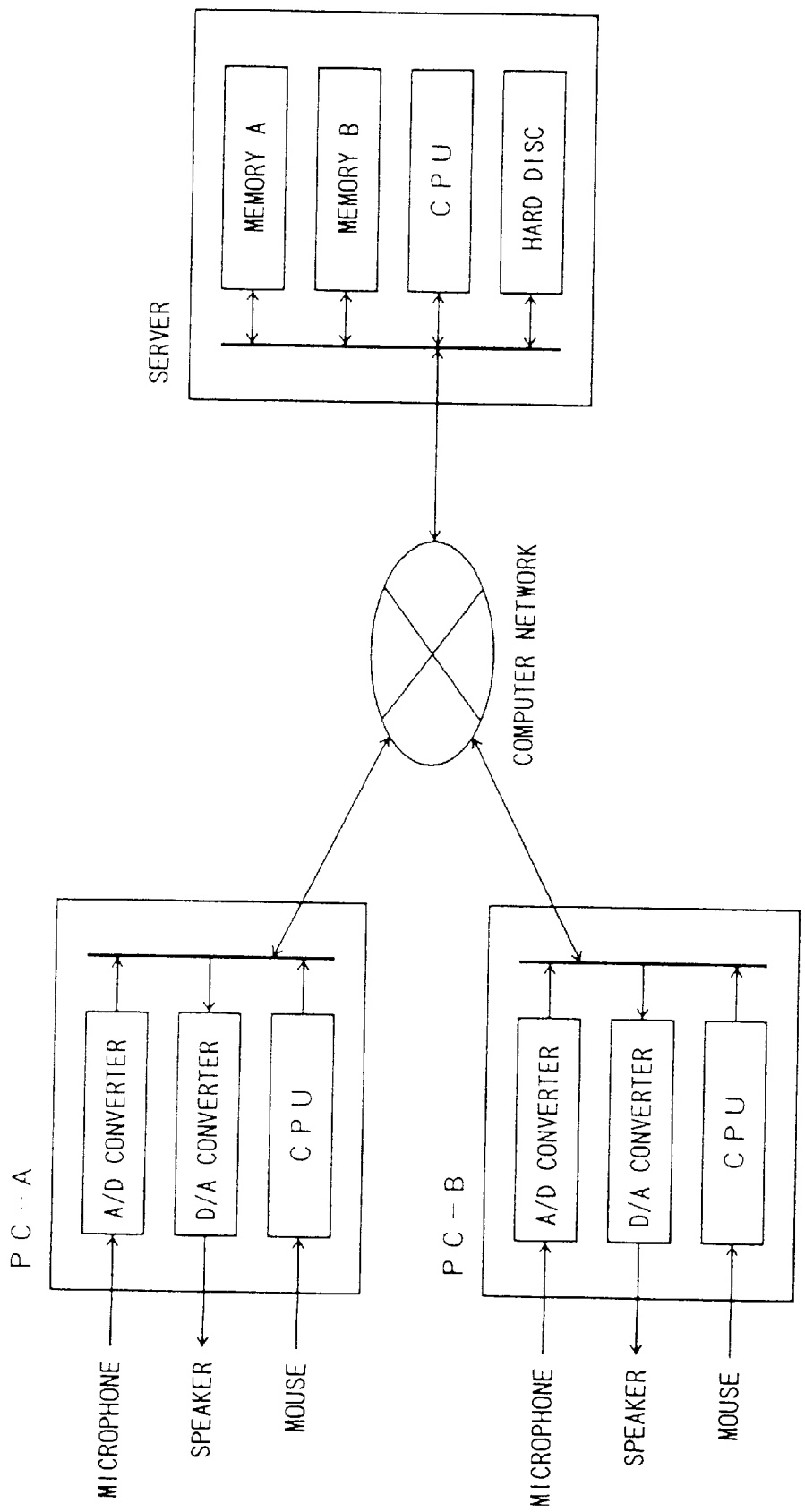
FIG. 58 is a block diagram of an audio interactive system according to the twenty-fifth embodiment of the present invention.

FIG. 58 is a block diagram of an audio interactive system according to the twenty-fifth embodiment of the present invention.

The present embodiment may be arranged in a similar fashion to that of the embodiment shown in FIG. 27, but different in the point that the server is provided with a hard disc.

The control unit of the server causes the buffer area to store the speeches transmitted from the respective terminals, and in addition causes the hard disk to store information such as speech data, a speech start time, a speaker's name and a party of the speech. The control unit of the server serves to read the speeches recorded on the hard disk in accordance with a request from the terminals and transmit the same to the terminals.

Other processing is the same as that of the embodiment shown in FIG. 27.

Here, while the speeches are recorded in the form of the PCM data as it is, the use of the speech recognition means and the voice synthesizer means make it possible to record the speech through conversion into the text, and restore the text to the voice. Further, it is possible to easily implement such a matter that the user may see the speech information through the text as it is.

Figure 59:
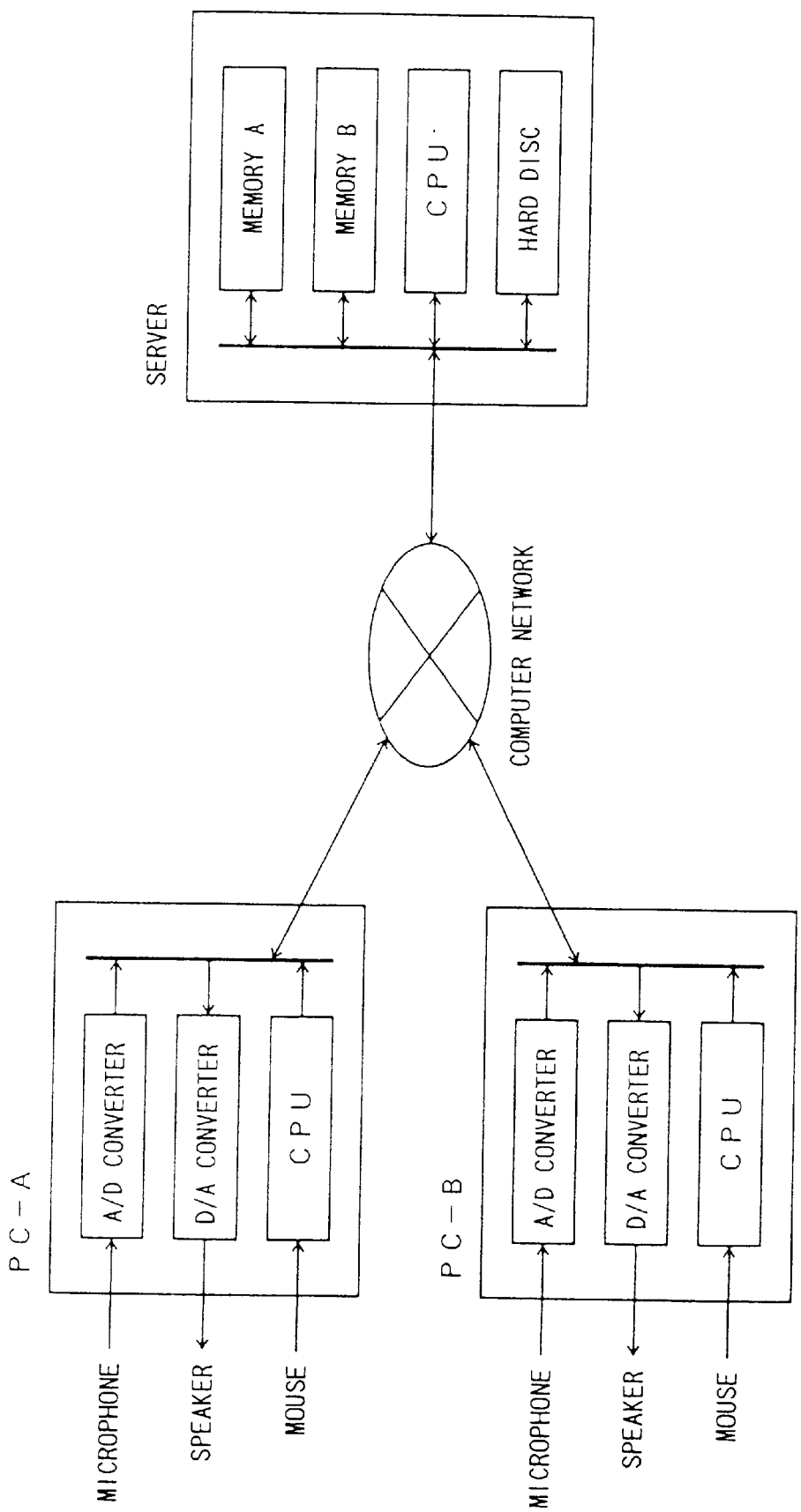
FIG. 59 is a block diagram of an audio interactive system according to the twenty-sixth embodiment of the present invention.

FIG. 59 is a block diagram of an audio interactive system according to the twenty-sixth embodiment of the present invention.

The present embodiment may be arranged in a similar fashion to that of the embodiment shown in FIG. 58, but different in the point that the server is provided with a retrieval means.

In the control unit of the server, the incorporation of the retrieval means into the server permits only the speech of concern to be distributed to the terminals, through performing a retrieval by the retrieval means as to the speeches stored in the hard disk in accordance with a request from the terminal, adopting a speech start time, a speaker's name and a party of the speech as key words.

The retrieval means is implemented by a CPU.

Other processing is the same as that of the embodiment shown in FIG. 58.

The incorporation of the speech recognition means into the server makes it possible to retrieve the speech contents with specified key words by means of converting the speeches recorded on the hard disk into the text and retrieving the converted ones by the retrieval means. Thus, it is possible to transmit only the speeches as to the specific topics to the terminals.

Figure 60:
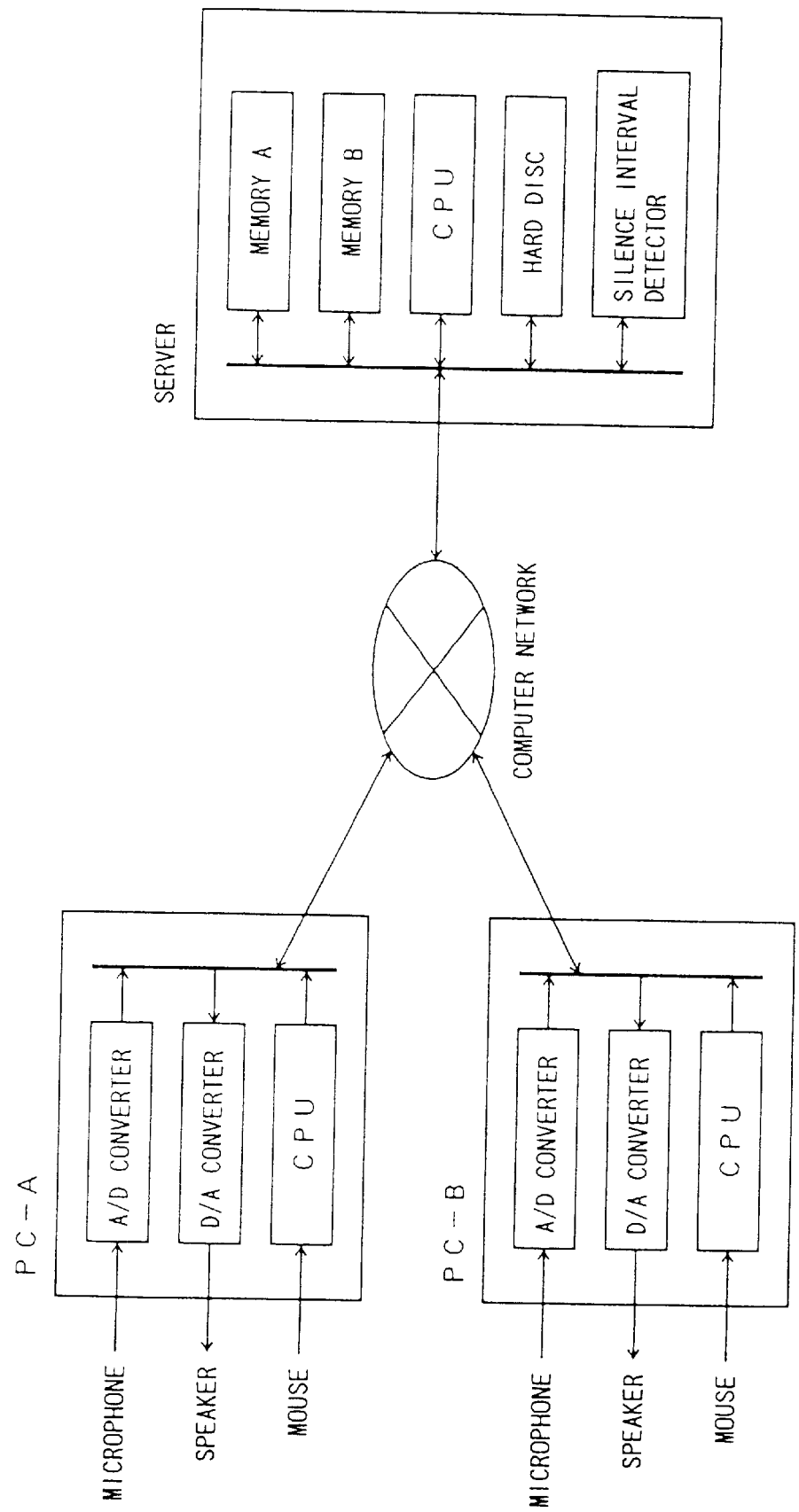
FIG. 60 is a block diagram of an audio interactive system according to the twenty-seventh embodiment of the present invention.

FIG. 60 is a block diagram of an audio interactive system according to the twenty-seventh embodiment of the present invention.

The present embodiment may be arranged in a similar fashion to that of the embodiment shown in FIG. 58, but different in the point that the server is provided with a conversation rate conversion means.

In the control unit of the server, when the conversation is reproduced in accordance with the request from the terminals, it may be arranged to hear the speeches with time shorter than the actual time in such a manner that the speeches are distributed in a real timing in which the speeches actually occur, the speeches are sequentially distributed in the order of occurrence regardless of the pause, independently of the real timing, or the speeches are distributed to the terminals through deleting the pause by the conversation rate conversion means.

The conversation rate conversion means is implemented by the silence interval detection means and a CPU in which the silence in the speech is detected and deleted, so that the speech time is reduced.

Other processing is the same as that of the embodiment shown in FIG. 58.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An audio interactive system comprising:

a plurality of terminals each having an audio input means for converting voices into aural signals and an audio output means for converting aural signals into voices, said plurality of terminals being connected to a communication line; and a server connected with said plurality of terminals via said communication line to perform collection and distribution of the aural signals, in which a conversation is made through voices between said plurality of terminals, wherein said server comprises a buffer means for temporarily storing the aural signals transmitted from the terminals, and a scheduler means for controlling the distribution of the aural signals stored in said buffer means, and wherein the aural signals are transmitted on a digital basis to the server and the server distributes the aural signals to the respective terminals on a digital basis.

2. An audio interactive system according to claim 1, wherein said server controls a distribution sequence of the aural signals stored in said buffer means.

3. An audio interactive system according to claim 1, wherein said server has means for managing a number of simultaneous speakers that simultaneously transmit speeches, and inhibits a simultaneous transmission of the aural signals from the terminal, a number of said aural signals exceeding a predetermined number.

4. An audio interactive system according to claim 1, wherein said server or said terminal has a silence detection means for detecting a silence portion of the aural signal, and said scheduler controls a distribution sequence of the aural signals in units of speeches each separated with the silence portion of the aural signal.

5. An audio interactive system according to claim 1, wherein said scheduler controls a distribution sequence of the aural signals in such a manner that the server distributes the aural signals in the order in which the aural signals arrive at said server.

6. An audio interactive system according to claim 1, wherein said server has means for transmitting to the terminal a command indicating transmission of an internal time of the terminal;

each of said terminals has means responsive to the command for transmitting one's own internal time to said server, and means for transmitting to said server the aural signal together with one's own internal time at time of transmission; and said scheduler controls a distribution sequence of the aural signals in such a manner that the server distributes the aural signals in the order in which the aural signals are transmitted from said terminals.

7. An audio interactive system according to claim 1, wherein said server has a mixer for mixing the aural signals.

8. An audio interactive system according to claim 7, wherein said scheduler controls a distribution time of the aural signals on the basis of time at which the aural signals arrive at said server.

9. An audio interactive system according to claim 7, wherein said server has means for transmitting to the terminal a command indicating transmission of an internal time of the terminal;

each of said terminals has means responsive to the command for transmitting one's own internal time to said server, and means for transmitting to said server the aural signal together with one's own internal time at time of transmission; and said scheduler controls a distribution time of the aural signals on the basis of time at which the aural signals are transmitted from said terminals.

10. An audio interactive system according to claim 1, wherein each of said terminals has a logical personal image, and said scheduler controls a distribution of the aural signals on the basis of at least one of logical positional relation, distance, surroundings, eyes direction, view area and posture of the logical personal image within space constructed by the logical personal images.

11. An audio interactive system according to claim 1, wherein each of said terminals has a logical personal image, and has an effector for making a sound effects to the aural signal on the basis of at least one of logical positional relation, distance, surroundings, eyes direction, view area and posture of the logical personal image within space constructed by the logical personal images.

12. An audio interactive system according to claim 1, wherein said server has one or more group management tables registering terminals, which belong to an interaction group in which a conversation is made, of said plurality of terminals, and said scheduler controls a distribution of the aural signals in such a manner that received aural signals are distributed to terminals which belong to the same interaction group as the terminal which generated the received aural signals.

13. An audio interactive system according to claim 12, wherein a password is assigned to said interaction group, each of said terminals has a password input means for inputting the password to transmit the same to said server, and said server inspects the passwords transmitted from the terminals and causes the terminal transmitting a proper password to join an associated interaction group.

14. An audio interactive system according to claim 1, wherein each of said terminals has a listening mode selection means for selecting any one of a plurality of listening modes for designating a transmitting terminal as a transmitting source.

15. An audio interactive system according claim 1, wherein each of said terminals has an interruption inhibit informing means for informing said server of an interruption inhibit to designate a terminal as an originating source of the aural material, on which a reception of aural signals addressed and transmitted to oneself is rejected, and said server stops a transfer of the aural signals to the terminal at the transmitting destination, when a transmitting destination of received aural signals is the terminal which informed of interruption inhibit through said interruption inhibit informing means and an originating source of the received aural signals is the terminal designated by interruption inhibit information through said interruption inhibit informing means.

16. An audio interactive system according to claim 1, wherein each of said terminals has a transmitting mode selection means for selecting any one of a plurality of transmitting modes for designating a receiving terminal as a receiving destination to receive an aural signal.

17. An audio interactive system according to claim 1, wherein each of said terminals has a display means for displaying a speaker and a listener.

18. An audio interactive system according to claim 1, wherein said server has an effector for changing acoustics of the aural signals.

19. An audio interactive system according to claim 1, wherein said server has a sound effect buffer for storing a sound effect signal representative of a predetermined sound effect, and said scheduler means controls a distribution of the aural signals transmitted and also controls a distribution of the aural signals stored in said sound effect buffer.

20. An audio interactive system according to claim 1, wherein said server or said terminal has audio recognition means for converting the aural signals into text data.

21. An audio interactive system according to claim 1, wherein said server and said terminals are connected to each other via an analog line, and said system further comprises:

a tone sound generating means for generating tone sounds to discriminate starting point and terminating point of aural signals at starting and terminating of aural signals in the form of analog signals, and a tone sound detecting means for detecting received tone sounds.

22. An audio interactive system according to claim 1, wherein said server has storage means for storing conversations between the terminals.

23. An audio interactive system according to claim 22, wherein when said storage means stores conversations between the terminals, said server adds associated attribute information to the conversation to be stored in said storage means.

24. An audio interactive system according to claim 23, wherein said server has a retrieval means for retrieving a desired conversation portion of the conversation stored in said storage means on the basis of the attribute information.

25. An audio interactive system according to claim 22, wherein said system further comprises a conversation rate conversion means for converting a conversation rate.

* * * * *